US 11,161,103 B2

United States Patent
Choi et al.

(10) Patent No.: US 11,161,103 B2
(45) Date of Patent: Nov. 2, 2021

(54) ORGANOMETALLIC COMPLEX CATALYST

(71) Applicants: NATIONAL INSTITUTE OF ADVANCED INDUSTRIAL SCIENCE AND TECHNOLOGY, Tokyo (JP); N.E. CHEMCAT CORPORATION, Tokyo (JP)

(72) Inventors: Junchul Choi, Tsukuba (JP); Norihisa Fukaya, Tsukuba (JP); Shunya Onozawa, Tsukuba (JP); Kazuhiko Sato, Tsukuba (JP); Hiroyuki Yasuda, Tokyo (JP); Tomoteru Mizusaki, Tokyo (JP); Yukio Takagi, Tokyo (JP)

(73) Assignees: NATIONAL INSTITUTE OF ADVANCED INDUSTRIAL SCIENCE AND TECHNOLOGY, Tokyo (JP); N.E. CHEMCAT CORPORATION, Tokyo (JP)

( * ) Notice: Subject to any disclaimer, the term of this patent is extended or adjusted under 35 U.S.C. 154(b) by 100 days.

(21) Appl. No.: 16/466,436

(22) PCT Filed: Dec. 6, 2017

(86) PCT No.: PCT/JP2017/043889
§ 371 (c)(1),
(2) Date: Jun. 4, 2019

(87) PCT Pub. No.: WO2018/105671
PCT Pub. Date: Jun. 14, 2018

(65) Prior Publication Data
US 2019/0308182 A1   Oct. 10, 2019

(30) Foreign Application Priority Data

Dec. 7, 2016 (JP) .............................. JP2016-237941
Dec. 7, 2016 (JP) .............................. JP2016-237942

(51) Int. Cl.
*B01J 31/22*   (2006.01)

(52) U.S. Cl.
CPC ........... *B01J 31/2273* (2013.01); *B01J 31/22* (2013.01); *B01J 2231/4283* (2013.01);
(Continued)

(58) Field of Classification Search
None
See application file for complete search history.

(56) References Cited

PUBLICATIONS

Yu et al., Chinese Chemical Letters, 26, 654-566 (Year: 2015).*

* cited by examiner

*Primary Examiner* — Yun Qian
(74) *Attorney, Agent, or Firm* — Westerman, Hattori, Daniels & Adrian, LLP

(57) ABSTRACT

An organometallic complex catalyst is disclosed for use in a cross-coupling reaction. In formula (1), M is the coordination center and represents a metal atom such as Pd or an ion thereof. $R^1$, $R^2$, and $R^3$ may be the same or different and are a substituent such as a hydrogen atom. $R^4$, $R^5$, $R^6$, and $R^7$ may be the same or different and are a substituent such as a hydrogen atom. X represents a halogen atom. $R^8$ represents a substituent that has a π bond and 3-20 carbon atoms. With regard to the electron-donating properties of $R^1$-$R^7$ with respect to the coordination center M of the ligand containing $R^1$-$R^7$ that is indicated in formula (2), $R^1$-$R^7$ are arranged in combination such that the TEP value obtained from infrared spectroscopy shifts toward the high frequency side compared to the TEP value of the ligand of formula (2-1).

(Continued)

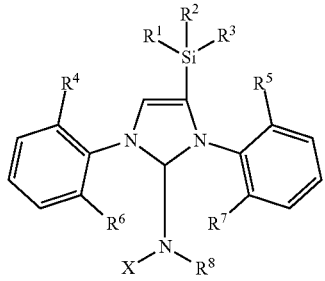
(1)
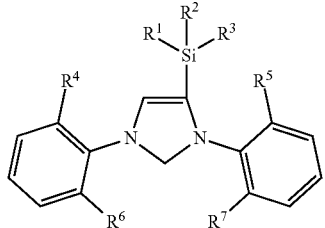
(2)
-continued
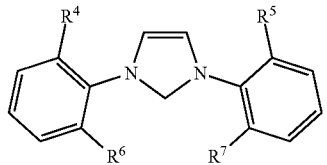
(2-1)
3 Claims, 16 Drawing Sheets
(52) U.S. Cl.
CPC .... *B01J 2531/004* (2013.01); *B01J 2531/822* (2013.01); *B01J 2531/824* (2013.01)

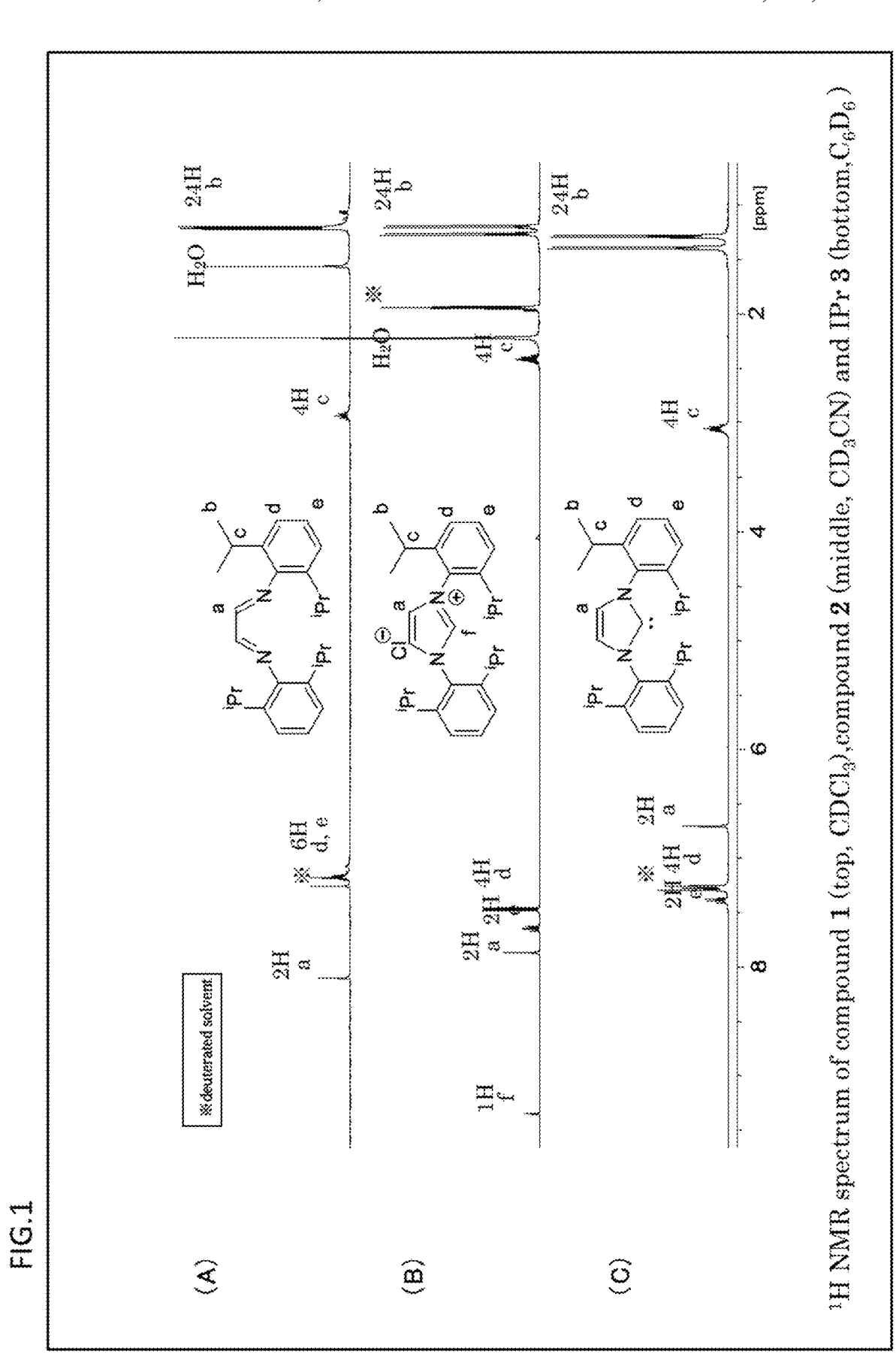
FIG.1 $^1$H NMR spectrum of compound 1 (top, CDCl$_3$), compound 2 (middle, CD$_3$CN) and IPr 3 (bottom, C$_6$D$_6$)

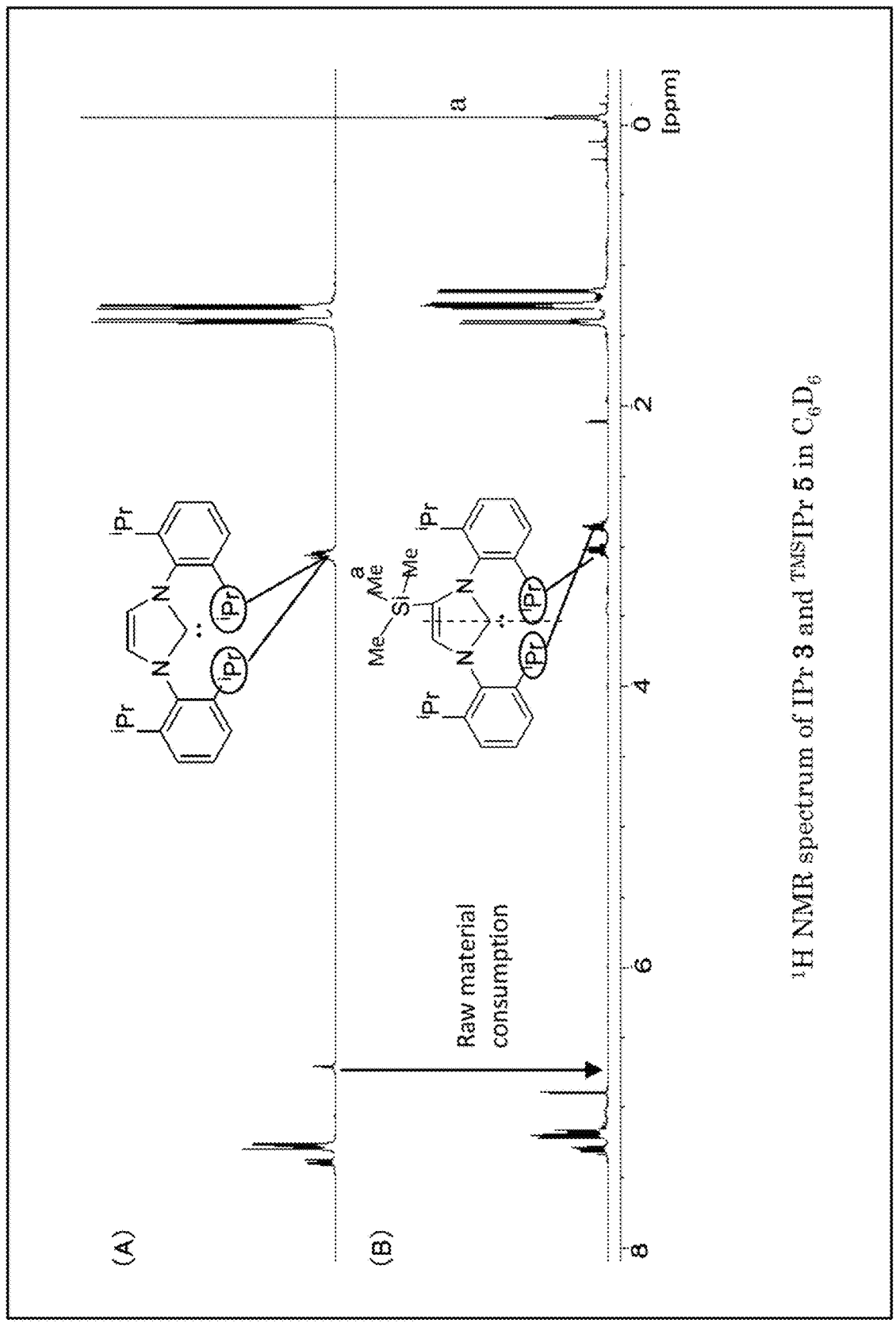

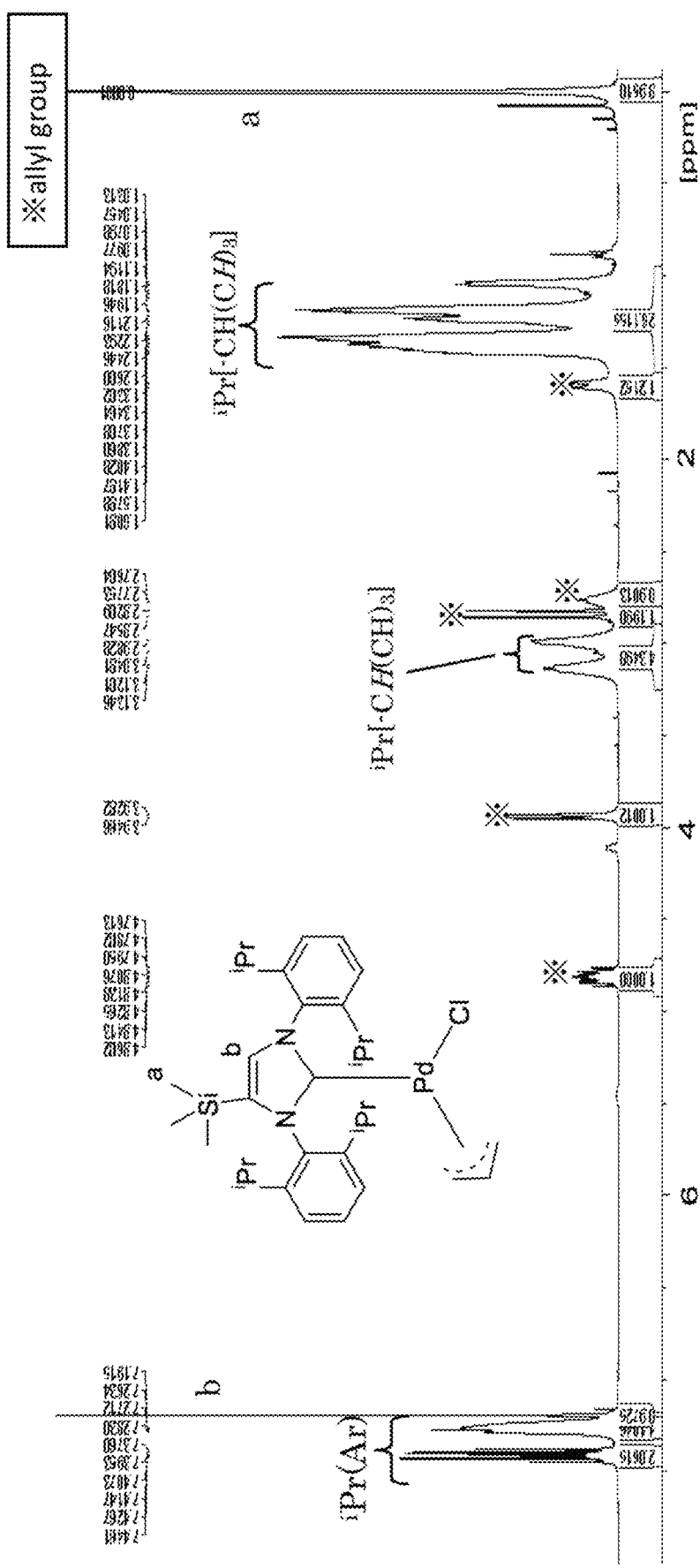
FIG.3 $^1$H NMR spectrum of $^{TMSI}$PrPd(allyl) 15 in CDCl$_3$

FIG.7 MALDI-TOF-MS spectrum of TEOSIPrPd(allyl) 16

$^1$H NMR spectrum of Ligand of Example 2 in THF

FIG. 9   $^1$H NMR spectrum of Example 2 in $C_6D_6$

FIG.10 $^1$H NMR spectrum of $^{TEOS}$IPrPd(cinnamyl) 19 in $C_6D_6$

FIG.11 MALDI-TOF-MS spectrum of ᵀᴱᴼˢIPrPd(cinnamyl) 19

ORTEP drawing of $^{TMS}$IPrPd(allyl) 15 with thermal ellipsoids shown at the 50% probability level Hydrogen atoms are omitted for clarity ORTEP drawing of ᵀᴱᴼˢIPrPd(allyl) 16 with thermal ellipsoids shown at the 50% probability level Hydrogen atoms are omitted for clarity FIG.14 ORTEP drawing of ᵀᴹˢIPrPd(allyl) 15 and ᵀᴱᴼˢIPrPd(allyl) 16 with thermal ellipsoids shown at the 50% probability level Hydrogen atoms are omitted for clarity

ORGANOMETALLIC COMPLEX CATALYST

TECHNICAL FIELD

The present invention relates to an organometallic complex catalyst for use in a cross-coupling reaction. More specifically, the present invention relates to an organometallic complex catalyst for use in a cross-coupling reaction which has a ligand having a nitrogen-containing heterocyclic carbene structure.

BACKGROUND ART

Aromatic amines are widely used in medicines, pesticides and electronic materials.

As methods for synthesizing the aromatic amines, a method for synthesizing through a C—N coupling reaction by using a palladium complex catalyst has been reported (for example, Non-Patent Documents 1 to 3).

Furthermore, in order to proceed the C—N coupling reaction more efficiently, there has been proposed a Pd complex catalyst having a ligand which contains a structure of nitrogen-containing heterocyclic carbene (N-Heterocyclic Carbene, hereinafter referred to as "NHC", as occasion demand).

The ligand containing the structure of the NHC was firstly isolated as crystalline NHC by Arduengo et al. in 1991, and its structure was confirmed by X-ray crystal structure analysis (see, for example, Non-Patent Document 4, and the following chemical formula (P1)).

[Chem. 1]

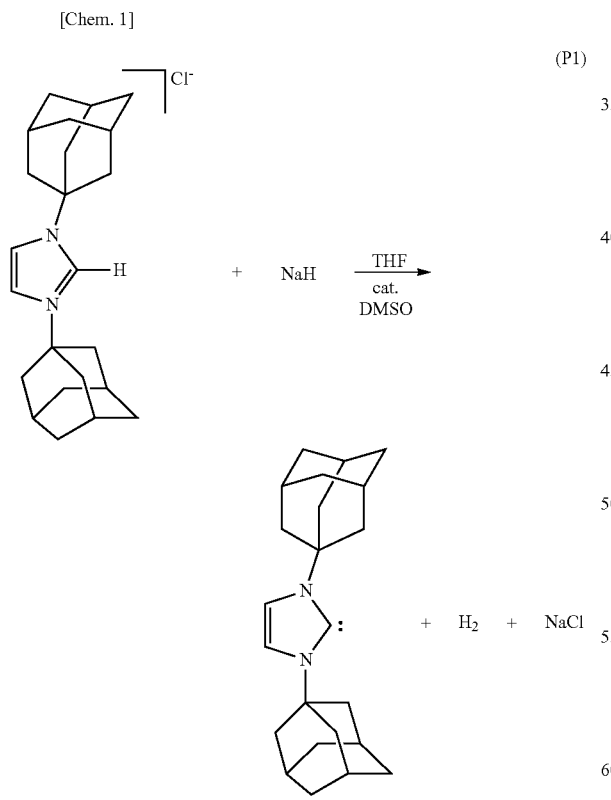

(P1)

[In the (P1), the cat. represents a predetermined catalyst, THF represents tetrahydrofuran, DMSO represents dimethyl sulfoxide.]

It has been known that the Pd complex catalyst having the ligand containing the structure of the NHC (hereinafter referred to as "NHC—Pd complex catalyst", as occasion demand) has a high capability of coordinating to palladium because the NHC has a strong σ donor property and a weak π acceptor property, and is stable to air and water in the complex state. In addition, many examples which were used as catalysts for various cross-coupling reactions and showed very high performance in the activity have been reported.

As the NHC—Pd complex catalyst, for example, an NHC—Pd complex catalyst named "PEPPSI" by Organ et al. in 2005 has been proposed (for example, Non-Patent Document 5). This PEPPSI is useful as a coupling reaction catalyst, and is used in many reactions including the Suzuki coupling reaction (see, for example, Non-Patent Documents 6 to 8 and the following chemical formula (P2)).

[Chem. 2]

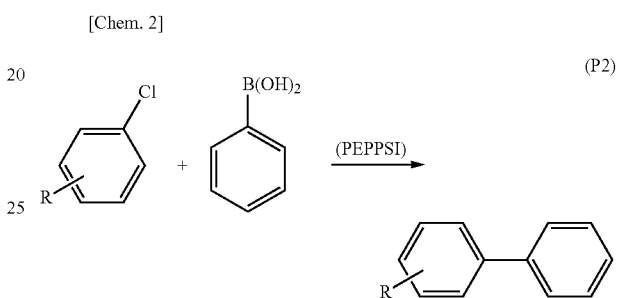

(P2)

[In the (P2), R represents a hydrocarbon group (including a hydrocarbon group consisting of carbon and hydrogen, a hydrocarbon group containing an —NH$_2$ group, an —SH group, and an —OH group), an —NH$_2$ group, an —SH group and an —OH group, the "PEPPSI" is an abbreviation of Pyridine Enhanced Precatalyst Preparation Stabilization Initiation, and has a chemical structure represented by the following formula (P3).]

[Chem. 3]

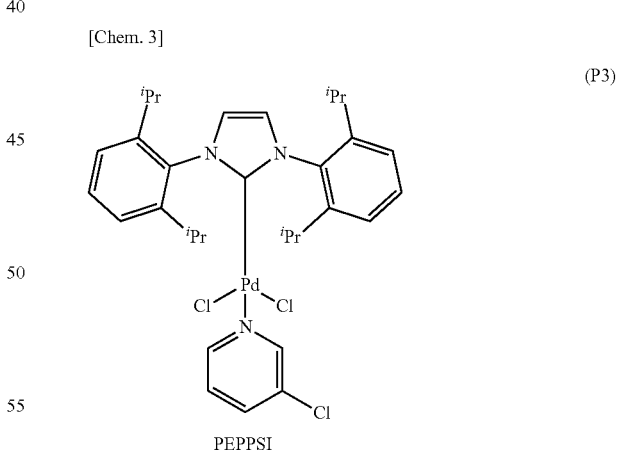

(P3)

PEPPSI

Here, in the present description, the "$^i$Pr" represents an isopropyl group.

Furthermore, various NHC—Pd complex catalysts have been proposed by Nolan et al. in 2006. For example, it has been reported that, when an NHC—Pd complex catalyst ("IPrPd (allyl)") represented by the following formula (P4) was used, for example, as a catalyst for C—N coupling reaction represented by the following formula (P6), even at room temperature, the reaction proceeds well (see, for example, Non-Patent documents 9 to 10).

[Chem. 4]

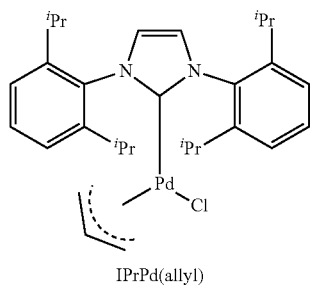

(P4)

IPrPd(allyl)

Here, in the present description, the "IPr" represents a ligand (1,3-bis(2,6-diisopropylphenyl)imidazol-2-ylidene) having an NHC structure represented by the following formula (P5).

[Chem. 5]

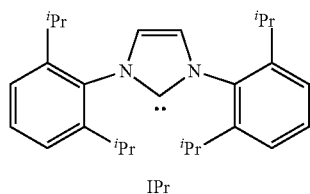

(P5)

IPr

[Chem. 6]

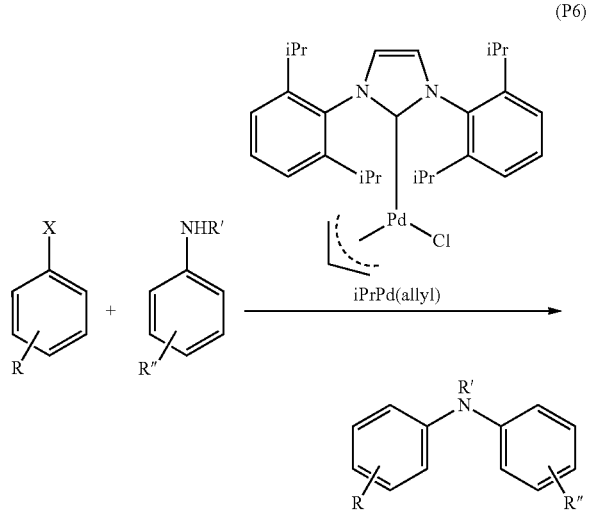

(P6)

[In the (P6), R, R' and R" may be the same as or different from each other, and a hydrocarbon group (including a hydrocarbon group consisting of carbon and hydrogen, a hydrocarbon group containing an —NH$_2$ group, an —SH group and an OH group), an —NH$_2$ group, an —SH group and an —OH group, the "'Bu" represents tert-butyl group (tertiary butyl group)]. Incidentally, the present applicant submits, as publications where the above-mentioned publicly-known inventions are described, the following publications:

PRIOR ART DOCUMENT

Non-Patent Document

Non-Patent Document 1: Kosugi, M., Kameyama, M., Migita. T. Chem. Lett. 1983, 927
Non-Patent Document 2: Guram, A. S., Rennels, R. A., Buchwald, S. L. Angew. Chem., Int. Ed. Engl. 1995, 34, 1348
Non-Patent Document 3: Louie, J., Hartwig, J. F. Tetrahedron Lett. 1995, 36(21), 3609
Non-Patent Document 4: Louie, J., Arduengo, A. J. Am. Chem. Soc. 1991, 113,
Non-Patent Document 5: Organ, M. G. Rational catalyst design and its application in sp$^3$-sp$^3$ couplings. Presented at the 230th National Meeting of the American Chemical Society, Washington, D.C., 2005; Abstract 308.
Non-Patent Document 6: Organ, M. G., Avola, S., Dubovyk, L., Hadei, N., Kantchev, E. A. B., OBrien, C., Valente, C. Chem. Eur. J. 2006, 12, 4749 Non-Patent Document 7: Ray, L., Shaikh, M. M., Ghosh, P. Dalton trans. 2007, 4546
Non-Patent Document 8: Obrien, C. J., Kantchev, E. A. B., Valente, C., Hadei, N., Chass, G. A., Lough, A., Hopkinson, A. C., Organ, M. G. Chem. Eur. J. 2006, 12, 4743
Non-Patent Document 9: Marion, M., Navarro, O., Stevens, J. M, E., Scott, N. M., Nolan, S. P. J. Am. Chem. Soc. 2006, 128, 4101
Non-Patent Document 10: Navarro, O., Marion, N., Mei, J., Nolan, S. P. Chem. Eur. J. 2006, 12, 5142

SUMMARY OF THE INVENTION

Problem to be Solved by the Invention

However, from the viewpoint of obtaining a higher yield of a desired product in the cross-coupling reaction, the present inventors have found that there is still room for improvement, even with the aforementioned catalysts of the prior arts.

The present invention has been made in view of such technical circumstances, and an object of the present invention is to provide an organometallic complex catalyst capable of obtaining a higher yield of a desired object than conventional catalysts in a cross-coupling reaction.

Another object of the present invention is to provide a ligand having a nitrogen-containing heterocyclic carbene structure which is a structural material of the organometallic complex catalyst of the present invention.

Furthermore, an object of the present invention is to provide a method for preparing an organometallic complex catalyst for cross-coupling reaction by using the ligand of the present invention.

Means to Solve the Problems

As a result of intensive studies to solve the aforementioned problems, the present inventors have found that it is effective that the organometallic complex catalyst has a structure represented by the following formula (1) where a substituent "—SiR$^1$R$^2$R$^3$" containing a silicon atom (hereinafter referred to as "silyl group" as occasion demand) is bonded to the carbon atom at the 4- or 5-position in the NHC structure of the imidazole ring (hereinafter referred to as "backbone carbon" as occasion demand).

Furthermore, with respect to the ligands where the silyl group is bonded to the carbon at the 4-position in the NHC structure of the imidazole ring, when comparing the electron-donating property to the central metal by measuring TEP values (Tolman electronic parameter) [cm$^{-1}$] obtained by an infrared spectroscopy, the present inventors have found that the organometallic complex catalyst containing the ligand which has a lower electron-donating property to the central metal than the IPr ligand (formula (P5)) is effective, and then the present invention has been completed.

More specifically, the present invention includes the following technical elements.

Namely, according to the present invention, it is possible to provide an organometallic complex catalyst for use in a cross-coupling reaction, which has a structure represented by the following formula (1).

[Chem. 7]

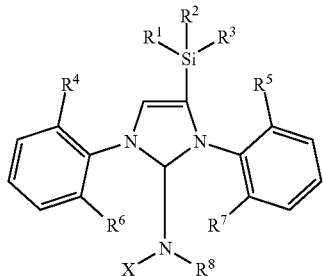

(1)

Here, in the formula (1), M is a coordination center and represents any one of metal atoms selected from the group consisting of Pd, Pt, Rh, Ru and Cu, or an ion thereof.

Further, $R^1$, $R^2$ and $R^3$ may be the same or different, and each represents at least one substituent selected from the group consisting of a hydrogen atom, an alkyl group, an alkoxy group, alkenyl group, an alkynyl group and an aryl group.

Furthermore, $R^4$, $R^5$, $R^6$ and $R^7$ may be the same or different, and each represents at least one substituent selected from a hydrogen atom, a halogen atom, an alkyl group, an alkoxy group, an alkenyl group, an alkynyl group, an aryl group, a hydroxy group, hydroxylate group, a thiocarboxyl group, a dithiocarboxyl group, a sulfo group, a sulfino group, an oxycarbonyl group, a carbamoyl group, a hydrazinocarbonyl group, an amidino group, a cyano group, an isocyano group, a cyanato group, an isocyanato group, a thiocyanato group, an isothiocyanato group, a formyl group, an oxo group, a thioformyl group, a thioxo group, a mercapto group, an amino group, an imino group, a hydrazino group, an aryloxy group, a sulfide group, a nitro group and a silyl group.

Further, in the formula (1), X represents a halogen atom which is capable of coordinating to the coordination center M.

Furthermore, $R^8$ represents a substituent having a π bond and 3 to 20 carbon atoms which is capable of coordinating to the coordination center M.

Provided that, with regard to electron-donating property with respect to the coordination center M, $R^1$, $R^2$, $R^3$, $R^4$, $R^5$, $R^6$ and $R^7$ are so combined and arranged that a TEP value (Tolman electronic parameter) [cm$^{-1}$] obtained by an infrared spectroscopy of a ligand having a nitrogen-containing heterocyclic carbene structure represented by the following formula (2) which contains $R^1$ to $R^7$, sifts toward a high frequency side compared to the TEP value [cm$^{-1}$] of a ligand represented by the formula (2-1).

[Chem. 8]

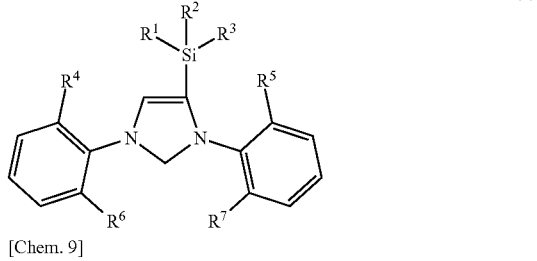

(2)

[Chem. 9]

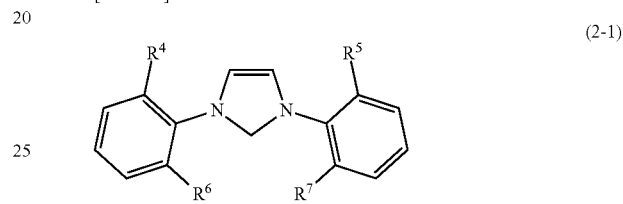

(2-1)

Here, in the formula (2), $R^1$, $R^2$, $R^3$, $R^4$, $R^5$, $R^6$ and $R^7$ represent the same substituents as $R^1$, $R^2$, $R^3$, $R^4$, $R^5$, $R^6$ and $R^7$ in the formula (1).

Further, in the formula (2-1), $R^4$, $R^5$, $R^6$ and $R^7$ represent the same substituents as $R^4$, $R^5$, $R^6$ and $R^7$ in the formula (1).

The organometallic complex catalyst of the present invention having the aforementioned constitution can give a higher yield of the desired product than the conventional catalysts such as the NHC—Pd complex catalyst exemplified in Non-Patent Documents 1 to 10 mentioned above in the cross-coupling reaction.

Though the detailed mechanism by which the organometallic complex catalyst of the present invention can obtain a high yield of the desired product has not been found, the present inventors speculate as follows.

Namely, the present inventors speculate that, though the conventional catalysts have the structure where a hydrogen atom is bonded to the backbone carbon at the 4- or 5-position in the structure of NHC of the imidazole ring (structure of IPr ligand (formula (P5)), the organometallic complex catalyst of the present invention has the structure where the aforementioned silyl group (—SiR$^1$R$^2$R$^3$) is bonded to the backbone carbon at the 4- or 5-position in the structure of NHC, and the difference may contribute to the improvement of the yield of the desired product.

In addition, as described later, the present inventors measured the TEP value obtained by an infrared absorption spectrum with respect to a Rh carbonyl complex where the portion of the -MR$^8$X of the organometallic complex of the present invention is substituted by —Rh(CO)$_2$Cl.

As a result, the present inventors have found that among the ligands represented by the formula (2), the organometallic complex catalyst having the ligand which has the TEP value shifted to a higher wave number side than the IPr ligand (formula (P5)), i.e., the ligand having a lower electron donating property than the IPr ligand (formula (P5)) can give a higher yield of the desired product than the conventional catalysts such as the NHC—Pd complex catalyst (IPrPd (allyl)) represented by the formula (P4).

Then, based on these results, the present inventors believe that, when having the structure where the silyl group (—SiR$^1$R$^2$R$^3$) is bonded to the backbone carbon at the 4- or 5-position in the NHC structure of the imidazole ring, and the structure where the TEP value satisfies the conditions described above, since the organometallic complex catalyst becomes relatively bulky, and the catalytically active species M° (zero valence) in the catalytic reaction are prevented from deactivation due to origomerization to improve the life of the catalyst, the desired product can be obtained in high yield (see, for example, Example 1 and Example 2 described later).

In the organometallic complex of the present invention, it is preferable that the TEP value [cm$^{-1}$] of the ligand having the nitrogen-containing heterocyclic carbene structure represented by the following formula (2) is a value calculated from a stretching frequency [cm$^{-1}$] of a carbonyl group obtained from an infrared absorption spectrum measured on an Rh carbonyl complex represented by the following formula (1-1), which is a complex where, in the formula (1), the portion of the -MR$^8$X is substituted by —Rh(CO)$_2$Cl.

[Chem. 10]

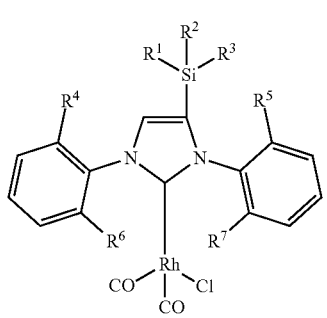

(1-1)

In this case, the TEP value can be obtained according to the following equation (E1).

[Eq. 1]

$$TEP[\text{cm}^{-1}] = v_{CO}^{av/Ni}[\text{cm}^{-1}] \approx 0.8001 v_{CO}^{av/Rh}[\text{cm}^{-1}] + 420.0[\text{cm}^{-1}] \quad (E1)$$

Here, in the equation (E1), the $v_{CO}^{av/Rh}$ represents an arithmetic mean value calculated from a stretching frequency [cm$^{-1}$] of the carbonyl group obtained from the infrared absorption spectrum measured on the Rh carbonyl complex, and the $v_{CO}^{av/Ni}$ represents an arithmetic mean value [cm$^{-1}$] (=TEP value [cm$^{-1}$]) calculated from a stretching frequency of the carbonyl group obtained from the infrared absorption spectrum measured on the Ni carbonyl complex.

In the present invention, as a method of evaluating the electron donating property to the central metal of the ligand which contains the NHC structure of the organometallic complex catalyst by employing the TEP value calculated according to the above equation (E1), the method described in the Non-Patent document "T. Droge and F. Glorius, Angew. Chem. Int. Ed., 2010, 49, 6940" is employed.

The TEP value (Tolman electronic parameter) is originally the stretching frequency of the carbonyl group obtained from the infrared absorption spectrum of a Ni carbonyl complex where the coordination center is Ni. However, the Ni carbonyl complex is so toxic that it is difficult for a measuring person to carry out the measuring procedures of the infrared absorption spectrum. Thus, by using the stretching frequency of the carbonyl group obtained from the infrared absorption spectrum of the Rh carbonyl complex and the equation (E1) in this way, it is possible for the measuring person to carry out the measuring procedures of the infrared absorption spectrum in the environment where the safety is improved.

Further, from the viewpoint of obtaining the effects of the present invention more reliably, the organometallic complex catalyst of the present invention is preferably used in a C—N cross-coupling reaction.

Furthermore, from the viewpoint of obtaining the effect of the present invention more reliably, it is preferable that the organometallic complex catalyst of the present invention has a structure represented by the following formula (3), the formula (4) or the formula (5).

[Chem. 11]

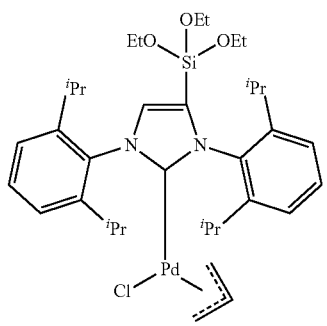

(3)

[Chem. 12]

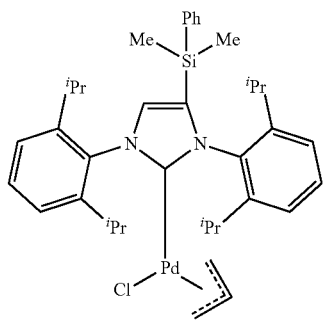

(4)

-continued

[Chem. 13]

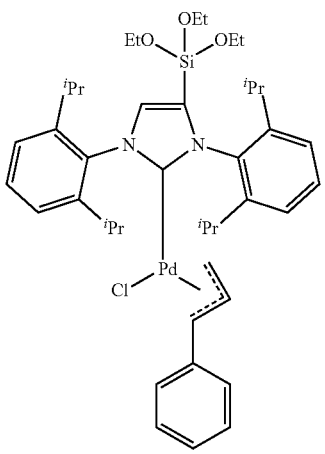

(5)

Here, in the formulae (3) to (5) $^i$Pr represents an isopropyl group, in the formula (4) Me represents methyl group, Ph represents phenyl group, in the formula (3) and the formula (5) OEt represents ethoxide group.

Further, the present invention provides a ligand which has a nitrogen-containing heterocyclic carbene structure represented by the following formula (2) and is a structural material of an organometallic complex catalyst for use in a cross-coupling reaction having a structure represented by the following formula (1).

[Chem. 14]

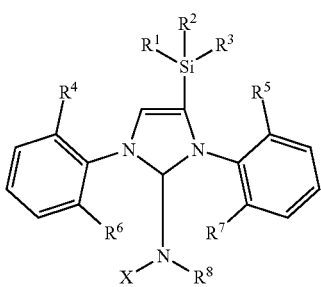

(1)

[Chem. 15]

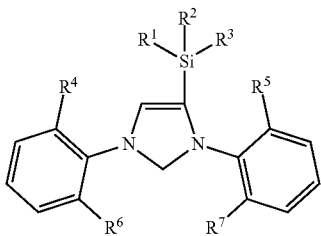

(2)

Here, in the formula (1) and the formula (2), M is a coordination center and represents any one of metal atoms selected from the group consisting of Pd, Pt, Rh, Ru and Cu, or an ion thereof.

$R^1$, $R^2$ and $R^3$ may be the same or different, and each represents at least one substituent selected from the group consisting of a hydrogen atom, an alkyl group, an alkoxy group, alkenyl group, an alkynyl group and an aryl group.

$R^4$, $R^5$, $R^6$ and $R^7$ may be the same or different, and each represents at least one substituent selected from a hydrogen atom, a halogen atom, an alkyl group, an alkoxy group, an alkenyl group, an alkynyl group, an aryl group, a hydroxy group, hydroxylate group, a thiocarboxyl group, a dithiocarboxyl group, a sulfo group, a sulfino group, an oxycarbonyl group, a carbamoyl group, a hydrazinocarbonyl group, an amidino group, a cyano group, an isocyano group, a cyanato group, an isocyanato group, a thiocyanato group, an isothiocyanato group, a formyl group, an oxo group, a thioformyl group, a thioxo group, a mercapto group, an amino group, an imino group, a hydrazino group, an aryloxy group, a sulfide group, a nitro group and a silyl group.

X represents a halogen atom which is capable of coordinating to the coordination center M.

$R^8$ represents a substituent having a π bond and 3 to 20 carbon atoms which is capable of coordinating to the coordination center M.

Provided that, with regard to electron-donating property with respect to the coordination center M, $R^1$, $R^2$, $R^3$, $R^4$, $R^5$, $R^6$ and $R^7$ are so combined and arranged that a TEP value (Tolman electronic parameter) [cm$^{-1}$] obtained by an infrared spectroscopy of a ligand having a nitrogen-containing heterocyclic carbene structure represented by the following formula (2) which contains $R^1$ to $R^7$, sifts toward a high frequency side compared to the TEP value [cm$^{-1}$] of a ligand represented by the formula (2-1).

[Chem. 16]

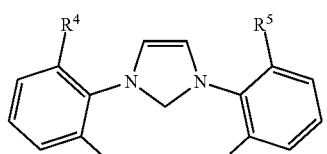

(2-1)

Here, in the formula (2-1), $R^4$, $R^5$, $R^6$ and $R^7$ represent the same substituents as $R^4$, $R^5$, $R^6$ and $R^7$ in the formula (1).

The ligand of the present invention is suitable to the constitutional material of the aforementioned organometallic complex catalyst of the present invention.

Since the ligand of the present invention has the structure where the silyl group (—SiR$^1$R$^2$R$^3$) is substituted by the hydrogen atom bonded to the backbone carbon at the 4- or 5-position in the 5-membered ring of the ligand having the NHC structure such as the IPr, the present inventors speculate that the catalyst becomes relatively bulky, and the catalytically active species M° (zero valence) in the catalytic reaction are prevented from deactivation due to origomerization to improve the life of the catalyst (preferably C—N coupling reaction) can be promoted.

Further, in the organometallic complex of the present invention, it is preferable that the TEP value of the ligand having the nitrogen-containing heterocyclic carbene structure represented by the following formula (2) is a value calculated from a stretching frequency of a carbonyl group obtained from an infrared absorption spectrum measured on an Rh carbonyl complex represented by the following formula (1-1), which is a complex where, in the formula (1), the portion of the -MR$^8$X is substituted by —Rh(CO)$_2$Cl.

[Chem. 17]

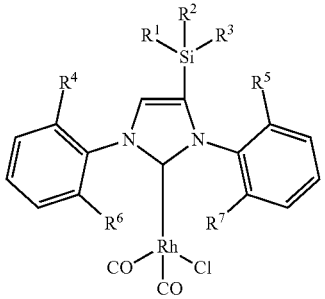

(1-1)

In this case, the TEP value can be obtained according to the aforementioned equation (E1).

Furthermore, the present invention can provide a method for preparing an organometallic complex catalyst for use in a cross-coupling reaction having a structure represented by the following formula (1), which includes:

a first step for synthesizing a ligand which has a nitrogen-containing heterocyclic carbene structure represented by the following formula (2), a second step for synthesizing a complex comprising the coordination center M in the formula (1) and a halogen X and a substituent $R^8$, and a third step for reacting the ligand having the NHC structure obtained by the first step and the complex obtained by the second step.

[Chem. 18]

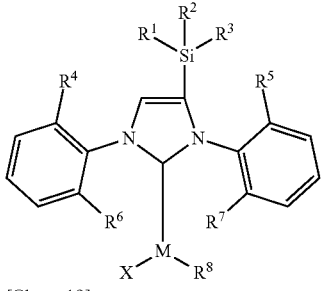

(1)

[Chem. 19]

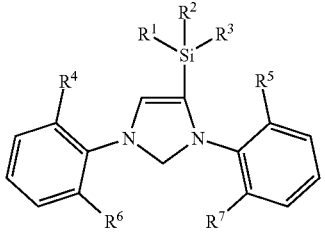

(2)

Here, in the formulae (1) and (2), M is a coordination center and represents any one of metal atoms selected from the group consisting of Pd, Pt, Rh, Ru and Cu, or an ion thereof.

$R^1$, $R^2$ and $R^3$ may be the same or different, and each represents at least one substituent selected from the group consisting of a hydrogen atom, an alkyl group, an alkoxy group, alkenyl group, an alkynyl group and an aryl group.

$R^4$, $R^5$, $R^6$ and $R^7$ may be the same or different, and each represents at least one substituent selected from a hydrogen atom, a halogen atom, an alkyl group, an alkoxy group, an alkenyl group, an alkynyl group, an aryl group, a hydroxy group, hydroxylate group, a thiocarboxyl group, a dithiocarboxyl group, a sulfo group, a sulfino group, an oxycarbonyl group, a carbamoyl group, a hydrazinocarbonyl group, an amidino group, a cyano group, an isocyano group, a cyanato group, an isocyanato group, a thiocyanato group, an isothiocyanato group, a formyl group, an oxo group, a thioformyl group, a thioxo group, a mercapto group, an amino group, an imino group, a hydrazino group, an aryloxy group, a sulfide group, a nitro group and a silyl group.

X represents a halogen atom which is capable of coordinating to the coordination center M.

$R^8$ represents a substituent having a π bond and 3 to 20 carbon atoms which is capable of coordinating to the coordination center M;

Provided that, with regard to electron-donating property with respect to the coordination center M, $R^1$, $R^2$, $R^3$, $R^4$, $R^5$, $R^6$ and $R^7$ are so combined and arranged that a TEP value (Tolman electronic parameter) [cm$^{-1}$] obtained by an infrared spectroscopy of a ligand having a nitrogen-containing heterocyclic carbene structure represented by the following formula (2) which contains $R^1$ to $R^7$, sifts toward a high frequency side compared to the TEP value [cm$^{-1}$] of a ligand represented by the formula (2-1).

[Chem. 20]

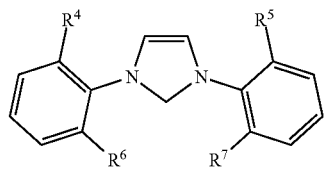

(2-1)

Here, in the formula (2-1), $R^4$, $R^5$, $R^6$ and $R^7$ represent the same substituents as $R^4$, $R^5$, $R^6$ and $R^7$ in the formula (1).

The present inventors have found that, in the process of preparing an organometallic complex catalyst, it is effective to solve the aforementioned problem by using the ligand having the structure of the NHC represented by formula (2), more specifically, the ligand (ligand of the present invention) having the structure where the silyl group (—SiR$^1$R$^2$R$^3$) is bonded to the backbone carbon at the 4- or 5-position in the NHC structure of the imidazole ring, and the structure where the TEP value satisfies the conditions described above in the first step.

According to the present invention, it is possible to provide a method for reliably preparing the organometallic complex catalyst for the cross-coupling reaction where the ligand is used, that is, the organometallic complex catalyst which can give the desired product in a higher yield than the conventional catalysts in the cross-coupling reaction.

Further, according to the method for preparation of the present invention, it is possible to prepare more easily and more reliably the organometallic complex catalyst for the cross-coupling reaction where the ligand of the present invention is used, that is, the organometallic complex catalyst of the present invention which can give the desired product in a higher yield than the conventional catalysts in the cross-coupling reaction.

According to the method for preparation of the present invention, it is possible to prepare the ligand of the present invention which has the structure where the silyl group is substituted by the hydrogen atom bonded to the backbone carbon at the 4- or 5-position in the 5-membered ring of the ligand having the NHC structure such as the IPr, and the structure where the TEP value satisfies the conditions described above.

Conventionally, though the synthesis of the ligand having the NHC structure where a hydrogen atom of the backbone carbon is substituted by another substituent requires a multistep synthesis step, in the method for preparation of the present invention, it is possible to synthesize, in relatively few synthesis steps and under relatively mild conditions, the ligand where the silyl group is bonded to the backbone carbon at the 4- or 5-position in high yield, on the basis of the ligand such as IPr etc. where a hydrogen atom is bonded to the backbone carbon at the 4- or 5-position. Moreover, in the method for preparation of the present invention, various types of silyl groups can be introduced into the hydrogen moiety which is bonded to the backbone carbon at the 4- or 5-position by changing the silicon reagent of the raw material.

For example, according to the method for preparation of the present invention, as shown in the following formula (C1), the synthesis steps required to prepare the final product (the organic Pd complex catalyst or the organic Rh complex catalyst having the ligand where a hydrogen on the backbone carbon of the ligand having the NHC structure is substituted by the silyl group) from IPr can be reduced to relatively few steps, i.e. three.

Effects of the Invention

According to the present invention, an organometallic complex catalyst capable of obtaining a higher yield of a desired object than conventional catalysts in a cross-coupling reaction can be provided.

Further, according to the present invention, a ligand having a nitrogen-containing heterocyclic carbene structure which is a structural material of the organometallic complex catalyst of the present invention which can obtain a higher yield of a desired object than conventional catalysts in a cross-coupling reaction can be provided.

Furthermore, according to the present invention, a method for more reliably preparing the organometallic complex catalyst for the cross-coupling reaction where the ligand of the present invention is used, that is, the organometallic complex catalyst which can give the desired product in a higher yield than the conventional catalysts in the cross-coupling reaction can be provided.

BRIEF DESCRIPTION OF THE DRAWINGS

FIG. 1 is a graph which shows the $^1$H NMR spectrums obtained with respect to the ligands having the NHC structure represented in the reaction formulae (R1) to (R3).

FIG. 2 is a graph which shows the $^1$H NMR spectrums obtained with respect to the ligands of "IPr" and "$^{TMS}$IPr" having the NHC structure.

[Chem. 21]

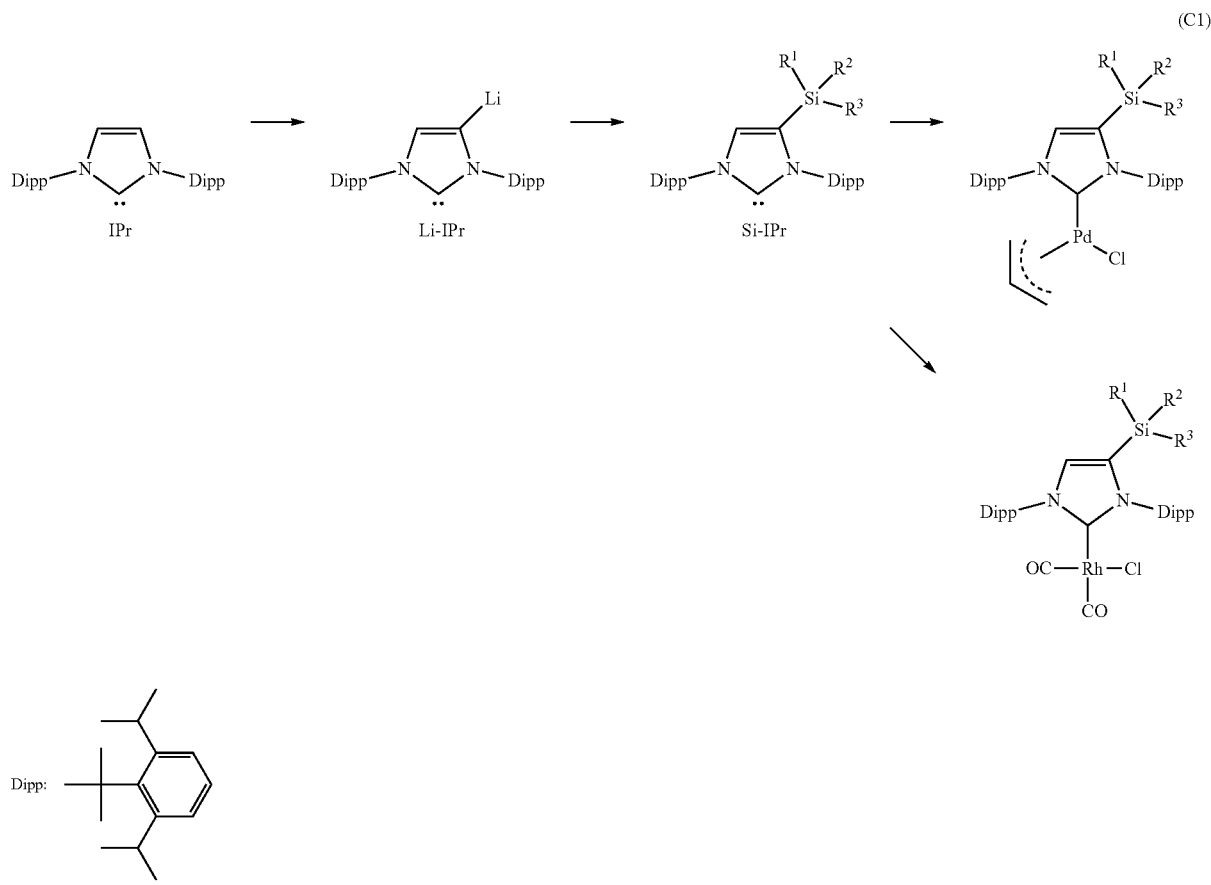

FIG. 3 is a graph which shows the ¹H NMR spectrum obtained with respect to the organometallic complex catalyst {$^{TMS}$IPrPd(allyl)} of Comparative Example 1.

Figure 4:
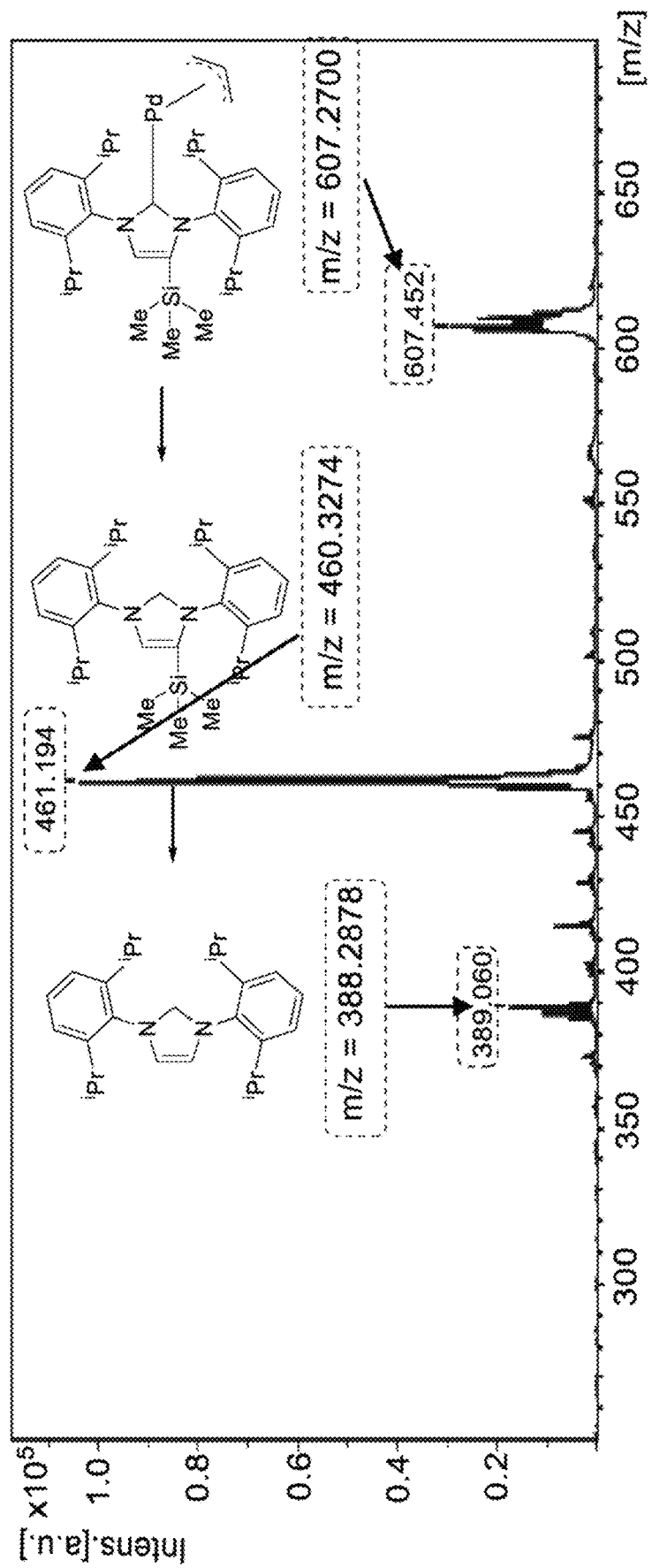

FIG. 4 is a graph which shows the MALDI-TOF-MS spectrum obtained with respect to the organometallic complex catalyst {$^{TMS}$IPrPd(allyl)} of Comparative Example 1.

Figure 5:
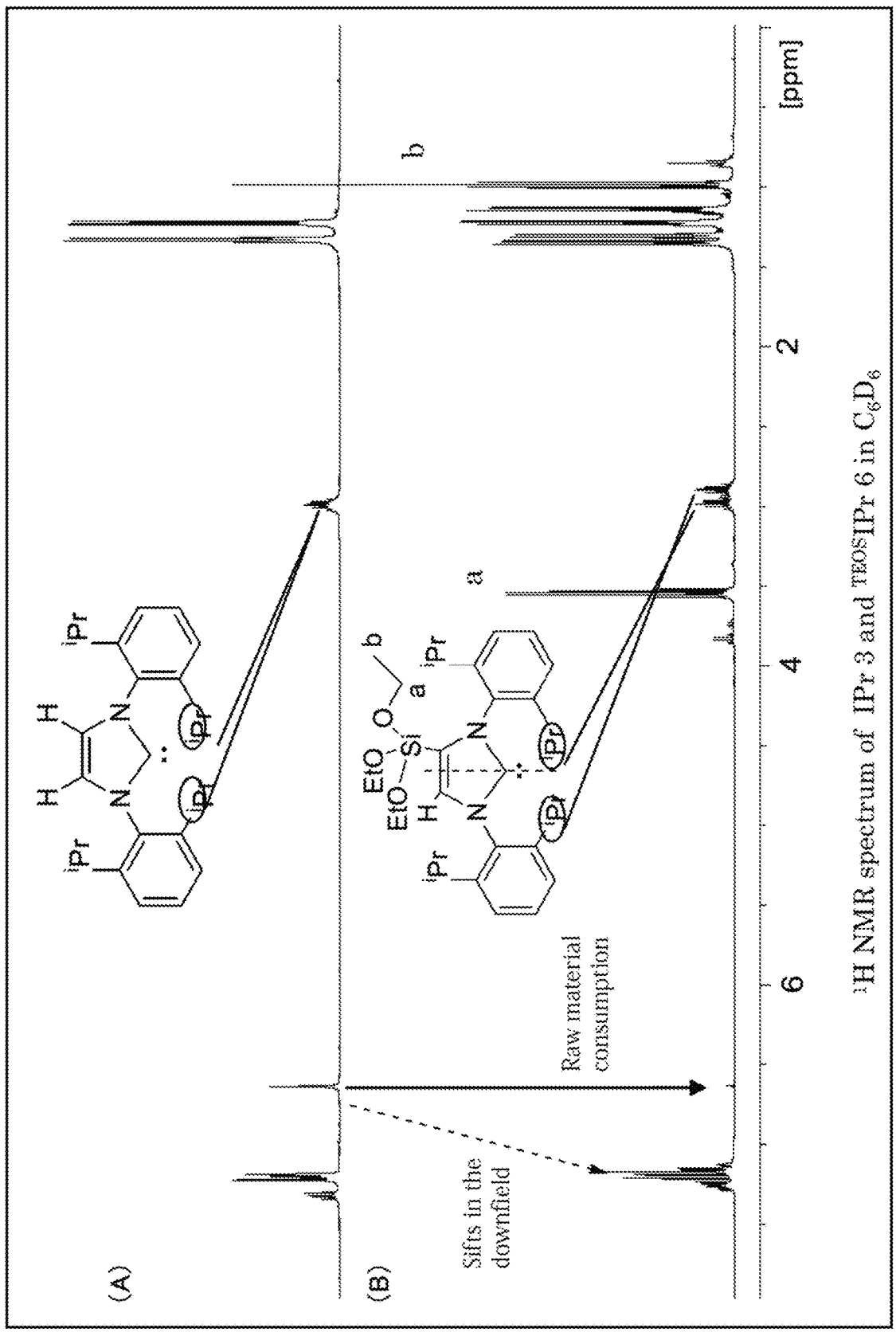

FIG. 5 is a graph which shows the ¹H NMR spectrums obtained with respect to the ligands of "IPr" and "$^{TEOS}$IPr" having the NHC structure.

Figure 6:
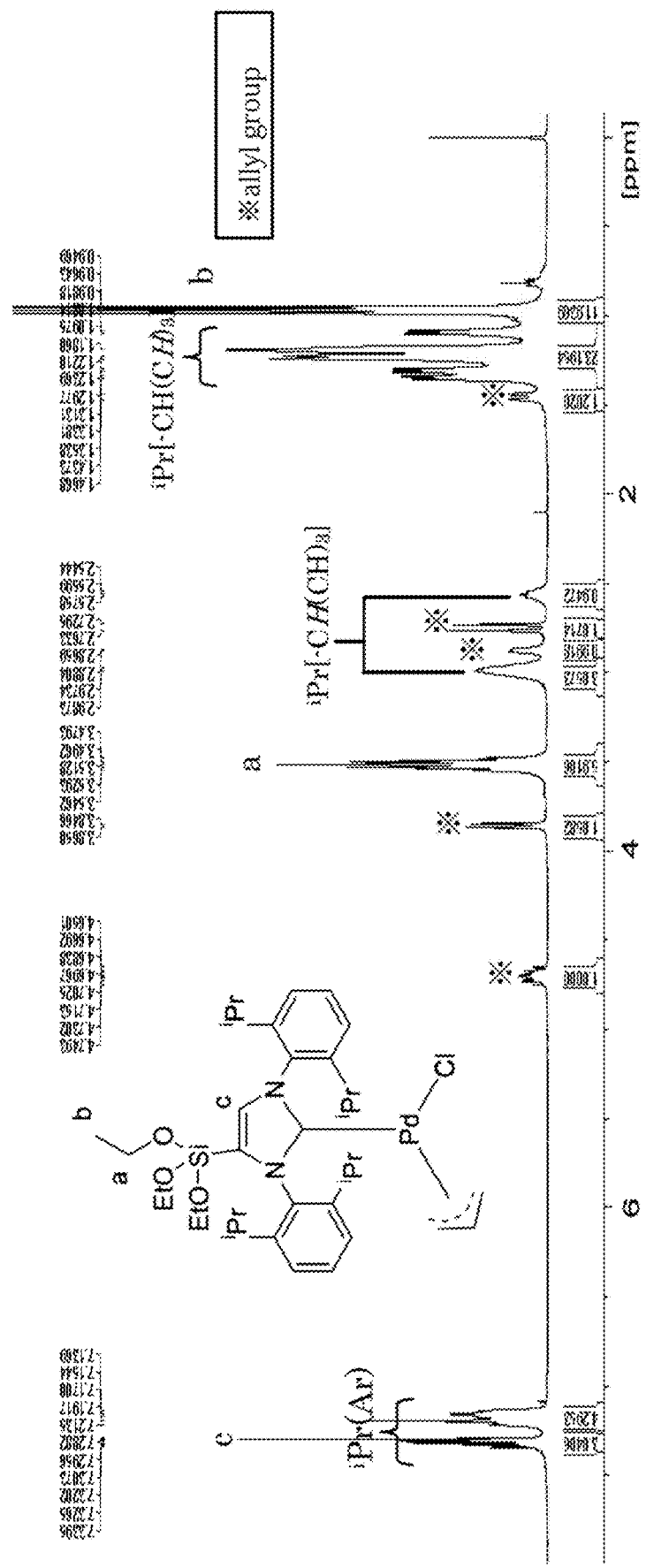

FIG. 6 is a graph which shows the ¹H NMR spectrum obtained with respect to the organometallic complex catalyst {$^{TEOS}$IPrPd(allyl)} of Example 1.

Figure 7:
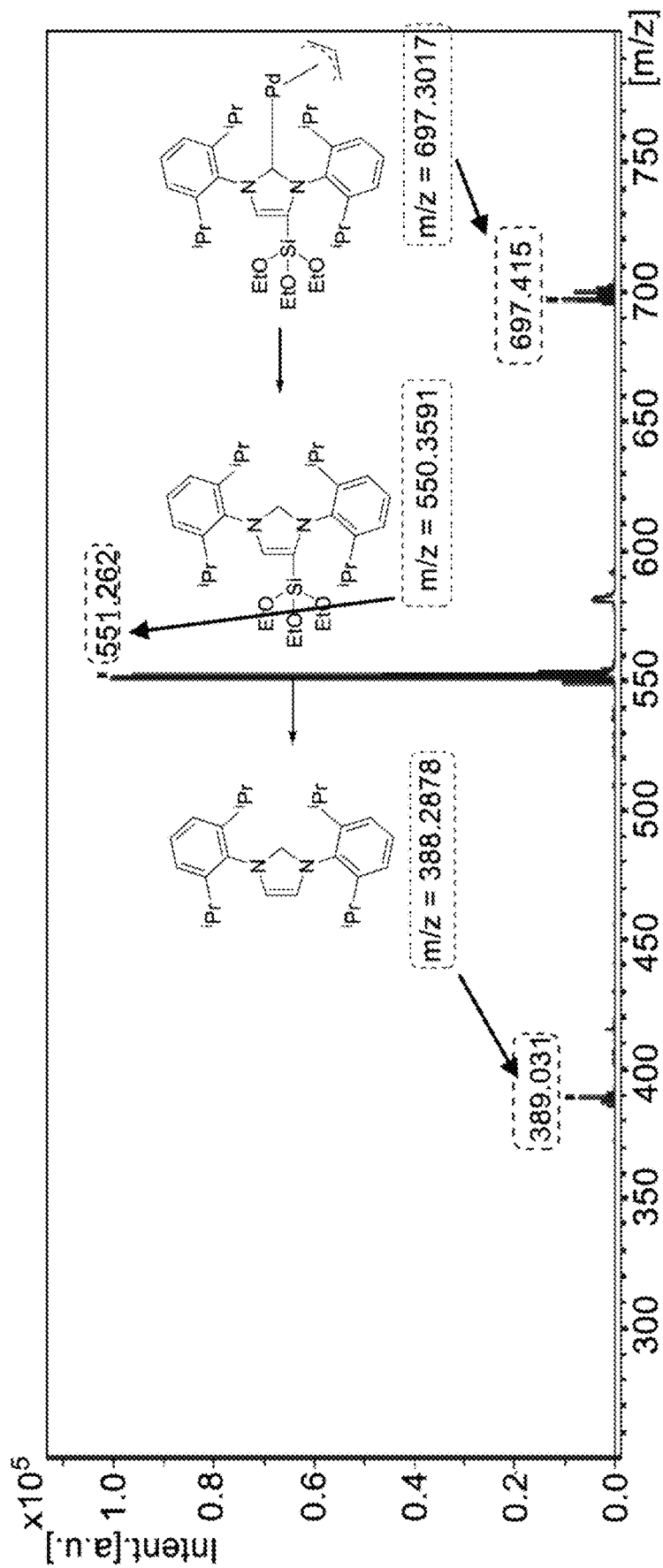

FIG. 7 is a graph which shows the MALDI-TOF-MS spectrum obtained with respect to the organometallic complex catalyst {$^{TEOS}$IPrPd(allyl)} of Example 1.

Figure 8:
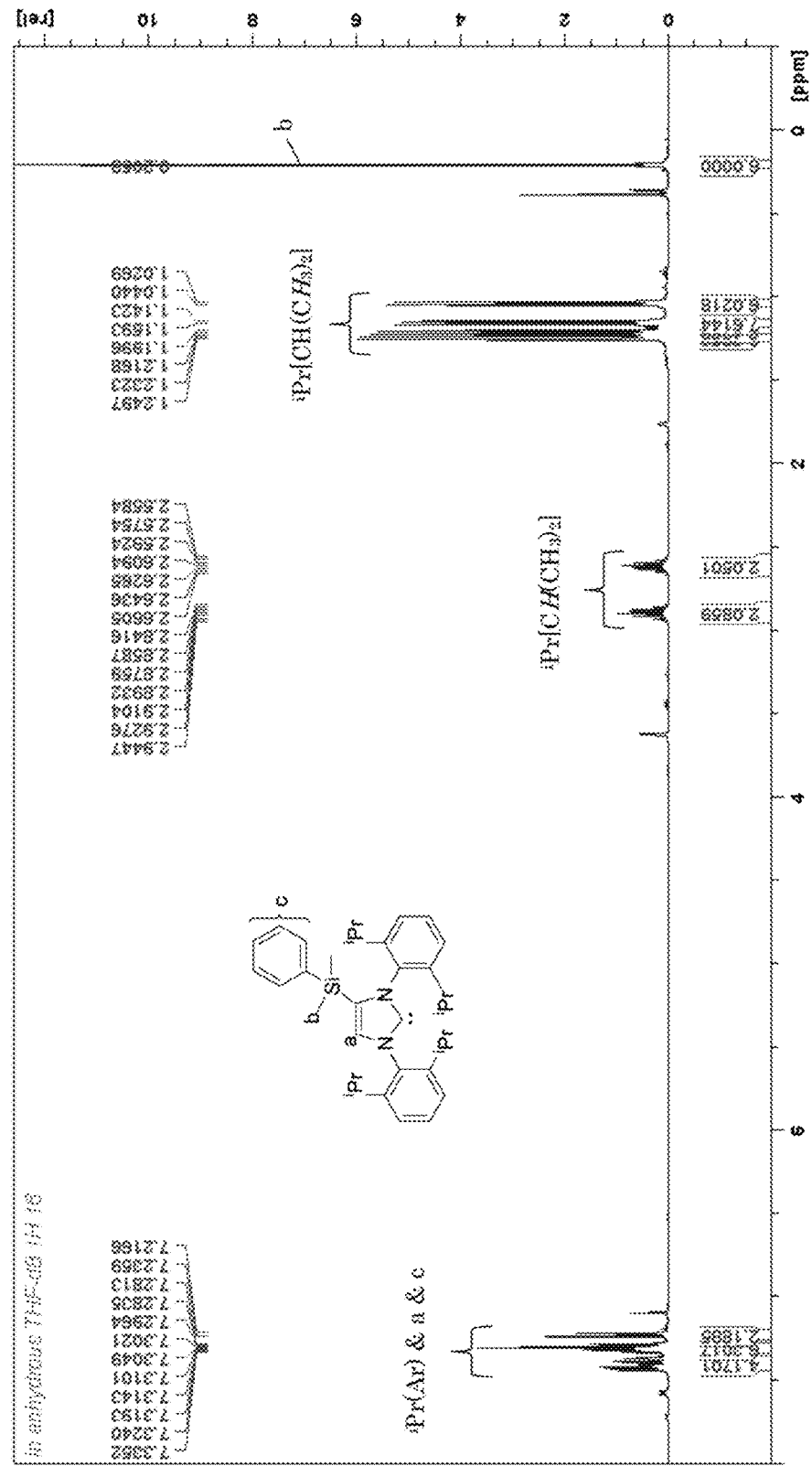

FIG. 8 is a graph which shows the ¹H NMR spectrum obtained with respect to the ligand having the NHC structure of the organometallic complex catalyst of Example 2.

Figure 9:
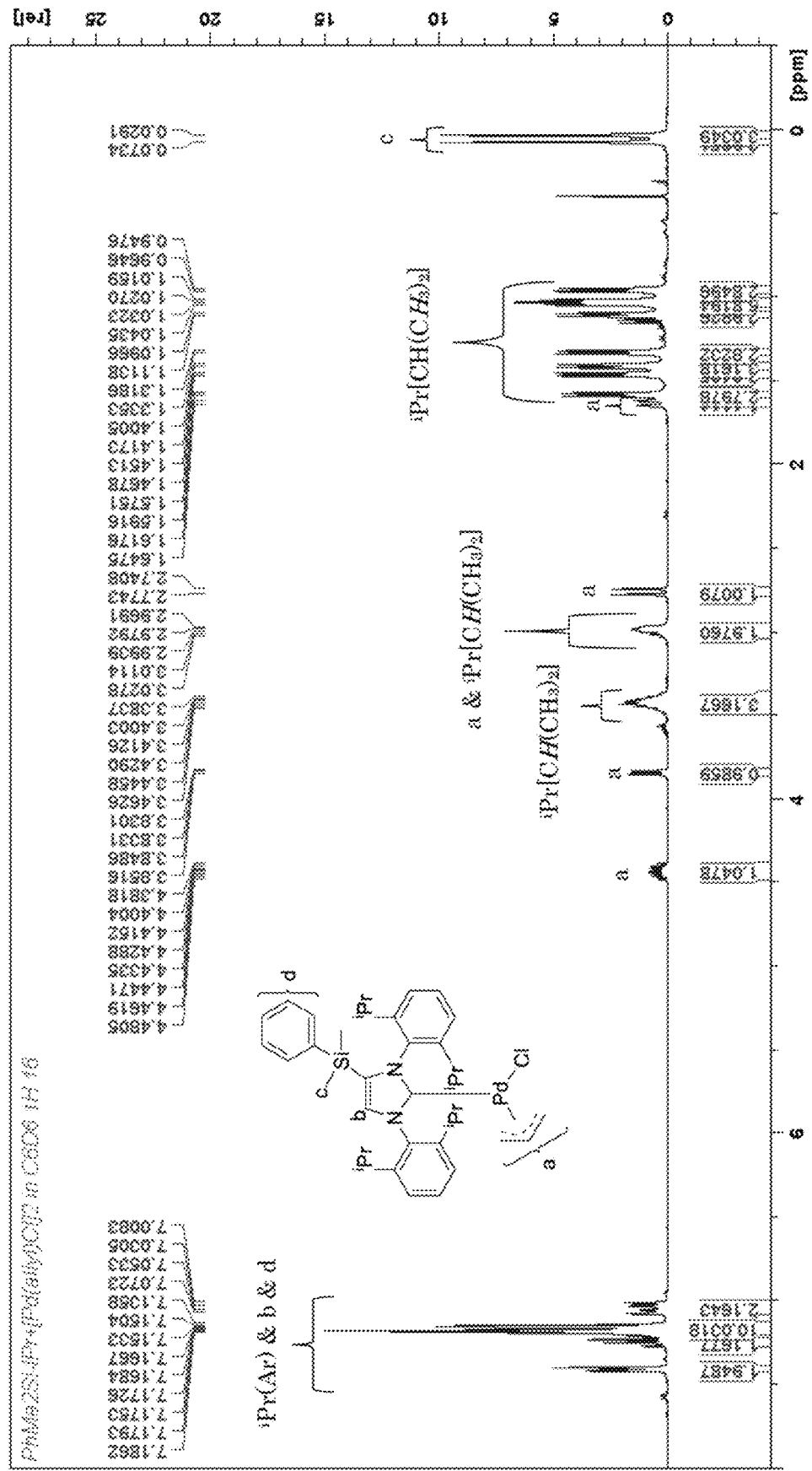

FIG. 9 is a graph which shows the ¹H NMR spectrum obtained with respect to the organometallic complex catalyst of Example 2.

Figure 10:
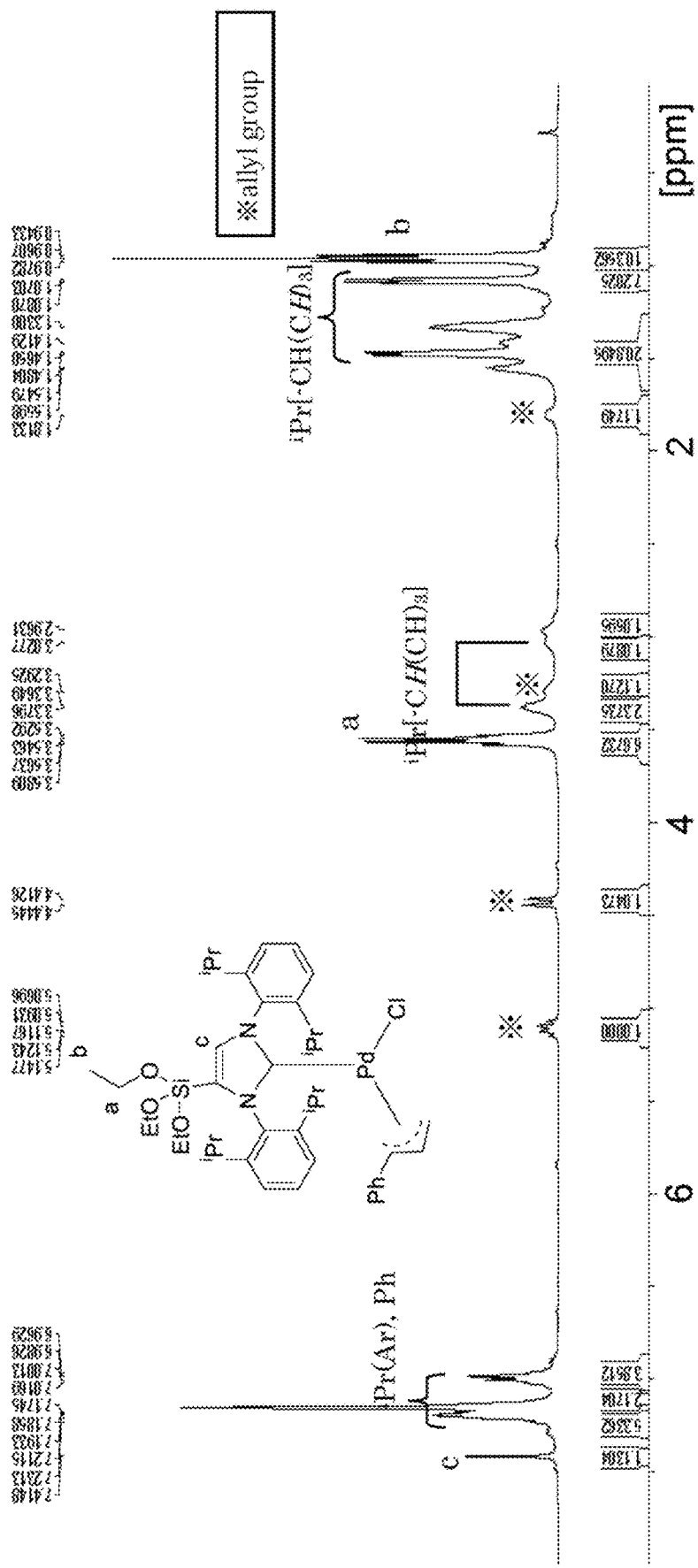

FIG. 10 is a graph which shows the ¹H NMR spectrum obtained with respect to the organometallic complex catalyst {$^{TEOS}$IPrPd(cinnamyl)} of Example 3.

Figure 11:
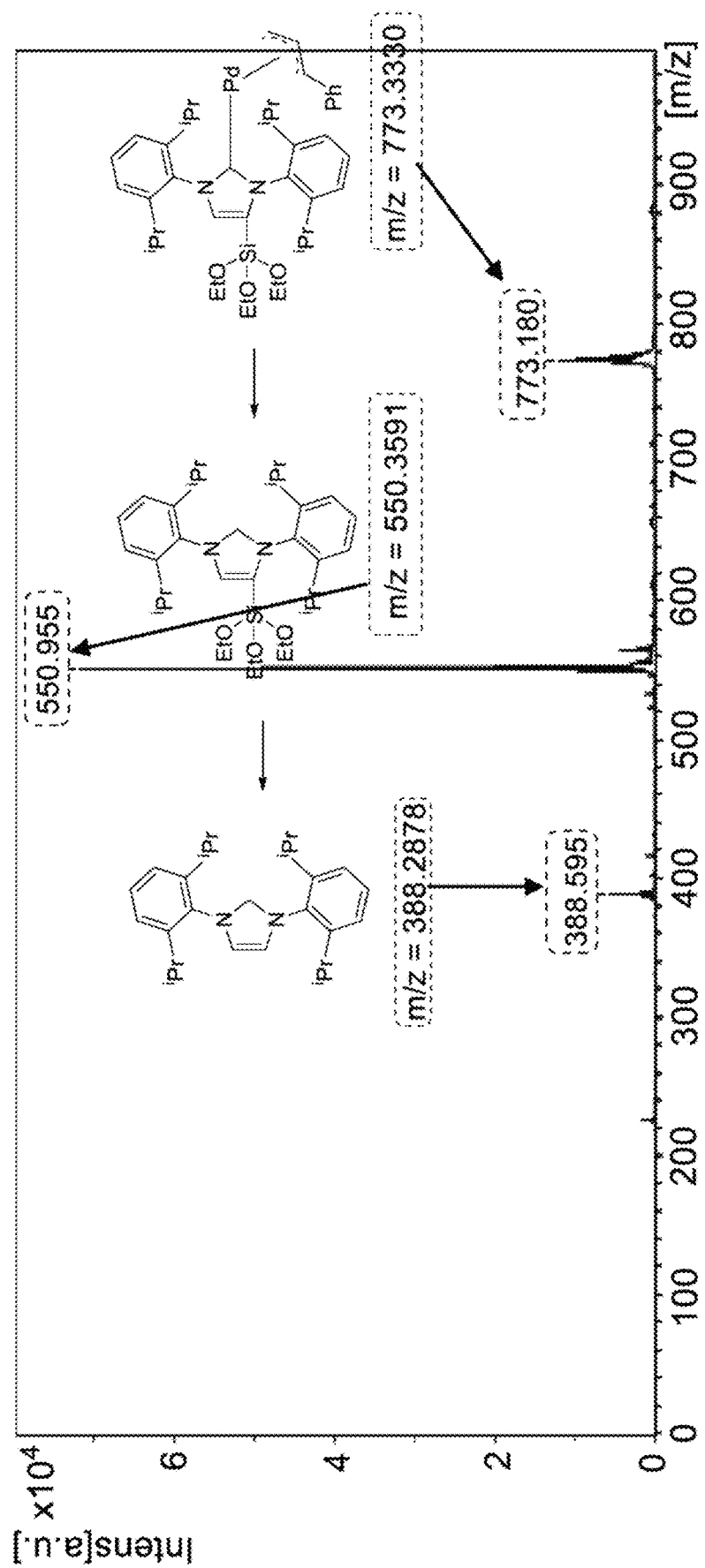

FIG. 11 is a graph which shows the MALDI-TOF-MS spectrum obtained with respect to the organometallic complex catalyst {$^{TEOS}$IPrPd(cinnamyl)} of Example 3.

Figure 12:
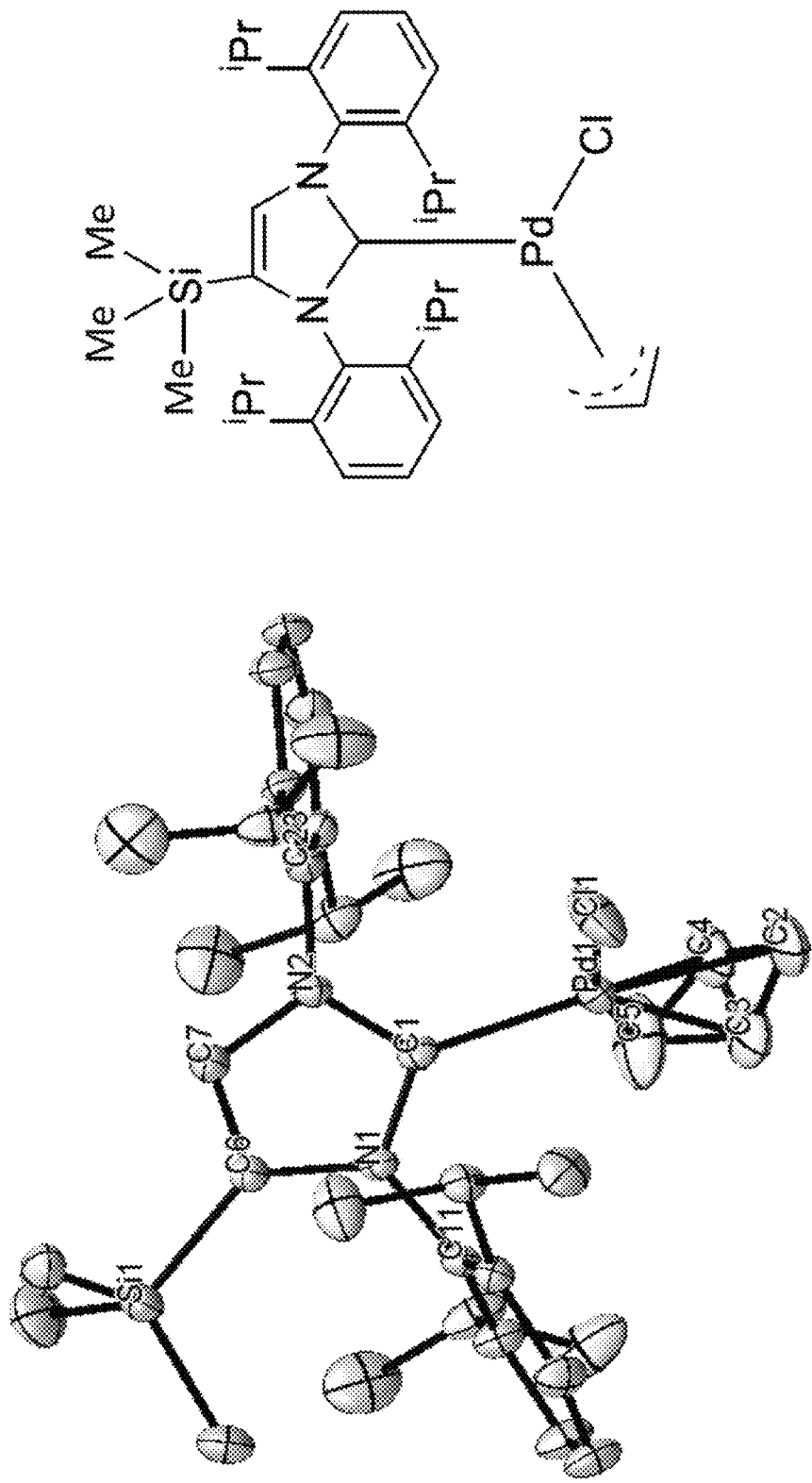

FIG. 12 is an ORTEP drawing obtained with respect to the organometallic complex catalyst {$^{TMS}$IPrPd(allyl)} of Comparative Example 1.

Figure 13:
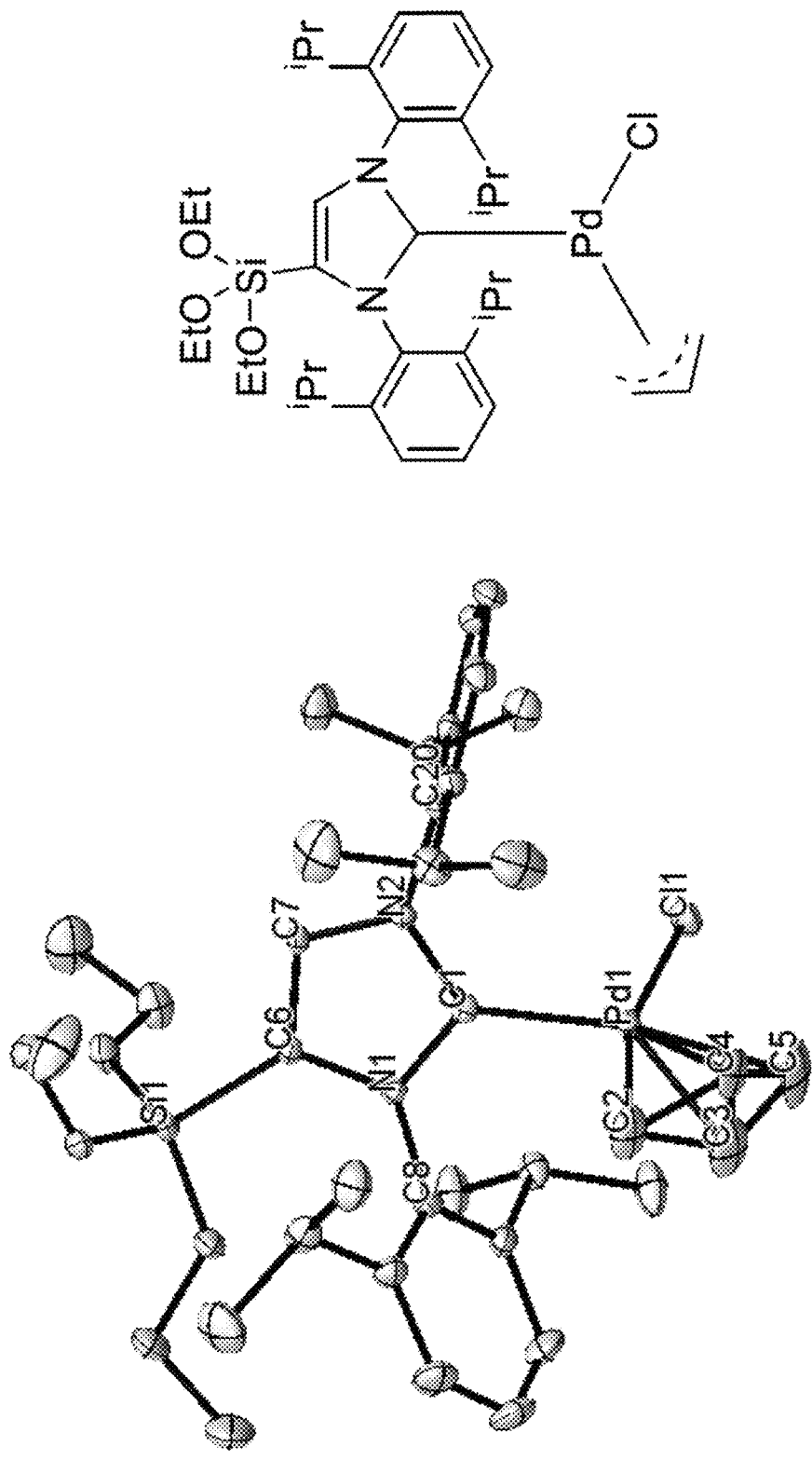

FIG. 13 is an ORTEP drawing obtained with respect to the organometallic complex catalyst {$^{TEOS}$IPrPd(allyl)} of Example 1.

Figure 14:
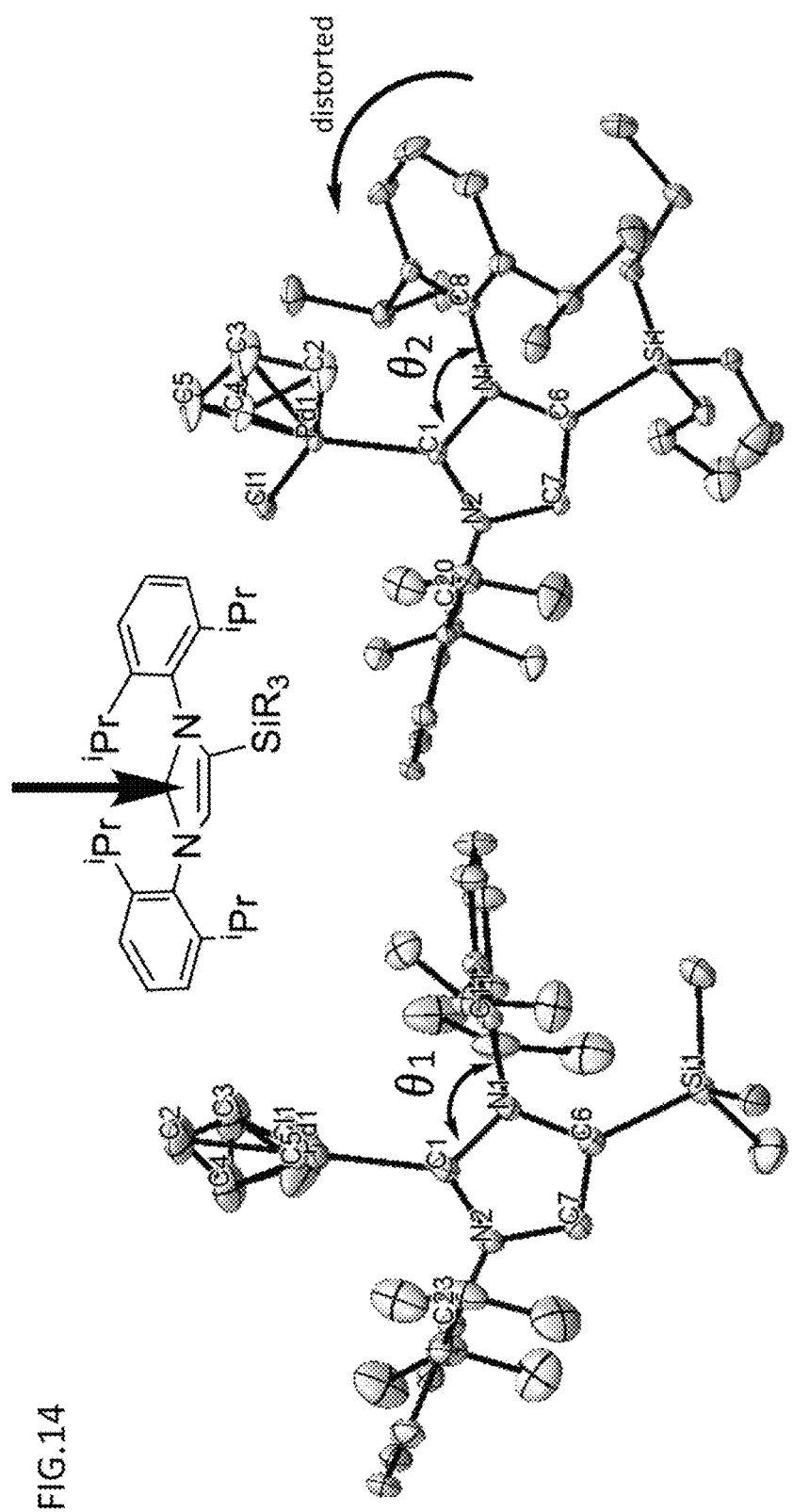

FIG. 14 is ORTEP drawings obtained with respect to the organometallic complex catalyst {$^{TEOS}$IPrPd(allyl)} of Example 1 and the organometallic complex catalyst {$^{TMS}$IPrPd(allyl)} of Comparative Example 1.

Figure 15:
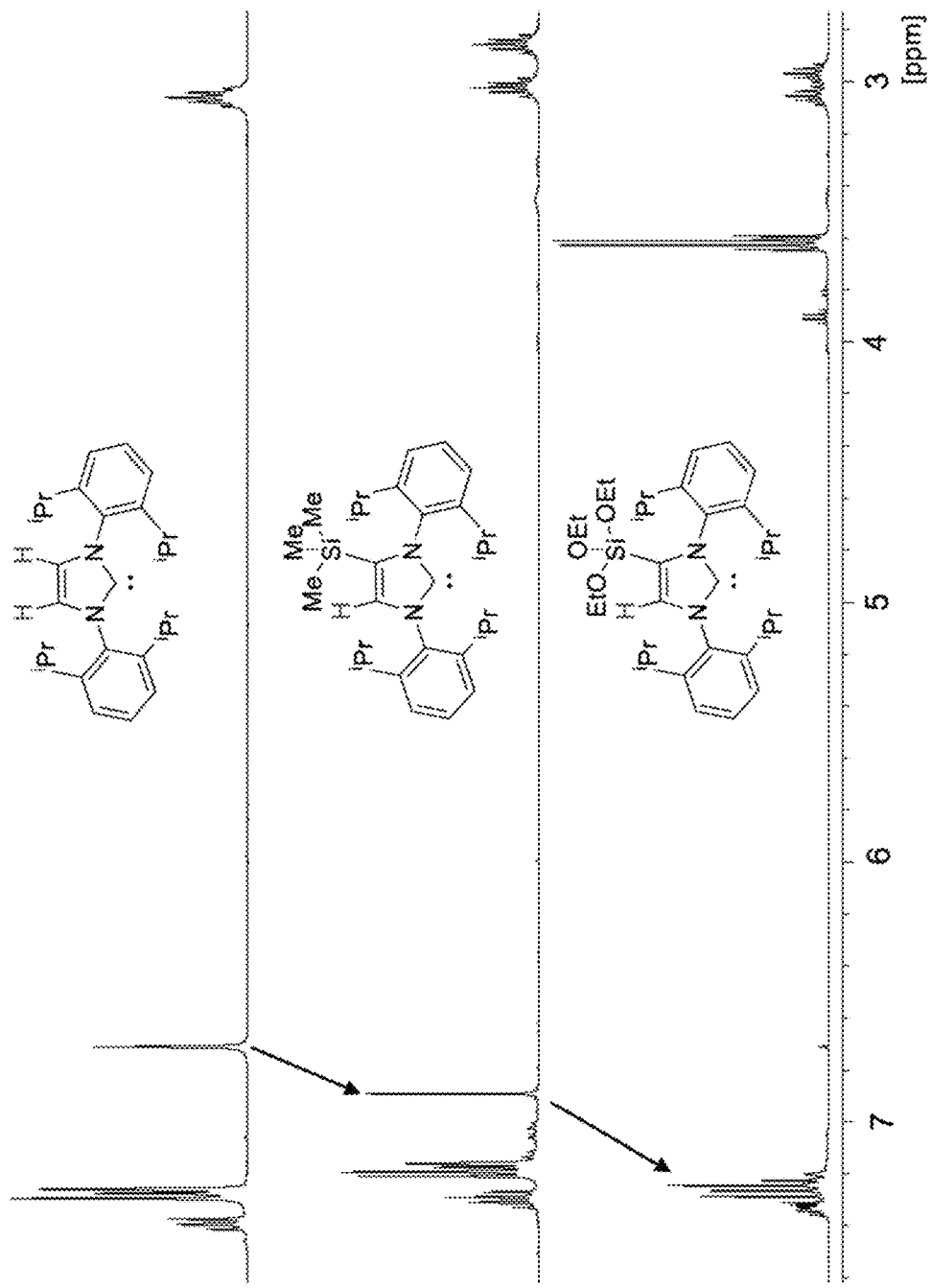

FIG. 15 is a graph which shows the ¹H NMR spectrums obtained with respect to IPr, $^{TMS}$IPr, $^{TEOS}$IPr.

Figure 16:
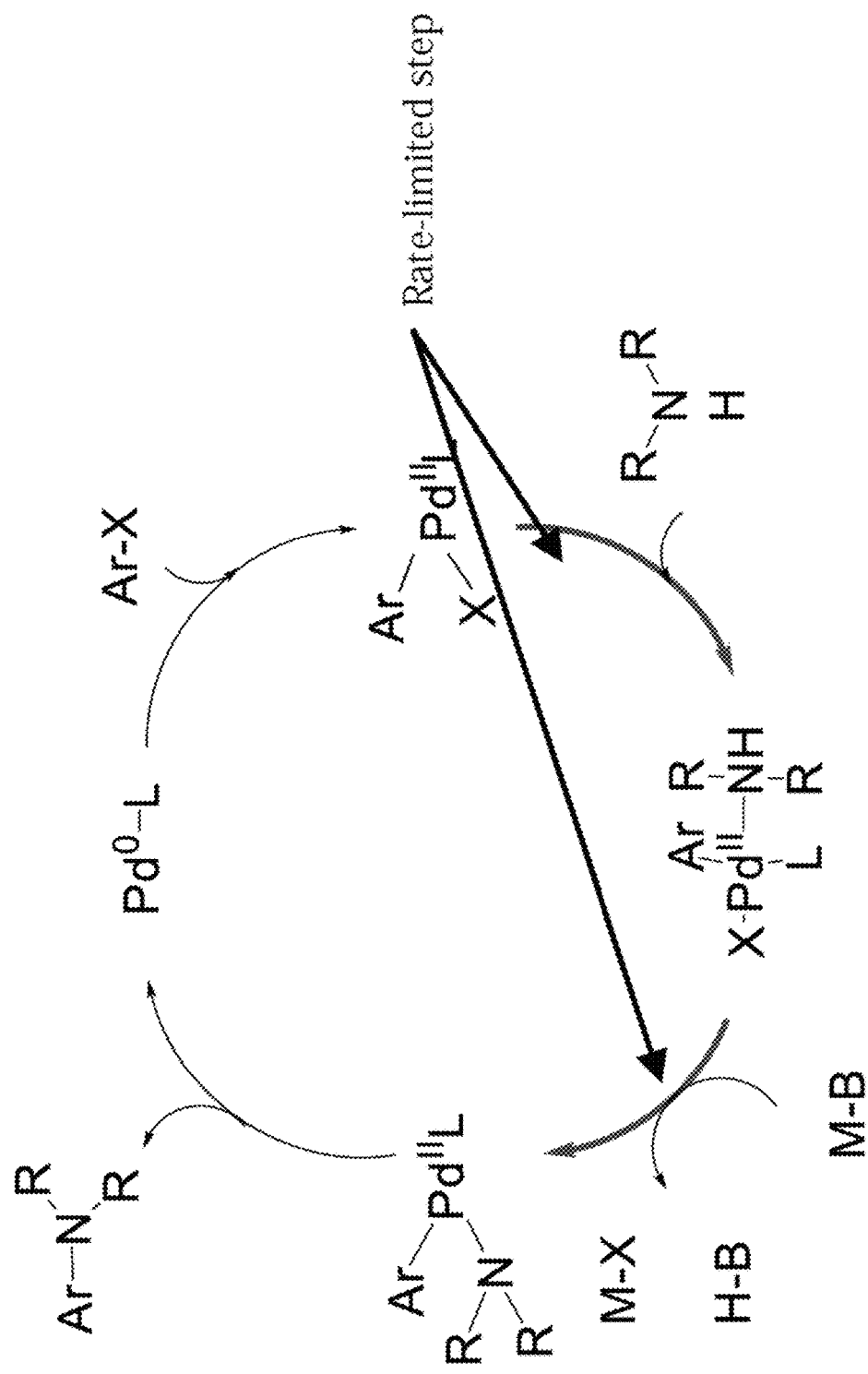

FIG. 16 is a conceptual diagram which shows the reaction mechanism clarified in the C—N coupling reaction where an organic Pd complex catalyst is used.

MODE FOR CARRYING OUT THE INVENTION

Preferable embodiments of the present invention are described in detail hereunder.

Configuration of Organometallic Complex Catalyst>

The organometallic complex catalyst of the present embodiment is an organometallic complex catalyst for use in a cross-coupling reaction, preferably a C—N cross-coupling reaction which has a structure represented by the following formula (1).

Further, the ligand of the present invention is a ligand which is a structural material of an organometallic complex catalyst of the present embodiment and has a nitrogen-containing heterocyclic carbene structure represented by the following formula (2).

[Chem. 22]

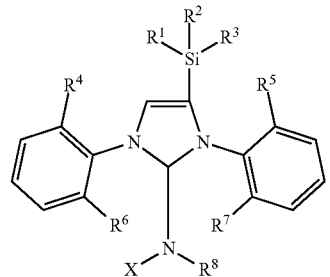

(1)

Here, in the formula (1), M is a coordination center and represents any one of metal atoms selected from the group consisting of Pd, Pt, Rh, Ru and Cu, or an ion thereof.

Further, $R^1$, $R^2$ and $R^3$ may be the same or different, and each represents at least one substituent selected from the group consisting of a hydrogen atom, an alkyl group, an alkoxy group, alkenyl group, an alkynyl group and an aryl group.

Furthermore, $R^4$, $R^5$, $R^6$ and $R^7$ may be the same or different, and each represents at least one substituent selected from a hydrogen atom, a halogen atom, an alkyl group, an alkoxy group, an alkenyl group, an alkynyl group, an aryl group, a hydroxy group, hydroxylate group, a thiocarboxyl group, a dithiocarboxyl group, a sulfo group, a sulfino group, an oxycarbonyl group, a carbamoyl group, a hydrazinocarbonyl group, an amidino group, a cyano group, an isocyano group, a cyanato group, an isocyanato group, a thiocyanato group, an isothiocyanato group, a formyl group, an oxo group, a thioformyl group, a thioxo group, a mercapto group, an amino group, an imino group, a hydrazino group, an aryloxy group, a sulfide group, a nitro group and a silyl group.

Further, in the formula (1), X represents a halogen atom which is capable of coordinating to the coordination center M.

Furthermore, $R^8$ represents a substituent having a π bond and 3 to 20 carbon atoms which is capable of coordinating to the coordination center M.

Provided that, with regard to electron-donating property with respect to the coordination center M, $R^1$, $R^2$, $R^3$, $R^4$, $R^5$, $R^6$ and $R^7$ are so combined and arranged that a TEP value (Tolman electronic parameter) [cm$^{-1}$] obtained by an infrared spectroscopy of a ligand having a nitrogen-containing heterocyclic carbene structure represented by the following formula (2) which contains $R^1$ to $R^7$, sifts toward a high frequency side compared to the TEP value [cm$^{-1}$] of a ligand represented by the formula (2-1).

[Chem. 23]

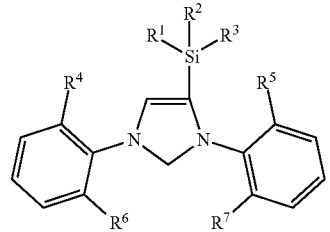

(2)

-continued

[Chem. 24]

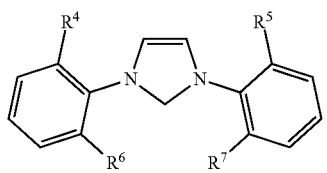

(2-1)

Here, in the formula (2), $R^1$, $R^2$, $R^3$, $R^4$, $R^5$, $R^6$ and $R^7$ represent the same substituents as $R^1$, $R^2$, $R^3$, $R^4$, $R^5$, $R^6$ and $R^7$ in the formula (1).

Further, in the formula (2-1), $R^4$, $R^5$, $R^6$ and $R^7$ represent the same substituents as $R^4$, $R^5$, $R^6$ and $R^7$ in the formula (1).

The organometallic complex catalyst of the present embodiment which has the ligand of the present embodiment having the aforementioned constitution can give a higher yield of the desired product than the conventional catalysts such as the NHC—Pd complex catalyst exemplified in Non-Patent Documents 1 to 10 mentioned above in the cross-coupling reaction.

Though the detailed mechanism by which the organometallic complex catalyst of the present embodiment can obtain a high yield of the desired product has not been found, the present inventors speculate as follows.

Namely, the present inventors speculate that, though the conventional catalysts have the structure where a hydrogen atom is bonded to the backbone carbon at the 4- or 5-position in the structure of NHC of the imidazole ring, the organometallic complex catalyst of the present invention has the structure where the aforementioned silyl group ($-SiR^1R^2R^3$) is bonded to the backbone carbon at the 4- or 5-position in the structure of NHC, and the difference may contribute to the improvement of the yield of the desired product.

In addition, as described later, the present inventors measured the TEP value obtained by an infrared absorption spectrum with respect to a Rh carbonyl complex where the portion of the -$MR^8X$ of the organometallic complex of the present embodiment is substituted by —$Rh(CO)_2Cl$.

As a result, the present inventors have found that among the ligands represented by the formula (2), the organometallic complex catalyst having the ligand which has the TEP value shifted to a higher wave number side than the IPr ligand (formula (P5)), i.e., the ligand having the NHC structure and a lower electron donating property than the IPr ligand (formula (P5)) can give a higher yield of the desired product than the conventional catalysts such as the NHC—Pd complex catalyst (IPrPd (allyl)) represented by the formula (P4).

Then, based on these results, the present inventors believe that, when having the structure where the silyl group ($-SiR^1R^2R^3$) is bonded to the backbone carbon at the 4- or 5-position in the NHC structure of the imidazole ring, and the structure where the TEP value satisfies the conditions described above, since the organometallic complex catalyst becomes relatively bulky, and the catalytically active species $M°$ (zero valence) in the catalytic reaction are prevented from deactivation due to origomerization to improve the life of the catalyst, the desired product can be obtained in high yield (see, for example, Example 1 and Example 2 described later).

In the organometallic complex of the present embodiment, it is preferable that the TEP value [cm$^{-1}$] of the ligand having the nitrogen-containing heterocyclic carbene structure represented by the following formula (2) is a value calculated from a stretching frequency [cm$^{-1}$] of a carbonyl group obtained from an infrared absorption spectrum measured on an Rh carbonyl complex represented by the following formula (1-1), which is a complex where, in the formula (1), the portion of the -$MR^8X$ is substituted by —$Rh(CO)_2Cl$.

[Chem. 25]

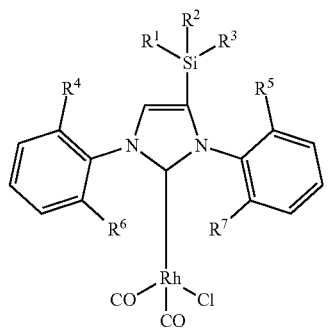

(1-1)

In this case, the TEP value can be obtained according to the following equation (E1).

[Eq. 2]

$$TEP[cm^{-1}] = v_{CO}^{av/Ni}[cm^{-1}] \approx 0.8001 v_{CO}^{av/Rh}[cm^{-1}] + 420.0[cm^{-1}] \quad (E1)$$

Here, in the equation (E1), the $v_{CO}^{av/Rh}$ represents an arithmetic mean value calculated from a stretching frequency [cm$^{-1}$] of the carbonyl group obtained from the infrared absorption spectrum measured on the Rh carbonyl complex, and the $v_{CO}^{av/Ni}$ represents an arithmetic mean value [cm$^{-1}$] (=TEP value [cm$^{-1}$]) calculated from a stretching frequency of the carbonyl group obtained from the infrared absorption spectrum measured on the Ni carbonyl complex.

In the present invention, as a method of evaluating the electron donating property to the central metal of the ligand which contains the NHC structure of the organometallic complex catalyst by employing the TEP value calculated according to the above equation (E1), the method described in the Non-Patent document "T. Dröge and F. Glorius, Angew. Chem. Int. Ed., 2010, 49, 6940" is employed.

The TEP value (Tolman electronic parameter) is originally the stretching frequency of the carbonyl group obtained from the infrared absorption spectrum of a Ni carbonyl complex where the coordination center is Ni. However, the Ni carbonyl complex is so toxic that it is difficult for a measuring person to carry out the measuring procedures of the infrared absorption spectrum. Thus, by using the stretching frequency of the carbonyl group obtained from the infrared absorption spectrum of the Rh carbonyl complex and the equation (E1) in this way, it is possible for the measuring person to carry out the measuring procedures of the infrared absorption spectrum in the environment where the safety is improved.

Here, from the viewpoint of obtaining the effects of the present invention more reliably, the coordination center M is preferably Pd.

From the viewpoint of obtaining the effects of the present invention more reliably, at least one of $R^1$, $R^2$ and $R^3$ is preferably an alkyl group or an alkoxyl group. More preferable is an alkyl group or alkoxyl group having 1 to 3 carbon atoms.

From the viewpoint of obtaining the effects of the present invention more reliably, at least one of $R^4$, $R^5$, $R^6$ and $R^7$ is preferably an alkyl group having 1 to 3 carbon atoms.

From the viewpoints of obtaining the effects of the present invention more reliably and of availability of the raw material, X is preferably Cl among the halogen atoms.

From the viewpoint of obtaining the effects of the present invention more reliably, $R^8$ is preferably a substituent having 3 to 10 carbon atoms which has a π bond capable of coordinating to the coordination center M, more preferably a substituent having 3 to 9 carbon atoms which has a π bond capable of coordinating to the preferred coordination center Pd.

Further, from the viewpoint of obtaining the effects of the present invention more reliably, the organometallic complex catalyst of the present invention which has the ligand of the present invention as a configuration material is preferably used for the C—N cross-coupling reaction.

Furthermore, from the viewpoint of obtaining the effects of the present invention more reliably, the organometallic complex catalyst of the present invention preferably has the structure represented by the following formula (3), formula (4) or formula (5).

[Chem. 26]

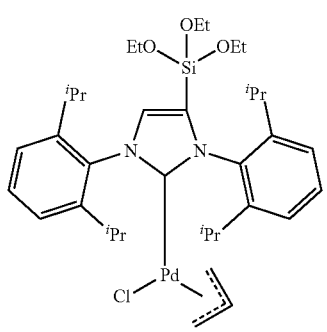

(3)

[Chem. 27]

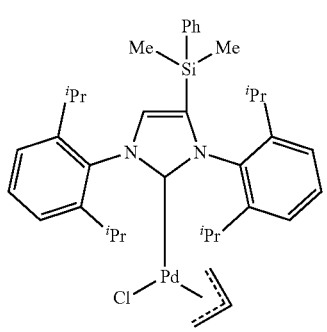

(4)

[Chem. 28]

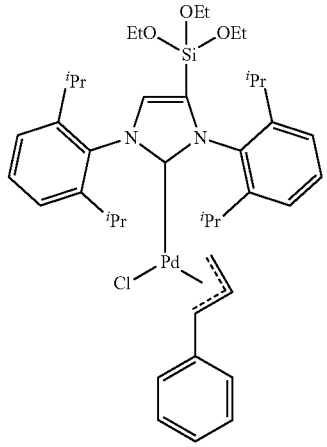

(5)

Here, in the formulae (3) to (5) $^i$Pr represents an isopropyl group, in the formula (4) Me represents methyl group, Ph represents phenyl group, in the formula (3) and the formula (5) OEt represents ethoxide group.

The present embodiment can provide the organometallic complex catalyst capable of obtaining a higher yield of a desired object than conventional catalysts in a cross-coupling reaction, and the ligand which is the structural material of the organometallic complex catalyst.

<Preferred Embodiment of Method for Preparing Organometallic Complex Catalyst>

The organometallic complex catalyst according to the present embodiment can be prepared, without any particular limitation, by combining and optimizing the known methods for synthesizing ligands and methods for synthesizing complex catalysts.

The method for preparing the organometallic complex catalyst of the present embodiment includes:

a first step for synthesizing a ligand which has the NHC structure represented by the following formula (2), a second step for synthesizing a complex comprising the coordination center M in the formula (1) and a halogen X and a substituent $R^8$, and a third step for reacting the ligand having the NHC structure obtained by the first step and the complex obtained by the second step.

Furthermore, the method for preparing the organometallic complex catalyst of the present embodiment may further include a fourth step for purifying the organometallic complex catalyst of the present embodiment obtained after the third step. As the purification procedure of the fourth step, there can be employed a known purification technique. For example, a recrystallization method by using a predetermined solvent may be employed. According to the method for preparing the organometallic complex catalyst of the present embodiment of the present embodiment, it is possible to provide a method for reliably preparing the organometallic complex catalyst for the cross-coupling reaction where the ligand is used, that is, the organometallic complex catalyst which can give the desired product in a higher yield than the conventional catalysts in the cross-coupling reaction.

Further, according to the method for preparation of the present embodiment, it is possible to prepare more easily and more reliably the organometallic complex catalyst for the cross-coupling reaction where the ligand of the present embodiment is used, that is, the organometallic complex catalyst of the present embodiment which can give the desired product in a higher yield than the conventional catalysts in the cross-coupling reaction.

[Chem. 29]

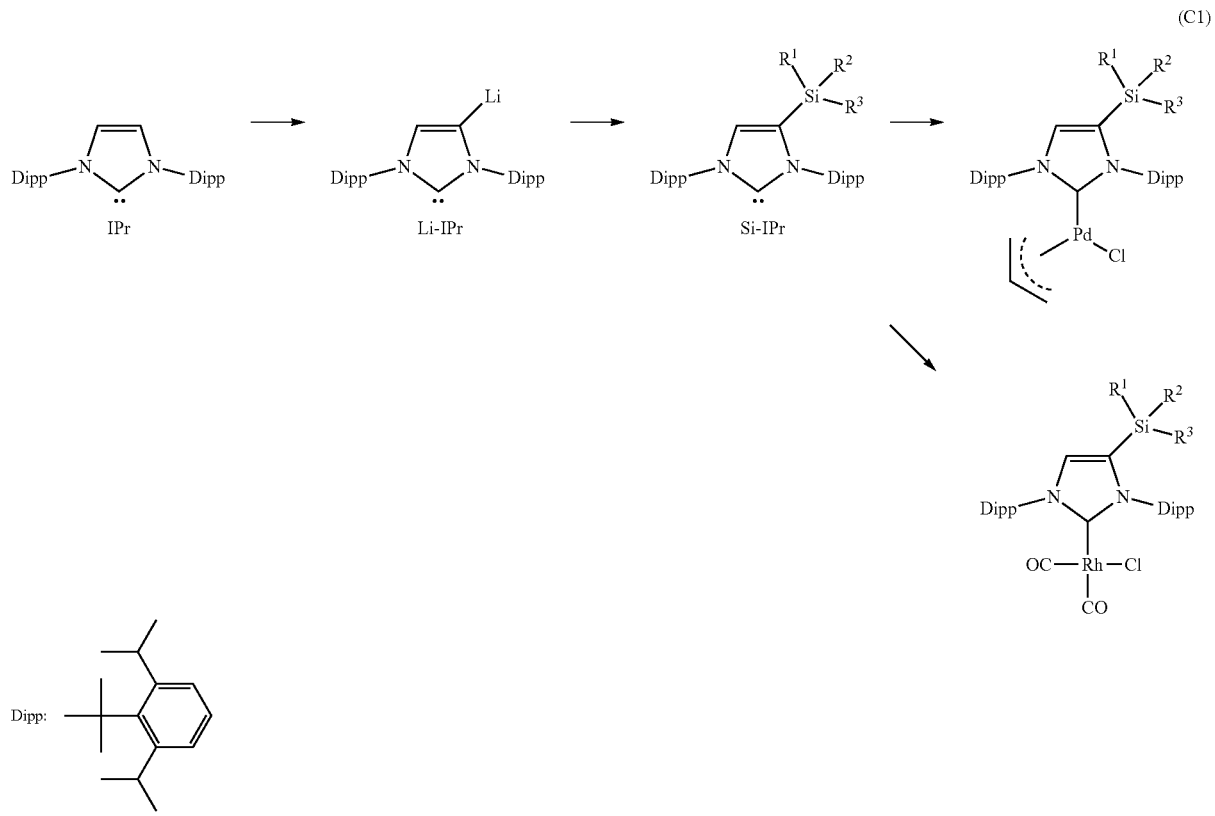

According to the method for preparation of the present embodiment, it is possible to prepare the ligand of the present invention which has the structure where the silyl group is substituted by the hydrogen atom bonded to the backbone carbon at the 4- or 5-position in the 5-membered ring of the ligand having the NHC structure such as the IPr, and the structure where the TEP value satisfies the conditions described above.

Conventionally, though the synthesis of the ligand having the NHC structure where a hydrogen atom of the backbone carbon is substituted by another substituent requires a multistep synthesis step, in the method for preparation of the present invention, it is possible to synthesize, in relatively few synthesis steps and under relatively mild conditions, the ligand where the silyl group is bonded to the backbone carbon at the 4- or 5-position in high yield, on the basis of the ligand such as IPr etc. where a hydrogen atom is bonded to the backbone carbon at the 4- or 5-position. Moreover, in the method for preparation of the present invention, various types of silyl groups can be introduced into the hydrogen moiety which is bonded to the backbone carbon at the 4- or 5-position by changing the silicon reagent of the raw material.

For example, according to the method for preparation of the present embodiment, as shown in the following formula (C1), the synthesis steps required to prepare the final product (the organic Pd complex catalyst or the organic Rh complex catalyst having the ligand where a hydrogen on the backbone carbon of the ligand having the NHC structure is substituted by the silyl group) from IPr can be reduced to relatively few steps, i.e. three.

Here, in the formula (C1), $R^1$, $R^2$ and $R^3$ are the same as $R^1$, $R^2$ and $R^3$ in the aforementioned formula (1).

EXAMPLE

In the following, the present invention is more specifically explained by referring working examples, but the present invention is not limited to the following working examples.

(Explanation of Analyzers)

When synthesizing the organometallic complex catalysts of Examples 1 to 3 and Comparative Examples 2 and 2 described below, the following analyzers were used for the analysis.

[NMR Spectrum]

For the $^1$H NMR, $^{13}$C{$^1$H} NMR, $^{29}$Si{$^1$H} NMR spectrum measurement, Bruker Biospin Avance 400 (400 MHz) available from Bruker Co. Ltd. was used. In all of the measurements of the ligands, a dehydrated heavy solvent was used. This is to prevent the decomposition of the ligand.

For the $^{13}$C{$^1$H} CPMAS, $^{29}$Si{$^1$H} CPMAS spectrum measurement, Bruker Biospin Avance 400WB (400 MHz) available from Bruker Co. Ltd. was used. [Mass Spectrometry]

For the MALDI-TOF-MS spectrum measurement, Bruker AUTOFLEX™ TOF/TOF was used.

[Elementary Analysis]

For the elementary analysis, CE Instruments EÅ1110 elemental analyzer available from CE Instruments Co., Ltd. was used.

[Single-Crystal X-Ray Crystal Structure Analysis]

For the single-crystal X-ray crystal structure analysis, Bruker SMART APEX CCD available from Bruker Co., Ltd. was used. Analysis calculation was performed by using Crystal Structure available from RIGAKU Co., Ltd.

[GC Measurement]

For the gas chromatography (GC) measurement, GC-2014 available from Shimadzu Corporation was used. As the capillary column, TC-1 (60 m) was used.

[Nitrogen Adsorption Measurement]

For the nitrogen adsorption measurement, a high-accuracy specific surface area/pore distribution measuring apparatus (Bel sorp mini) available from Bell Japan Co., Ltd. was used.

[EDX Measurement]

For the EDX measurement, a fluorescent X-ray analyzer (EDX-800HS) available from Shimadzu Corporation was used.

[IR Measurement]

For the IR measurement, NICOLET 6700 Diamond ATR (smart orbit) available from Thermo Scientific Co., Ltd. was used.

[Column Device]

A medium pressure preparative solution chromatograph YFLC-A1-580 available from Yamazen Co., Ltd. was used, and a Hi-Flash Column Silica gel available from Yamazen Co., Ltd. was used as a silica column.

(Explanation of Commercially Available Reagents)

The following commercially available reagents were used in the synthesis and analysis of the organometallic complex catalysts of Examples 1 to 3 and Comparative Examples 1 to 2 described below.

Reagents available from Kanto Chemical Co., Ltd.: acetic acid, potassium tert-butoxide, n-butyllithium, chlorobenzene, 1,2-dimethoxyethane Reagents available from Sigma-Aldrich Japan reagent: chlorotriethoxysilane, mesitylene, heavy chloroform, MCM-41

Reagents available from Tokyo Chemical Industry Co., Ltd.: 2,6-diisopropylaniline, chlorotrimethylsilane, 2,4,6-trimethylaniline, 1,3-di-tert-butylimidazol-2-ylidene, cinnamyl chloride Reagents available from Wako Pure Chemical Corporation: methanol, ethyl acetate, tetrahydrofuran, hexane, toluene, dodecane, dibutyl aniline, allyl chloride, 40% glyoxal solution, paraformaldehyde Reagent available from N.E. CHEMCAT CORPORATION: Palladium chloride Reagent available from Fuji Silyl Co., Ltd.: Q-6

Reagents available from ISOTEC Co., Ltd.: heavy benzene, heavy THF

Comparative Example 1

An organometallic complex catalyst {trade name "NTMS-PDA", available from N.E. CHEMCAT CORPORATION (hereinafter referred to as "$^{TMS}$IPrPd(allyl)" as occasion demand)} was prepared. This $^{TMS}$IPrPd(allyl) is an organometallic complex catalyst shown in the formula (3).

The organometallic complex catalyst {$^{TMS}$IPrPd(allyl)} of Comparative Example 1 was synthesized by the following procedures.

[Comparative Example 1 First Step-1] Synthesis of Ligand "IPr" Having the NHC Structure Starting from 2,6-diisopropylaniline as a starting material, a ligand "IPr" having the NHC structure represented by the formula (P5) described above, i.e. {1,3-bis (2,6-diisopropylphenyl) imidazol-2-ylidene} was synthesized.

Specifically, referring to the procedures described in the academic articles (Tang, P., Wang, W., Ritter, T. J. Am. Chem. Soc. 2011, 133, 11482, and Pompeo, M., Froese, R. D. J., Hadei, N., Organ, M. G. Angew. Chem. Int. Ed. 2012, 51, 11354), synthesis was carried out through the three steps shown in the following reaction schemes (R1) to (R3). Identification was carried out by using $^1$H NMR to confirm that IPr and an intermediate product were synthesized.

[Chem. 30]

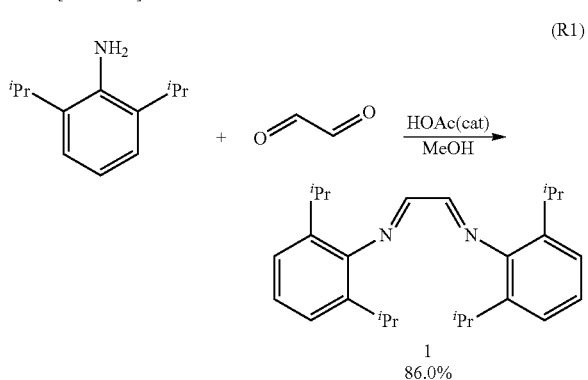

In the reaction scheme (R1), MeOH represents methanol, and HOAc represents acetic acid.

The synthesis procedure of the intermediate product 1 in the reaction scheme (R1) is explained.

In a 50 mL eggplant flask, 6.00 g (33.8 mmol) of 2,6-diisopropylaniline, 30 mL of methanol and 0.31 mL (3.5 mol %) of acetic acid were added and heated to 50° C. Next, a mixed solution of 2.40 g (0.5 eq.) of glyoxal 40% aq. and 10 mL of methanol were added dropwise. The mixture turned from a clear colorless solution to a clear yellow solution as the mixed solution was dropped. After stirring at 50° C. for 15 minutes, the temperature was returned to room temperature and stirring was further carried out for 11 hours. When cooling to room temperature, a yellow solid was precipitated. After the completion of the reaction, filtration was carried out by using a membrane filter, and the solid was washed with methanol. Since a small amount of the desired intermediate product 1 was dissolved in methanol when washed, the filtrate was recovered and the solvent was removed, and the obtained solid was washed again with a small amount of methanol and filtered. The yellow solids obtained in the first time and the second time were combined and dried.

The yielded amount of the intermediate product 1 (yellow powdery solid) in the formula (R1) was 5.49 g, and the yield was 86.0%.

[Chem. 31]

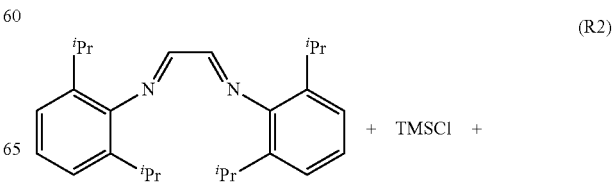

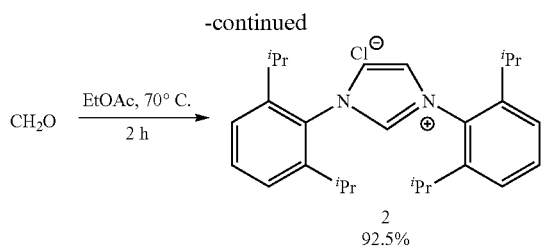

In the reaction scheme (R2), TMSCl represents chlorotrimethylsilane, and EtOAc represents ethyl acetate.

The synthesis procedure of the intermediate product 2 in the reaction scheme (R2) is explained.

In a 500 mL eggplant flask, 3.80 g (10.08 mmol) of (1E,2E)-1,2-bis (2,6-diisopropylphenylimino)ethane, 0.32 g (10.66 mmol) of paraformaldehyde, 83 mL of ethyl acetate were added and heated to 70° C. The mixture was in the form of a yellow slurry-like solution. Next, a mixed solution of 0.34 mL (10.66 mmol) of chlorotrimethylsilane and 8 mL of ethyl acetate was added dropwise over 20 minutes. Thereafter, stirring was continued at 70° C. for 2 hours. The color of the solvent turned from yellow to orange. After the completion of the reaction, the reaction product was dipped in an ice water to be cooled to 0° C. After cooling, filtration was carried out by using a membrane filter, and the solid was washed with ethyl acetate. Thereafter, a vacuum drying was carried out to obtain a pale pink powdery solid.

The yielded amount of the intermediate product 2 (white powdery solid) in the formula (R2) was 3.96 g, and the yield was 92.5%.

[Chem. 32]

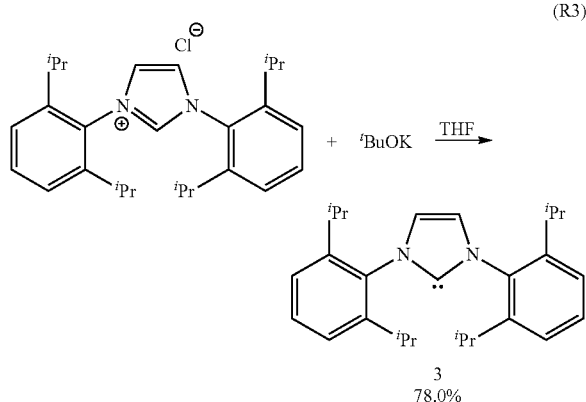

In the reaction scheme (R3), ᵗBuOK represents (CH₃)₃COK, and THF represents tetrahydrofuran.

The synthesis procedure of the product 3 "IPr" in the reaction scheme (R3) is explained.

Under an inert gas atmosphere, 0.43 g (1.01 mmol) of 1,3-bis (2,6-diisopropylphenyl)imidazolium chloride, 0.14 g (1.21 mmol) of ᵗBuOK, 5 mL of dehydrated THF were added in a 25 mL Schlenk, and stirred at room temperature for 3.5 hours. The color of the solution was changed from white to brown. After the completion of the reaction, the solvent was removed, and then the solid was dissolved by adding 5 mL of dehydrated toluene and heating and stirring at 50° C. Thereafter, 5 mL of dehydrated hexane was added. In order to remove the salt (KCl) in the solution, Celite filtration was carried out in a glove box. A brown clear solution was obtained. A brown powdery solid was obtained by removing the solvent and carrying out the vacuum drying.

The yielded amount of the product 3 "IPr" in the reaction scheme (R3) (brown powdery solid) was 0.30 g, and the yield was 78.0%.

Identification was carried out by using $^1$H NMR, and it was confirmed that IPr and the intermediate product (intermediate product 1 in the formula (R1), intermediate product 2 in the formula (R2)) were synthesized.

The $^1$H NMR spectra obtained for each of the ligands having the NHC structure shown in the reaction schemes (R1) to (R3) are shown in FIG. 1. FIG. 1(A) shows the $^1$H NMR spectrum of the intermediate product 1 in the reaction scheme (R1). CDCl$_3$ was used as a deuterated solvent (deuterated solvent). FIG. 1(B) shows the $^1$H NMR spectrum of the intermediate product 2 in the reaction scheme (R2). CD$_3$CN was used as a deuterated solvent. FIG. 1(C) shows the $^1$H NMR spectrum of IPr shown by the product 3 in the reaction scheme (R3). C$_6$D6 was used as a deuterated solvent.

The measurement results of the intermediate product 1 are shown below.

$^1$H NMR (CDCl$_3$, 400 MHz): δ8.10 (s, 2H), 7.20-7.13 (m, 6H), 2.94 (m, 4H), 1.21 (d, 24H, J=6.8 Hz)

The measurement results of the intermediate product 2 are shown below.

$^1$H NMR (CD$_3$CN, 400 MHz): δ9.35 (s, 1H), 7.87 (s, 2H), 7.65 (t, 2H, J=7.5 Hz), 7.47 (d, 4H, J=7.7 Hz), 2.41 (m, 4H), 1.26 (d, 12H, J=6.8 Hz), 1.20 (d, 12H, J=6.8 Hz)

The measurement results of the product 3 "IPr" are shown below.

$^1$H NMR (C$_6$D$_6$, 400 MHz): δ7.31-7.27 (m, 2H), 7.19-7.17 (m, 4H), 6.61 (s, 2H), 2.96 (m, 4H), 1.29 (d, 12H, J=6.8 Hz), 1.18 (d, 12H, J=7.0 Hz)

[Comparative Example 1 First Step-2] Synthesis of a Ligand where Trimethylsilyl Group is Bonded to the Carbon at 4-Position in the NHC Structure of IPr A ligand {ligand represented by the following formula (7)} having the NHC structure used for the organometallic complex catalyst represented by the formula (3) of Example 1 was synthesized by using the ligand IPr obtained in the aforementioned [First step-1].

[Chem. 33]

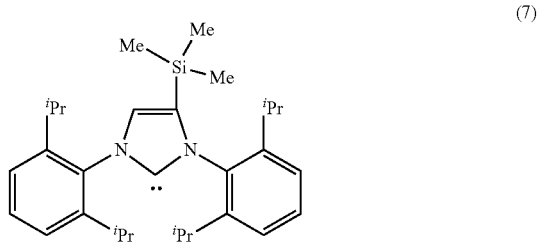

Specifically, modifying the procedure described in the academic article (Wang, Y., Xie, Yarning., Abraham, M. Y., Wei, P., Schaeferlll, H. F., Schleyer, P. R., Robinson, G. H. J. Am. Chem. Soc. 2010, 132, 14370), through the two steps represented by the following reaction scheme (R4), synthesis of the ligand 5 represented by the formula (7) (hereinafter referred to as "*^TMS^*IPr" 5 as occasion demand) where trimethylsilyl group (—SiMe₃, hereinafter referred to as "TMS group" as occasion demand) is bonded to the carbon at 4-position in the NHC structure of IPr (reactant 3).

[Chem. 34]

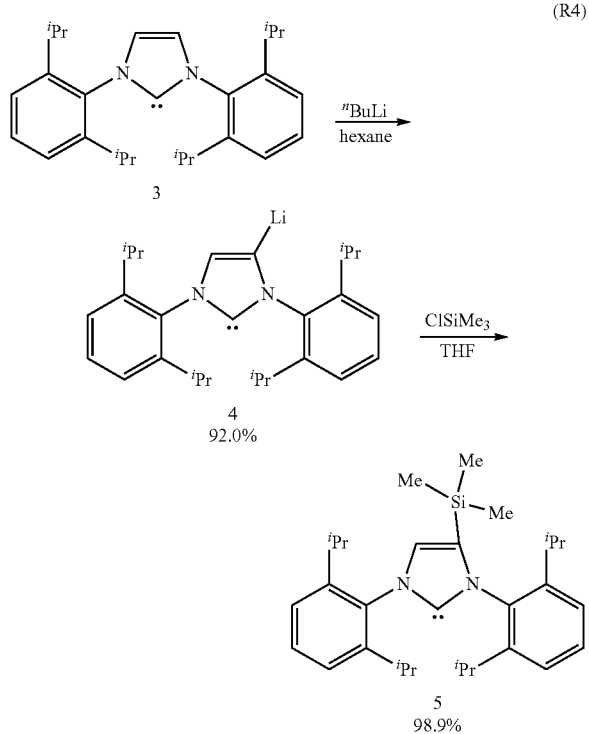

In the reaction scheme (R4), $^n$BuLi represents CH₃CH₂CH₂CH₂Li, and THF represents tetrahydrofuran.

The synthesis procedure of the intermediate product 4 (Li—IPr) in the reaction scheme (R4) is explained.

Firstly, 10.79 g (27.62 mmol) of IPr (reactant 3) and 100 mL of dehydrated hexane were added to a 300 mL eggplant-shaped flask in a glove box, and the obtained solution was stirred at room temperature for 30 minutes. Next, $^n$BuLi was slowly added dropwise to the obtained suspension, and reaction was continued with stirring overnight to react at room temperature. The light brown slurry-like solution was changed to a yellow slurry-like solution. After the completion of the reaction, the reaction solution was filtered by a membrane filter and washed with dehydrated hexane. The resulting yellow powder solid {intermediate product 4 (Lithiodide: Li—IPr) in the reaction scheme (R4)} was dried.

The yielded amount of the intermediate product 4 (yellow powder solid) in the reaction scheme (R4) was 10.0 g, and the yield was 92.0%.

Next, the synthesis procedure of the product 5 (*^TMS^*IPr) in the reaction scheme (R4) is explained.

Firstly, 0.78 g (1.98 mmol) of the intermediate product 4 (Li—IPr) and 25 mL of dehydrated THF were added and dissolved in a 50 mL Schlenk in a glove box. Next, 0.26 mL (2.04 mmol) of chlorotrimethylsilane (ClSiMe₃, hereinafter referred to as "ClTMS" as occasion demand) was slowly added dropwise, allowed to react for 25 minutes, and after the completion of the reaction, the solvent was removed.

In a glove box, 10 mL of dehydrated toluene was added to the solid product and dissolved, and the obtained solution was transferred to a centrifuge tube. The solution in the centrifuge tube was centrifuged at 4000 rpm for 6 minutes at room temperature to separate the salt (LiCl). Next, the obtained filtrate was passed through a filter (available from advantec Co., Ltd., 0.2 μm) and separated into a 50 mL Schlenk. Next, the solvent was removed to obtain a yellow powder solid (*^TMS^*IPr, that is, the desired ligand 5).

The yielded amount of the product 5 "*^TMS^*IPr" (yellow powder solid) in the reaction scheme (R4) was 0.901 g, and the yield was 98.9%.

Identification was carried out by using ¹H NMR, and it was confirmed that the lithiation of the hydrogen atom bonded to the carbon at the 4-position in the NHC structure of IPr (reactant 3) proceeds, and *^TMS^*IPr (desired ligand 5) was synthesized.

The ¹H NMR spectra obtained for each of the ligands of IPr (reactant 3) and *^TMS^*IPr (desired ligand 5) having the NHC structure are shown in FIG. 2. FIG. 2(A) shows the ¹H NMR spectrum of IPr (reactant 3). C₆D₆ was used as a deuterated solvent (deuterated solvent). FIG. 2(B) shows the ¹H NMR spectrum of *^TMS^*IPr (desired ligand 5). C₆D₆ was used as a deuterated solvent.

The measurement results of the reaction product 5 *^TMS^*IPr (desired ligand 5) are shown below.

¹H NMR (C₆D₆, 400 MHz): δ=7.33-7.27 (m, 2H), 7.21-7.17 (m, 4H), 6.89 (s, 2H), 3.04 (m, 2H), 2.84 (m, 2H), 1.40 (d, 6H, J=6.8 Hz), 1.28 (d, 12H, J=6.8 Hz, 6.9 Hz), 1.18 (d, 6H, J=6.9 Hz), 0.05 ppm (s, 9H)

From the results of ¹H NMR shown in FIG. 2(A) and FIG. 2(B), it was confirmed that, since the TMS group was bonded to the carbon at the 4-position in the NHC structure of IPr (reactant 3), the proton peak derived from —CH of the $^i$Pr group became left-right asymmetric and split into two.

Further, consumption of the raw material was confirmed, and the peak derived from the methyl group of TMS group was observed in the vicinity of 0 ppm. It was confirmed that *^TMS^*IPr (desired ligand 5) was synthesized because the chemical shift and the integral value were in agreement with the literatures. In addition, it was confirmed that the lithiation of IPr (reactant 3) by $^n$BuLi was sufficiently advanced.

[Comparative Example 1 Second Step] Synthesis of Complex Containing Coordination Center M, Halogen X, and Substituent R⁸

Referring to Non-Patent Document 9, according to the reaction represented by the following reaction scheme (R5), π-allylPd complex 13 {(allyl)palladium(II) chloride, hereinafter referred to as "[(ally)PdCl₂]₂" as occasion demand} of a Pd source was synthesized.

[Chem. 35]

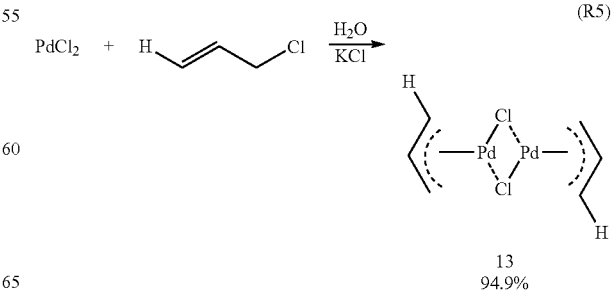

The synthesis procedure of the π-allylPd complex 13 "[(allyl)PdCl$_2$]$_2$" in the reaction scheme (R5) is explained.

Distilled water (260 mL) was added to a 500 mL Schlenk, and Ar was bubbled for 30 minutes.

Next, PdCl$_2$ (2.14 g, 12.0 mmol) and KCl (1.89 g, 24.0 mmol) were added and stirred for 1 hour at room temperature. Before and after the stirring, the solution changed from a slurry-like solution to a clear brown solution. Allyl chloride (2.96 mL, 36.0 mmol) was added dropwise to this solution, and the mixture was further stirred overnight at room temperature to allow the reaction of the reaction scheme (R5) to proceed. After the completion of the reaction, extraction was carried out 5 times with chloroform (30 mL), and the removed chloroform was dried over MgSO$_4$. Next, the obtained solution was filtered and the solvent was removed to obtain a yellow solid {π-allylPd complex 13}.

The yielded amount of the π-allylPd complex 13 (yellow powder solid) was 2.09 g, and the yield was 94.9%.

Identification was carried out by using $^1$H NMR, and it was decided that the desired product i.e. the π-allylPd complex 13 {[(allyl)PdCl$_2$]$_2$} was synthesized because the chemical shift and the integral value were in agreement with the Non-Patent Document 9.

The measurement results of the π-allylPd complex 13 {[(allyl)PdCl$_2$]$_2$} are shown below.

$^1$H NMR (CDCl$_3$, 400 MHz): δ=5.45 (m, 2H), 4.10 (d, 4H, J=6.7 Hz), 3.03 (d, 4H, J=12.1 Hz)

[Comparative Example 1 Third Step] Reaction of Ligand Having the NHC Structure Obtained in the First Step with the Complex Obtained in the Second Step The organometallic complex catalyst "$^{TMS}$IPrPd(allyl) 15" of Example 1 was synthesized, according to the following reaction scheme (R6), by reacting the ligand ($^{TMS}$IPr) having the NHC structure obtained in the first step with the π-allylPd complex 13 {[(allyl)PdCl$_2$]$_2$} obtained in the second step.

In the third step, the reaction conditions are independently examined by the present inventors.

[Chem. 36]

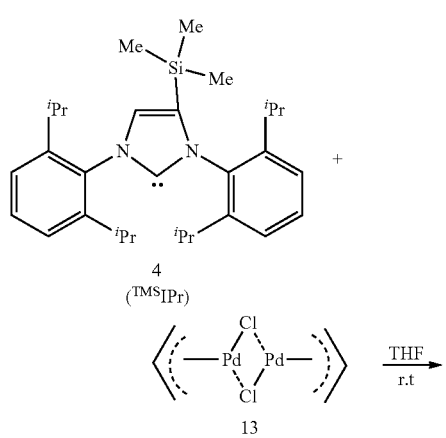

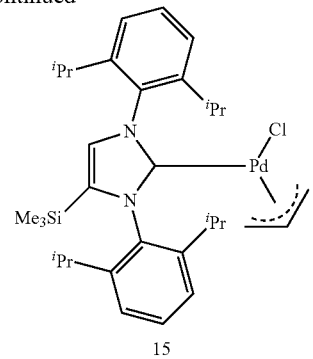

15

In a glove box, 0.90 g (1.95 mmol) of the ligand ($^{TMS}$IPr) having the NHC structure obtained in the first step and 15 mL of dehydrated THF were added to a 50 mL Schlenk. Next, 0.36 g (0.98 mmol) of the π-allylPd complex {[(allyl)PdCl$_2$]$_2$} obtained in the second step and 10 mL of dehydrated THF were added to a 20 mL vial. The solution of the π-allylPd complex 13 was added dropwise to the solution of $^{TMS}$IPr 5. The resulting solution was stirred at room temperature for 1 hour. Before and after the stirring, the color of the solution was changed from orange to brown. Next, the solution was passed through a powder of activated carbon to remove the Pd black produced by the reaction. At this time, the color of the solution was changed to yellow after passing through the activated carbon. Next, THF was completely removed from the resulting solution. Next, a small amount of dehydrated hexane was added and powdered. The resulting solid was washed with hexane to give a yellow solid {reaction product 15 in the reaction scheme (R6), i.e., $^{TMS}$IPrPd(allyl)}.

[Comparative Example 1 Fourth Step] Purification of Organometallic Complex Catalyst Obtained after Third Step After the third step, with respect to the yellow solid {$^{TMS}$IPrPd(allyl) 15}, the purification was performed by subjecting to recrystallization treatment by using hexane etc.

Incidentally, this $^{TMS}$IPrPd(allyl) 15 was synthesized for the first time by the present inventors as the organometallic complex catalyst used for the cross-coupling reaction.

The yielded amount of $^{TMS}$IPrPd(allyl) 15 (yellow powder solid) was 0.84 g, and the yield was 66.8%.

Comparative Example 1 Identification

The $^{TMS}$IPrPd(allyl) 15 was identified by $^1$H NMR, $^{13}$C{$^1$H} NMR, $^{29}$Si{$^1$H} NMR, MALDI-TOF-MS and elemental analysis.

The measurement results of the $^{TMS}$IPrPd(allyl) 15 are shown below.

FIG. 3 shows the spectrum of $^1$H NMR obtained for the organometallic complex catalyst {$^{TMS}$IPrPd(allyl) 15} of Example 1. FIG. 4 shows the spectrum of MALDI-TOF-MS obtained for the organometallic complex catalyst {$^{TMS}$IPrPd(allyl) 15} of Example 1. Table 1 shows the results of the elemental analysis.

$^1$H NMR (CDCl$_3$, 400 MHz): δ 7.37-7.44 (m, 2H), 7.23-7.28 (m, 4H), 7.18 (s, 1H), 4.80 (m, 1H), 3.93 (d, 1H, J=7.2 Hz), 3.12 (m, 2H), 2.97 (m, 2H), 2.82 (d, 1H, J=13.5 Hz), 2.75 (m, 1H), 1.59 (d, 1H, J=11.8 Hz), 1.36 (m, 12H), 1.19 (m, 12H), 0.09 (s, 9H)

$^{13}C\{^1H\}$ NMR (CDCl$_3$, 100 MHZ): δ 188.2, 146.5, 146.2, 145.9, 145.6, 137.6, 136.1, 135.8, 133.4, 130.0, 129.8, 129.7, 124.2, 124.1, 123.7, 114.2, 73.2, 50.0, 28.8, 28.4, 28.2, 26.5, 25.7, 25.6, 25.3, 24.7, 26.1, 23.3, 0.1

$^{29}Si\{^1H\}$ NMR (CDCl$_3$, 80 MHz): δ–8.12

TABLE 1

| C$_{33}$H$_{49}$ClN$_2$PdSi | C [%] | H [%] | N [%] |
|---|---|---|---|
| Calculated value | 61.57 | 7.67 | 4.35 |
| Measured value | 61.56 | 7.64 | 4.14 |

From the results of $^1$H NMR, with respect to $^{TMS}$IPrPd (allyl) 15, a peak derived from the allyl group was observed, and the integrated value was consistent with the desired structure. In addition, one clean signal was observed from the $^{29}Si\{^1H\}$ NMR. The detailed assignment of $^1$H NMR and $^{13}C$ $\{^1H\}$ NMR are determined by $^1$H-$^1$H correlation, $^1$H-$^{13}$C correlation, $^{13}$C DEPT spectrum.

As shown in Table 1, it is determined that the desired compound $^{TMS}$IPrPd(allyl) 15 was synthesized, because the calculated value and the measured value according to the elementary analysis are almost identical (difference within 0.3%).

Further, from the results of MALDI-TOF-MS shown in FIG. 4, it was observed that Cl was removed from Pd by a laser. The result of MALDI-TOF-MS suggests that the ligand having the NHC structure is bound to Pd, and from this viewpoint as well, it was judged that the desired $^{TMS}$IPrPd(allyl) 15 could be synthesized.

Example 1

The organometallic complex catalyst represented by the formula (4) {trade name "NTEOS-PDA", available from N.E. CHEMCAT CORPORATION (hereinafter referred to as "$^{TEOS}$IPrPd(allyl)" as occasion demand) was prepared.

The organometallic complex catalyst {$^{TEOS}$IPrPd(allyl)} of Comparative Example 2 was synthesized according to the following procedure.

[Example 1 First Step-1] Synthesis of Ligand "IPr" Having the NHC Structure

The IPr was synthesized according to the same procedures and identification methods as in the procedures and identification methods described in [Example 1 First Step-1] of Example 1.

[Example 1 First Step-2] Synthesis of Ligand Having Triethoxysilyl Group Bonded to Carbon at 4-Position in NHC Structure of IPr A ligand {ligand represented by the following formula (8)} having the NHC structure which was used in Comparative Example 1 represented by the formula (4) was synthesized by using the ligand IPr obtained in the aforementioned [First Step-1],

[Chem. 37]

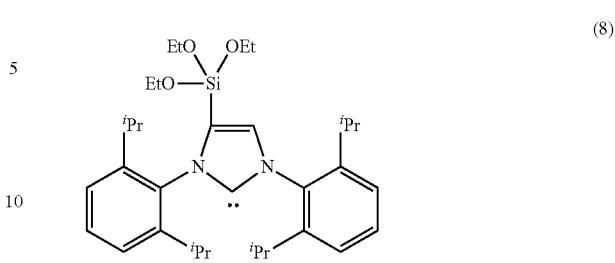

Specifically, through the two steps represented by the following reaction scheme (R7), synthesis of the ligand 6 represented by the formula (8) (ligand having the NHC structure which constitutes the organometallic complex catalyst represented by the formula (4) and the formula (6), hereinafter referred to as "$^{TEOS}$IPr" as occasion demand) where triethoxylsilyl group (—Si(OEt)$_3$, hereinafter referred to as "TEOS group" as occasion demand) is bonded to the carbon at 4-position in the NHC structure of IPr (reactant 3).

[Chem. 38]

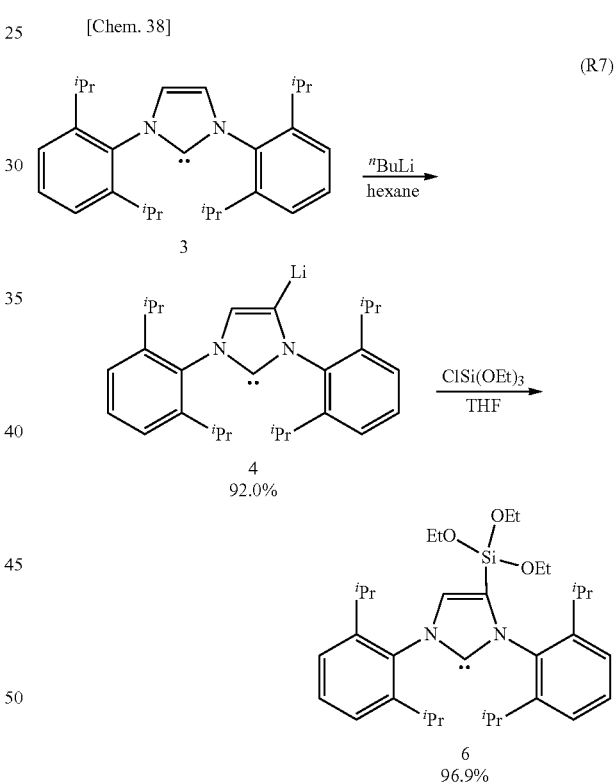

In the reaction scheme (R7), $^n$BuLi represents CH$_3$CH$_2$CH$_2$CH$_2$Li, and THF represents tetrahydrofuran.

The synthesis procedure of the intermediate product 4 (Li—IPr) in the reaction scheme (R7) is explained. The intermediate product 4 (Li—IPr) in the reaction scheme (R7) was synthesized according to the same synthesis procedures as the synthesis procedures of the intermediate product 4 (Li—IPr) in the reaction scheme (R4) described in [Example 1 First Step-2] of Example 1.

Next, the synthesis procedure of the reaction product 6 ($^{TEOS}$IPr) in the reaction scheme (R7) is explained.

Firstly, 3.28 g (8.32 mmol) of the intermediate product 4 (Li—IPr) and 65 mL of dehydrated THF were added and dissolved in a 100 mL eggplant flask in a glove box. Next, 1.68 mL (8.57 mmol) of chlorotriethoxysilane (ClSi(OEt)$_3$, hereinafter referred to as "ClTEOS" as occasion demand) was slowly added dropwise, allowed to react for 20 minutes. During the reaction, the yellow solution was changed to the brown solution. After the completion of the reaction, the solvent was removed.

In a glove box, 20 mL of dehydrated hexane was added to the obtained viscous product and transferred to a centrifuge tube. The centrifuging was carried out at 4000 rpm for 6 minutes at room temperature to separate the salt (LiCl). Next, the obtained filtrate was passed through a filter (available from advantec Co., Ltd., 0.2 μm) and separated into a 50 mL Schlenk. Next, the solvent was removed to obtain a brown oil-like solution ($^{TEOS}$IPr, that is, the desired ligand 6).

The yielded amount of the product 5 "$^{TEOS}$IPr" (brown oil-like solution) in the reaction scheme (R7) was 4.44 g, and the yield was 96.9%.

Identification was carried out by using $^1$H NMR, $^{13}$C{$^1$H} NMR, $^{29}$Si{$^1$H} NMR, and it was confirmed that the lithiation of the hydrogen atom bonded to the carbon at the 4-position in the NHC structure of IPr (reactant 3) proceeds, and $^{TEOS}$IPr (desired ligand 6) was synthesized.

The $^1$H NMR spectra obtained for each of the ligands of IPr (reactant 3) and $^{TEOS}$IPr (desired ligand 6) having the NHC structure are shown in FIG. 5. FIG. 5(A) shows the $^1$H NMR spectrum of IPr (reactant 3). C$_6$D$_6$ was used as a deuterated solvent (deuterated solvent). FIG. 5(B) shows the $^1$H NMR spectrum of $^{TEOS}$IPr (desired ligand 6). C$_6$D$_6$ was used as a deuterated solvent.

The measurement results of $^{TEOS}$IPr are shown below.

$^1$H NMR (C$_6$D$_6$, 400 MHZ): δ7.32-7.28 (m, 2H), 7.26 (s, 1H), 7.23-7.18 (m, 4H), 3.57 (q, 4H), 3.03 (m, 2H), 2.95 (m, 2H), 1.38 (t, 12H), 1.29 (d, 6H), 1.18 (d, 6H), 1.03 (t, 9H, J=7.0 Hz)

$^{13}$C{$^1$H} NMR (C$_6$D$_6$, 100 MHZ): δ164.9, 146.3, 140.1, 139.1, 138.8, 134.4, 133.0, 129.0, 128.6, 126.0, 124.3, 123.8, 123.3, 58.8, 29.1, 28.8, 25.7, 24.5, 23.9, 22.7, 18.1

$^{29}$Si{$^1$H} NMR (C$_6$D$_6$, 80 MHz): δ-65.4

From the results of $^1$H NMR shown in FIG. 5(A) and FIG. 5(B), it was confirmed that, as similar to the case that the TMS group was bonded to the carbon at the 4-position in the NHC structure of IPr (reactant 3), since the TEOS group was bonded to the carbon at the 4-position in the NHC structure of IPr (reactant 3), the proton peak derived from —CH of the $^i$Pr group became left-right asymmetric and split into two.

Further, consumption of the raw material was confirmed, and the peaks derived from the ethoxy group (—OEt group) of TEOS group were observed in the vicinity of 1.1 ppm and 3.6 ppm. From this, it was confirmed that $^{TEOS}$IPr (desired ligand 6) was synthesized. Furthermore, it was confirmed that the proton of the 5-position carbon is sifted in the downfield by introducing a silyl group to the carbon at the 4-position in the NHC structure of IPr (reactant 3).

In addition, the yields of IPr (reactant 3), the intermediate product 4 where the hydrogen atom bonded to the carbon at the 4-position in the NHC structure of IPr (reactant 3) is substituted by Li, and $^{TEOS}$IPr (desired ligand 6) are shown in the reaction scheme (R7).

[Example 1 Second Step] Synthesis of Complex Containing Coordination Center M, Halogen X, and Substituent R$^8$ Referring to Non-Patent Document 9, according to the reaction represented by the following reaction scheme (R5), the π-allylPd complex 13 {[(allyl)PdCl$_2$]$_2$} was synthesized according to the same procedures and identification methods as in the procedures and identification methods described in [Example 1 Second Step] of Example 1.

[Example 1 Third Step] Reaction of Ligand Having the NHC Structure Obtained in the First Step with the Complex Obtained in the Second Step The organometallic complex catalyst "$^{TEOS}$IPrPd(allyl) 16" of Comparative Example 1 was synthesized, according to the following reaction scheme (R6), by reacting the ligand ($^{TEOS}$IPr) having the NHC structure obtained in the first step with the π-allylPd complex {[(allyl)PdCl$_2$]$_2$} obtained in the second step.

In the third step, the reaction conditions are independently examined by the present inventors.

[Chem. 39]

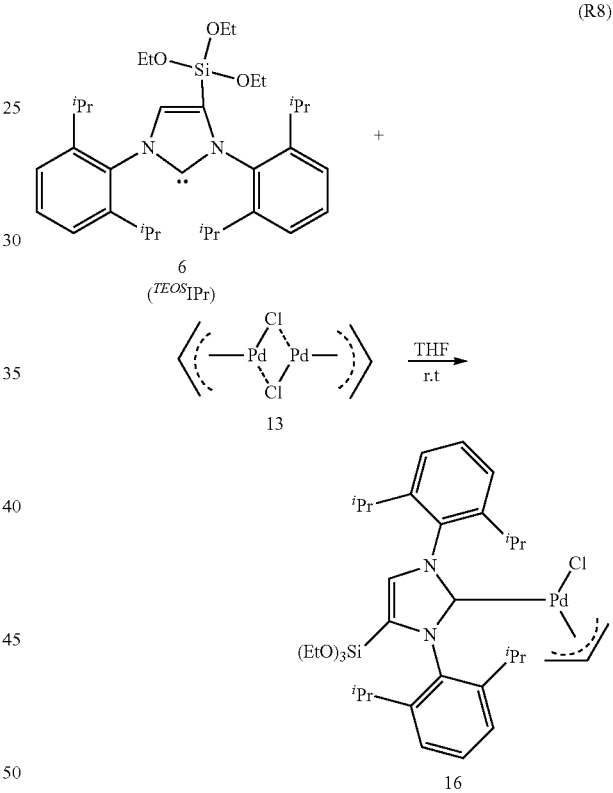

In a glove box, 4.44 g (8.06 mmol) of the ligand ($^{TEOS}$IPr) having the NHC structure obtained in the first step and 15 mL of dehydrated THF were added to a 50 mL Schlenk. Next, 1.47 g (4.02 mmol) of the π-allylPd complex 13 {[(allyl)PdCl$_2$]$_2$} obtained in the second step and 20 mL of dehydrated THF were added to a 50 mL vial. The solution of the π-allylPd complex 13 was added dropwise to the solution of $^{TEOS}$IPr 6. The resulting solution was stirred at room temperature for 1.5 hour. Before and after the stirring, the color of the solution was changed from brown to black. Next, the solution was passed through a powder of activated carbon to remove the Pd black produced by the reaction. The color of the solution was changed to yellow after passing through the activated carbon. Next, THF was completely removed from the resulting solution. Next, a small amount of dehydrated hexane was added and powdered. The resulting solid was washed with hexane to give a white solid {reaction product 16 in the reaction scheme (R8), i.e., $^{TEOS}$IPrPd(allyl)}.

[Example 1 Fourth Step] Purification of Organometallic Complex Catalyst Obtained after Third Step After the third step, with respect to the yellow solid {$^{TEOS}$IPrPd(allyl) 16}, the purification was performed by subjecting to recrystallization treatment by using hexane etc.

Incidentally, this $^{TEOS}$IPrPd(allyl) 16 was synthesized for the first time by the present inventors as the organometallic complex catalyst used for the cross-coupling reaction.

The yielded amount of $^{TEOS}$IPrPd(allyl) 16 (white powder solid) was 2.53 g, and the yield was 42.8%.

Example 1 Identification

The $^{TEOS}$IPrPd(allyl) 16 was identified by $^1$H NMR, $^{13}$C{$^1$H} NMR, $^{29}$Si{$^1$H} NMR, MALDI-TOF-MS and elemental analysis.

The measurement results of the $^{TEOS}$IPrPd(allyl) 16 are shown below.

FIG. 6 shows the spectrum of $^1$H NMR obtained for the organometallic complex catalyst {$^{TEOS}$IPrPd(allyl) 16} of Example 1. FIG. 7 shows the spectrum of MALDI-TOF-MS obtained for the organometallic complex catalyst {$^{TEOS}$IPrPd(allyl) 16} of Example 1. Table 2 shows the results of the elemental analysis.

$^1$H NMR $^1$H NMR (CDCl$_3$, 400 MHz): δ7.39-7.36 (m, 2H), 7.37 (s, 1H), 7.28-7.20 (m, 4H), 4.76 (m, 1H), 3.92 (d, 1H, J=7.4 Hz), 3.58 (q, 6H), 3.05 (m, 3H), 2.94 (m, 1H), 2.81 (d, 1H, J=13.6 Hz), 2.63 (m, 1H), 1.52 (d, 1H, J=11.8 Hz), 1.42-1.15 (m, 24H), 1.03 (t, 9H, J=7.0 Hz)

$^{13}$C{$^1$H} NMR (CDCl$_3$, 100 MHz): δ190.3, 146.8, 146.5, 145.8, 145.5, 137.6, 135.9, 135.3, 129.8, 129.3, 128.1, 124.3, 124.0, 123.7, 114.2, 72.9, 58.8, 50.4, 28.8, 28.7, 28.4, 26.6, 25.8, 25.4, 25.1, 24.8, 23.4, 17.9

$^{29}$Si{$^1$H} NMR (CDCl$_3$, 80 MHz): δ−68.6

TABLE 2

| C$_{36}$H$_{55}$ClN$_2$PdSi | C [%] | H [%] | N [%] |
|---|---|---|---|
| Calculated value | 58.93 | 7.56 | 3.82 |
| Measured value | 59.07 | 7.51 | 3.77 |

From the results of $^1$H NMR, with respect to $^{TEOS}$IPrPd(allyl) 16, a peak derived from the allyl group was observed, and the integrated value was consistent with the desired structure. In addition, one clean signal was observed from the $^{29}$Si{$^1$H} NMR. The detailed assignment of $^1$H NMR and $^{13}$C {$^1$H} NMR are determined by $^1$H-$^1$H correlation, $^1$H-$^{13}$C correlation, $^{13}$C DEPT spectrum.

As shown in Table 2, it is determined that the desired compound $^{TEOS}$IPrPd(allyl) 16 was synthesized, because the calculated value and the measured value according to the elementary analysis are almost identical (difference within 0.3%).

Further, from the results of MALDI-TOF-MS shown in FIG. 7, it was observed that Cl was removed from Pd by a laser. The result of MALDI-TOF-MS suggests that the ligand having the NHC structure is bound to Pd, and from this viewpoint as well, it was judged that the desired $^{TEOS}$IPrPd(allyl) could be synthesized.

Example 2

The organometallic complex catalyst represented by the formula (4) {trade name "NVNL-PDA", available from N.E. CHEMCAT CORPORATION was prepared.

The organometallic complex catalyst of Example 2 was synthesized according to the following procedure.

[Example 2 First Step-1] Synthesis of Ligand "IPr" Having the NHC Structure

The IPr was synthesized according to the same procedures and identification methods as in the procedures and identification methods described in [Comparative Example 1 First Step-1] of Comparative Example 1.

[Example 2 First Step-2] Synthesis of Ligand Having Silyl Group (—SiMe$_2$Ph) Group Bonded to Carbon at 4-Position in NHC Structure of IPr A ligand {ligand represented by the following formula (9)} having the NHC structure which was used in Example 2 represented by the formula (4) was synthesized by using the ligand IPr obtained in the aforementioned [First Step-1],

[Chem. 40]

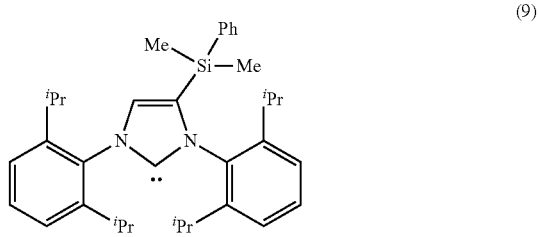

(9)

Specifically, through the two steps represented by the following reaction scheme (R9), synthesis of the ligand represented by the formula (9) where the silyl group (—SiMe$_2$Ph) is bonded to the carbon at 4-position in the NHC structure of IPr (reactant 3).

[Chem. 41]

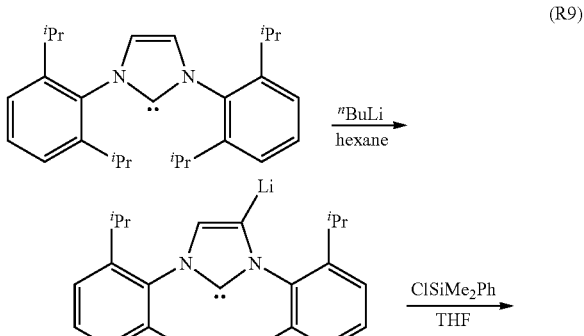

(R9)

-continued

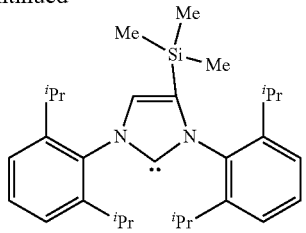

In the reaction scheme (R9), "BuLi represents CH₃CH₂CH₂CH₂Li, and THF represents tetrahydrofuran.

The intermediate product 4 (Li—IPr) in the reaction scheme (R9) was synthesized according to the same synthesis procedures as the synthesis procedures of the intermediate product 4 (Li—IPr) in the reaction scheme (R4) described in [Comparative Example 1 First Step-2] of Comparative Example 1.

Next, the synthesis procedure of the reaction product in the reaction scheme (R9), that is, the desired ligand where the silyl group (—SiMe₂Ph) is bonded to the carbon at 4-position in the NHC structure of the ligand IPr) is explained.

Firstly, a predetermined amount of the intermediate product (Li—IPr) in the reaction scheme (R9) and a predetermined amount of dehydrated THF were added and dissolved in a 100 mL eggplant flask in a glove box. Next, a predetermined amount of ClSiMe₂Ph was slowly added dropwise, allowed to react for a predetermined period of time. After the completion of the reaction, the solvent was removed.

In a glove box, a predetermined amount of dehydrated hexane was added to the reaction product in the reaction scheme (R9) and transferred to a centrifuge tube. The centrifuging was carried out at 4000 rpm for a predetermined period of time at room temperature to separate the salt (LiCl). Next, the obtained filtrate was passed through a filter (available from advantec Co., Ltd., 0.2 μm) and separated into a 50 mL Schlenk. Next, the solvent was removed to obtain the reaction product in the reaction scheme (R9), that is, the desired ligand.

Identification was carried out by using ¹H NMR, ¹³C{¹H} NMR, ²⁹Si{¹H} NMR, and it was confirmed that the lithiation of the hydrogen atom bonded to the carbon at the 4-position in the NHC structure of IPr (reactant 3) proceeds, and the reaction product in the reaction scheme (R9) (desired ligand) was synthesized.

The ¹H NMR spectra obtained for the reaction product in the reaction scheme (R9) (ligand) having the NHC structure is shown in FIG. 8.

Measurement results of the reaction product in the reaction scheme (R9), that is, the desired ligand where the silyl group (—SiMe₂Ph) is bonded to the carbon at 4-position in the NHC structure of the ligand IPr is shown below.

¹H NMR (THF-d8, 400 MHz): δ 7.44-7.37 (m, 4H), 7.34-7.28 (m, 6H), 7.24-7.22 (m, 2H), 2.89 (sept, J=6.9 Hz, 2H), 1.24 (d, J=7.0 Hz, 6H), 1.21 (d, J=6.9 Hz, 6H), 1.15 (d, J=6.8 Hz, 6H), 1.04 (d, J=6.8 Hz, 6H), −0.21 (s, 6H) ppm ¹³C{¹H} NMR (THF-d8, 100 MHz) δ 223.0, 146.1, 145.7, 139.6, 138.4, 137.3, 133.7, 132.4, 129.5, 129.0, 128.4, 128.2, 127.6, 123.0, 122.6, 28.6, 28.1, 25.5, 23.7, 23.3, 20.8, −2.7 ppm ²⁹Si{¹H} NMR (THF-d8, 80 MHz): δ−16.4 ppm From the results of ¹H NMR shown in FIG. 8, it was confirmed that the desired ligand where the silyl group (—SiMe₂Ph) is bonded to the carbon at 4-position in the NHC structure of the ligand IPr was synthesized.

[Example 2 Second Step] Synthesis of Complex Containing Coordination Center M, Halogen X, and Substituent R⁸

According to the reaction represented by the following reaction scheme (R5), The π-allylPd complex 13 {[(allyl)PdCl₂]₂} was synthesized according to the same procedures and identification methods as in the procedures and identification methods described in [Comparative Example 1 Second Step] of Comparative Example 1.

[Example 2 Third Step] Reaction of Ligand Having the NHC Structure Obtained in the First Step with the Complex Obtained in the Second Step The organometallic complex catalyst of Example 2 was synthesized, according to the following reaction scheme (R10), by reacting the ligand having the NHC structure obtained in the first step with the π-allylPd complex {[(allyl)PdCl₂]₂} obtained in the second step.

In the third step, the reaction conditions are independently examined by the present inventors.

[Chem. 42]

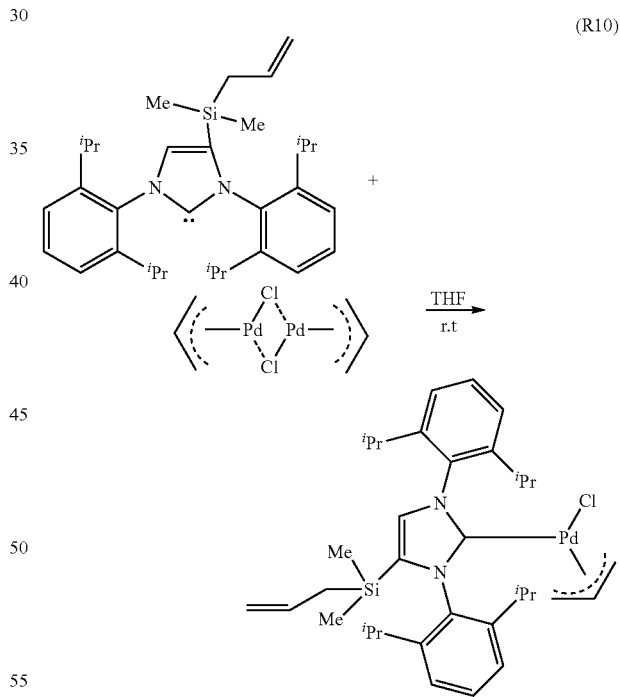

In a glove box, a predetermined amount of the ligand having the NHC structure obtained in the first step and a predetermined amount of dehydrated THF were added to a 50 mL Schlenk. Next, a predetermined amount of the π-allylPd complex {[(allyl)PdCl₂]₂} obtained in the second step and a predetermined amount of dehydrated THF were added to a 50 mL vial. The solution of the π-allylPd complex was added dropwise to the solution of the ligand having the NHC structure. The resulting solution was stirred at room temperature for a predetermined period of time.

Next, the solution was passed through a powder of activated carbon to remove the Pd black produced by the reaction. The color of the solution was changed to yellow after passing through the activated carbon. Next, THF was completely removed from the resulting solution. Next, a small amount of dehydrated hexane was added and powdered. The resulting solid was washed with hexane to give the reaction product in the reaction scheme (R10).

[Example 2 Fourth Step] Purification of Organometallic Complex Catalyst Obtained after Third Step After the third step, with respect to the reaction product in the reaction scheme (R10), the purification was performed by subjecting to recrystallization treatment by using hexane etc. to obtain the organometallic complex catalyst of Example 2.

Incidentally, this organometallic complex catalyst of Example 2 was synthesized for the first time by the present inventors as the organometallic complex catalyst used for the cross-coupling reaction.

Example 2 Identification

The organometallic complex catalyst of Example 2 was identified by $^1$H NMR, $^{13}$C{$^1$H} NMR, $^{29}$Si{$^1$H} NMR, MALDI-TOF-MS and elemental analysis. The measurement results thereof are shown below.

FIG. 9 shows the spectrum of $^1$H NMR obtained for the organometallic complex catalyst of Example 2.

$^1$H NMR (C$_6$D$_6$, 400 MHz): δ 7.42-7.40 (m, 2H), 7.27-7.23 (m, 1H), 7.19-7.14 (m, 7H), 7.07-7.01 (m, 2H), 4.48-4.38 (m, 1H), 3.85-3.83 (m, 1H), 3.46-3.38 (m, 3H), 3.03-2.97 (m, 2H), 2.76 (d, J=13.4 Hz, 1H), 1.63 (d, J=12.0 Hz, 1H), 1.58 (d, J=6.6 Hz, 3H), 1.46 (d, J=6.6 Hz, 3H), 1.41 (d, J=6.7 Hz, 3H), 1.33 (d, J=6.7 Hz, 3H), 1.11 (d, J=6.9 Hz, 3H), 1.04-1.02 (m, 6H), 0.96 (d, J=6.8 Hz, 3H), 0.07 (s, 3H), 0.03 (s, 3H) ppm $^{13}$C{$^1$H} NMR (C$_6$D$_6$, 100 MHz) δ 191.0, 146.9, 146.2, 145.6, 137.6, 137.3, 136.4, 134.9, 133.6, 132.3, 129.7, 129.5, 128.3, 124.3, 124.2, 123.8, 123.5, 113.5, 72.1, 49.7, 28.8, 28.6, 28.2, 28.1, 26.4, 25.7, 25.5, 25.0, 24.6, 24.4, 23.4, 22.6, −1.7, −2.1 ppm $^{29}$Si{$^1$H} NMR (C$_6$D$_6$, 80 MHz): δ−13.7 ppm The result of $^1$H NMR shown FIG. 9, it was judged that the reaction product in the reaction scheme (R10), that is, the organometallic complex catalyst of Example 2 could be synthesized.

Example 3

The organic metal complex catalyst {trade name "NTMS-PDC", available from N.E CHEMCAT CORPORATION (hereinafter referred to as "$^{TEOS}$IPrPd(cinnamyl)" as occasion demand)} was prepared. The $^{TEOS}$IPrPd(cinnamyl) is an organometallic complex catalyst represented by the formula (6).

The organometallic complex catalyst {$^{TEOS}$IPrPd(cinnamyl)} of Example 3 was synthesized by the following procedure.

[Example 3 First Step-1] Synthesis of Ligand "IPr" Having the NHC Structure

The IPr was synthesized according to the same procedures and identification methods as in the procedures and identification methods described in [Example 1 First Step-1] of Example 1.

[Example 3 First Step-2] Synthesis of Ligand Having Triethoxysilyl Group Bonded to Carbon at 4-Position in the NHC Structure of IPr The ligand ($^{TEOS}$IPr) having the NHC structure which is used in Example 3 was synthesized according to the same procedures and identification methods as in the procedures and identification methods described in [Example 1 First Step-2] of Example 1.

[Example 3 Second Step] Synthesis of Complex Containing Coordination Center M, Halogen X, and Substituent R$^8$ Referring to Non-Patent Document 9, according to the reaction represented by the following reaction scheme (R11), the π-allylPd complex 14 {(cinnamyl) palladium (II) chloride, hereinafter referred to as "[(cinnamyl)PdCl$_2$]$_2$", as occasion demand} was synthesized

[Chem. 43]

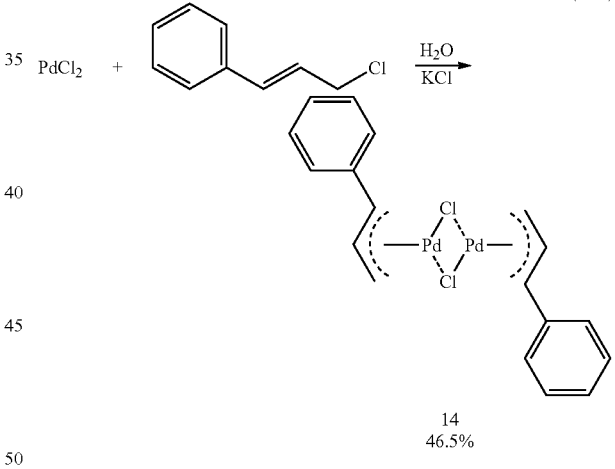

Distilled water (200 mL) was added to a 500 mL Schlenk, and Ar was bubbled for 30 minutes. Thereafter, PdCl$_2$ (4.45 g, 25.1 mmol) and KCl (3.74 g, 50.2 mmol) were added and stirred for 1 hour at room temperature. Before and after the stirring, the solution changed from a slurry-like solution to a clear brown solution. Cinnamyl chloride (10.7 mL, 75.3 mmol) was added dropwise to this solution, and the mixture was further stirred overnight at room temperature to allow the reaction of the reaction scheme (R11) to proceed. After the completion of the reaction, extraction was carried out 5 times with chloroform (50 mL), and the removed chloroform was dried over MgSO$_4$. Next, the obtained solution was filtered and the solvent was removed to obtain a yellow solid {π-allylPd complex 14}.

The yielded amount of the π-allylPd complex 14 (yellow powder solid) was 3.02 g, and the yield was 46.5%.

Identification was carried out by using $^1$H NMR, and it was decided that the desired product i.e. the π-allylPd complex 14 was synthesized because the chemical shift and the integral value were in agreement with the literatures.

The measurement results of the π-allylPd complex 14 are shown below.

$^1$H NMR (CDCl$_3$, 400 MHz): δ=7.49-7.24 (m, 10H), 5.77 (d, 2H), 4.61 (d, 4H, J=11.3 Hz), 3.95 (d, 4H, J=6.7 Hz), 3.01 (d, 4H, J=11.8 Hz)

[Example 3 Third Step] Reaction of Ligand Having NHC Structure Obtained in First Step with Complex Obtained in Second Step The organometallic complex catalyst {$^{TEOS}$IPrPd(cinnamyl) 19} of Example 3 was synthesized by reacting the ligand having the NHC structure ($^{TEOS}$IPr) 6 with the π-allyl Pd complex {reaction product 13 in the formula (R5)} obtained in the second step as shown in the following reaction scheme (R12).

In the third step, the reaction conditions are independently examined by the present inventors.

[Chem. 44]

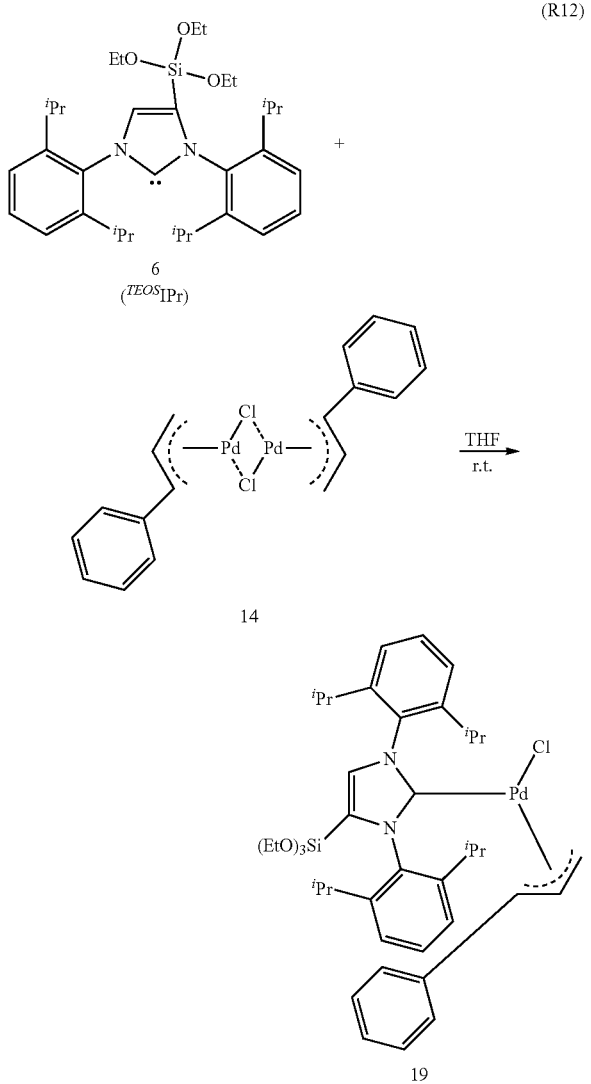

In a glove box, 2.58 g (4.69 mmol) of the ligand ($^{TEOS}$IPr) having the NHC structure obtained in the first step and 40 mL of dehydrated THF were added to a 100 mL Schlenk. Next, 1.21 g (2.34 mmol) of the π-allylPd complex (reaction product 14 in the aforementioned reaction scheme (R11)) and 30 mL of dehydrated THF were added to a 50 mL vial. The solution of the π-allylPd complex 14 was added dropwise to the solution of $^{TEOS}$IPr 6. The resulting solution was stirred at room temperature for 1 hour. Before and after the stirring, the color of the solution was changed from orange to black. Next, the solution was passed through a powder of activated carbon to remove the Pd black produced by the reaction. At this time, the color of the solution was changed to yellow after passing through the activated carbon. Next, THF was completely removed from the resulting solution. Next, a small amount of dehydrated hexane was added and powdered. The resulting solid was washed with hexane to give a yellow solid {reaction product 19 in the reaction scheme (R12), i.e., $^{TEOS}$IPrPd(cinnamyl) 19}.

[Example 3 Fourth Step] Purification of Organometallic Complex Catalyst Obtained after Third Step After the third step, with respect to the yellow solid {$^{TEOS}$IPrPd(cinnamyl) 19}, the purification was performed by subjecting to recrystallization treatment by using hexane etc.

Incidentally, this $^{TEOS}$IPrPd(cinnamyl) 19 was synthesized for the first time by the present inventors as the organometallic complex catalyst used for the cross-coupling reaction.

The yielded amount of $^{TEOS}$IPrPd(cinnamyl) 19 (yellow powder solid) was 2.75 g, and the yield was 72.5%.

Example 3 Identification

The $^{TEOS}$IPrPd(cinnamyl) 19 was identified by $^1$H NMR, $^{13}$C{$^1$H} NMR, $^{29}$Si{$^1$H} NMR, MALDI-TOF-MS and elemental analysis.

The measurement results of the $^{TEOS}$IPrPd(cinnamyl) 19 are shown below.

FIG. 10 shows the spectrum of $^1$H NMR obtained for the organometallic complex catalyst {$^{TEOS}$IPrPd(cinnamyl) 19} of Example 3. FIG. 11 shows the spectrum of MALDI-TOF-MS obtained for the organometallic complex catalyst {$^{TEOS}$IPrPd(cinnamyl) 19} of Example 3. Table 3 shows the results of the elemental analysis.

$^1$H NMR (C$_6$D$_6$, 400 MHZ): δ7.41 (s, 1H), 7.23-7.17 (m, 2H), 7.01-6.96 (m, 4H), 5.11 (m, 1H), 4.43 (d, 1H, J=12.9 Hz), 3.55 (q, 6H), 3.37 (m, 2H), 3.29 (m, 1H), 3.02 (m, 1H), 2.96 (m, 1H), 1.81 (m, 1H), 1.55-1.33 (m, 18H), 1.07 (d, 6H, J=6.8 Hz), 0.96 (t, 9H, J=7.0 Hz)

$^{13}$C{$^1$H} NMR (C$_6$D$_6$, 100 MHZ): δ191.1, 147.2, 146.1, 138.3, 138.2, 136.5, 135.9, 130.1, 129.6, 1236.9, 124.1, 108.7, 91.2, 59.0, 46.6, 29.0, 28.7, 26.3, 25.2, 23.4, 18.0

$^{29}$Si{$^1$H} NMR (C$_6$D$_6$, 80 MHz): δ-68.2

TABLE 3

| C$_{42}$H$_{59}$ClN$_2$PdSi | C [%] | H [%] | N [%] |
|---|---|---|---|
| Calculated value | 62.29 | 7.34 | 3.46 |
| Measured value | 62.56 | 7.35 | 3.28 |

From the results of $^1$H NMR, with respect to $^{TEOS}$IPrPd (cinnamyl) 19, a peak derived from the allyl group was observed, and the integrated value was consistent with the desired structure. In addition, one clean signal was observed from the $^{29}Si\{^1H\}$ NMR. The detailed assignment of $^1H$ NMR and $^{13}C$ $\{^1H\}$ NMR are determined by $^1H$-$^1H$ correlation, $^1H$-$^{13}C$ correlation, $^{13}C$ DEPT spectrum.

As shown in Table 3, it is determined that the desired compound $^{TEOS}$IPrPd(cinnamyl) 19 was synthesized, because the calculated value and the measured value according to the elementary analysis are almost identical (difference within 0.3%).

Further, from the results of MALDI-TOF-MS shown in FIG. 11, it was observed that Cl was removed from Pd by a laser. The result of MALDI-TOF-MS suggests that the ligand having the NHC structure is bound to Pd, and from this viewpoint as well, it was judged that the desired $^{TEOS}$IPrPd(cinnamyl) 19 could be synthesized.

Comparative Example 1

A commercially available organometallic complex catalyst represented by the following formula (10) {trade name "allyl[1,3-bis(2,6-diisopropylphenyl)imidazol-2-ylidene] chloropalladium(II)", available from Aldrich (hereinafter referred to as "IPrPd(allyl)" as occasion demand)} was prepared.

[Chem. 45]

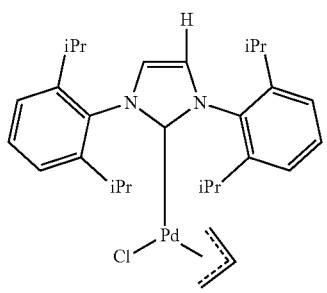

(10)

<X-Ray Crystal Structure Analysis>

Since the single crystals of Example 1 and Comparative Example 1 could be prepared, X-ray crystal structure analysis was performed.

Each product of Example 1 and Comparative Example 1 was dissolved in hexane, and the resulting solution was recrystallized by cooling from room temperature to −40° C.

FIG. 12 shows ORTEP (Oak Ridge Thermal Ellipsoid Plot) obtained for the organometallic complex catalyst of Example 1.

FIG. 13 shows ORTEP obtained for the organometallic complex catalyst of Comparative Example 1. FIG. 14 shows ORTEP obtained for the organometallic complex catalyst of Example 1 and the organometallic complex catalyst of Comparative Example 1.

Table 4 shows bond distances and bond angles obtained for each of the constituent atoms that constitute Comparative Example 1 shown in FIG. 12. Further, Table 5 shows bond distances and bond angles obtained for each of the constituent atoms that constitute Example 1 shown in FIG. 13.

Furthermore, with respect to the crystal structure analysis data of Example 1 and Comparative Example 1, the main description items described in the CIF file defined by the International Union of Crystallography (International Union of Crystallography) IUCr are shown in Table 6.

TABLE 4

Example 1 $^{TMS}$IPrPd(allyl) 15
Bond distances and bond angles obtained for each of the constituent atoms shown in FIG. 10

| Bond distance (Å) | | Bond angle (°) | |
|---|---|---|---|
| Pd(1)—C(1) | 2.040(2) | Cl(1)—Pd(1)—C(1) | 94.34(6) |
| Pd(1)—C(2) | 2.208(3) | C(1)—Pd(1)—C(5) | 100.36(12) |
| Pd(1)—C(3) | 2.151(6) | Pd(1)—C(1)—N(1) | 127.79(15) |
| Pd(1)—C(4) | 2.165(7) | Pd(1)—C(1)—N(2) | 128.01(14) |
| Pd(1)—C(5) | 2.116(4) | Si(1)—C(6)—N(1) | 131.93(15) |
| Pd(1)—Cl(1) | 2.361(8) | Si(1)—C(6)—C(7) | 124.07(17) |
| C(1)—N(1) | 1.360(3) | C(1)—N(1)—C(11) | 123.97(17) |
| C(1)—N(2) | 1.359(3) | C(1)—N(2)—C(23) | 125.21(17) |
| Si(1)—N(6) | 1.899(2) | | |

TABLE 5

Comparative Example 1 $^{TEOS}$IPrPd(allyl) 16
Bond distances and bond angles obtained for each of the constituent atoms shown in FIG. 11

| Bond distance (Å) | | Bond angle (°) | |
|---|---|---|---|
| Pd(1)—C(1) | 2.055(16) | Cl(1)—Pd(1)—C(1) | 94.69(4) |
| Pd(1)—C(2) | 2.119(2) | C(1)—Pd(1)—C(2) | 101.75(7) |
| Pd(1)—C(3) | 2.159(6) | Pd(1)—C(1)—N(1) | 125.93(11) |
| Pd(1)—C(4) | 2.137(4) | Pd(1)—C(1)—N(2) | 129.56(11) |
| Pd(1)—C(5) | 2.183(3) | Si(1)—C(6)—N(1) | 129.91(11) |
| Pd(1)—Cl(1) | 2.363(4) | Si(1)—C(6)—C(7) | 125.63(13) |
| C(1)—N(1) | 1.358(2) | C(1)—N(2)—C(8) | 120.99(13) |
| C(1)—N(2) | 1.362(19) | C(1)—N(2)—C(20) | 125.88(14) |
| Si(1)—N(6) | 1.861(17) | | |
| Si(1)—O(1) | 1.623(12) | | |

TABLE 6

| Name of data | | Example 1 $^{TMS}$IPrPd(allyl) 15 | Com. Example 1 $^{TEOS}$IPrPd(allyl) 16 |
|---|---|---|---|
| Chemical formula | Chemical formula | $C_{33}H_{49}ClN_2PdSi$ | $C_{36}H_{55}ClN_2PdSi$ |
| Molecular weight | Formula weight | 643.7240 | 733.78 |
| Temparature | Temperature, K | 90 | 90 |
| Characteristic X-ray wavelength | Wavelength, Å | 0.71069 | 0.71069 |
| Crystal system | Crystal system | monoclinic | monoclinic |
| Space group | Space group | P-1 | P-1 |
| Unit lattice parameter | a, Å | 10.4846(5) | 18.1934(9) |
| | b, Å | 16.0964(8) | 13.2031(6) |
| | c, Å | 19.7252(10) | 16.3077(8) |
| | α, deg | | |
| | β, deg | 93.994(1) | 102.449(1) |
| | γ, deg | | |

TABLE 6-continued

| Name of data | | Example 1 $^{TMS}$IPrPd(allyl) 15 | Com. Example 1 $^{TEOS}$IPrPd(allyl) 16 |
|---|---|---|---|
| Unit lattice volume | V, Å$^3$ | 3320.8(3) | 3825.2(4) |
| Number of asymmetrical unit in unit lattice | Z | 4 | 4 |
| Linear absorption coefficient | μ, cm$^{-1}$ | 6.99 | 6.21 |
| Crystal structural factor | F(000) | 1352 | 1544 |
| Calculation density | Dcalcd, g cm$^{-3}$ | 1.277 | 1.265 |
| Crystal size | Crystal size, mm | 0.40 × 0.30 × 0.20 | 0.40 × 0.30 × 0.30 |
| Number of measured data | No. of data | 36245 | 41507 |
| Number of measured data | No. of unique data | 7335 | 8421 |
| Number of optimized parameter | No. of variables | 352 | 406 |
| R factor | R(1 > 2 σ (I)) | 0.0264 | 0.0172 |
| R factor | R(All reflections) | 0.0312 | 0.0222 |
| Rw factor | Rw(All reflections) | 0.0821 | 0.0614 |
| S value | GOF (Goddness of Fit) | 1.071 | 1.060 |

From the results of the crystal structure analysis of Example 1 and Comparative Example 1 described above, it has been confirmed that the TMS group was bonded to the carbon at the 4-position of the imidazole ring which constituted the organometallic complex catalyst {$^{TMS}$IPrPd(allyl) 15} of Comparative Example 1, and that the TEOS group was bonded to the carbon at the 4-position of the imidazole ring which constituted the organometallic complex catalyst {$^{TEOS}$IPrPd(allyl) 16} of Example 1.

From the results shown in Table 4 and Table 5, for the organometallic complex catalyst {$^{TMS}$IPrPd(allyl) 15} of Comparative Example 1 and the organometallic complex catalyst {$^{TEOS}$IPrPd(allyl) 16} of Example 1, with respect to the bonding distance between the carbene carbon of the imidazole ring and Pd, there was no significantly difference between the two complexes.

Provided that, it can be seen that the bond angle θ of C(1)-N(1)-C(1) in the organometallic complex catalyst {$^{TMS}$IPrPd (allyl) 15} of Comparative Example 1 (see the bond angle θ1 shown in ORTEP of Example 1 in FIG. 14) is smaller by about 1° to 5° as compared with the angle at the same position on the opposite side (see Table 4 and FIG. 14).

In addition, it can be seen that the bond angle θ of C(1)-N(1)-C(8) in the organometallic complex catalyst {$^{TEOS}$IPrPd (allyl) 16} of Example 1 (see the bond angle θ2 shown in ORTEP of Example 1 in FIG. 14) is smaller by about 1° to 5° as compared with the angle at the same position on the opposite side (see Table 5 and FIG. 14).

Furthermore, with respect to the organometallic complex catalyst {$^{TMS}$IPrPd (allyl) 15} of Comparative Example 1 and the organometallic complex catalyst {$^{TEOS}$IPrPd (allyl) 16} of Example 1, when viewed from the direction perpendicular to the plane of the imidazole ring, it has been found that the substituent on the nitrogen which was located closer to the TEOS group among in the nitrogen atoms constituting the imidazole ring was more largely distorted as a whole in the organometallic complex catalyst {$^{TEOS}$IPrPd (allyl) 16} of Example 1 compared with the organometallic complex catalyst {$^{TMS}$IPrPd (allyl) 15} of Example 1, due to the effect of bonding of the TEOS group {(EtO)$_3$Si group} (effect of steric hindrance) (see FIG. 14, ORTEP of Example 1).

Example 1—Rh

The organometallic complex catalyst {trade name "NTEOS-RHA", available from N.E. CHEMCAT CORPORATION} was prepared. This Comparative Example 1—Rh relates to a catalyst having a configuration where the Pd of the coordination center of the aforementioned organometallic complex catalyst ("trade name "NTEOS-PDA") of Comparative Example 1 is substituted by Rh.

Example 1—Rh First Step

Firstly, the ligand having the NHC structure represented by the aforementioned formula (8) was synthesized by carrying out the same synthesis procedure and analysis as in Comparative Example 1.

Example 1—Rh Second Step

Next, as the π-allylPd complex for a Rh source, a [Rh(CO)$_2$Cl]$_2$ commercially available from Aldrich was prepared.

Example 1—Rh Third Step

Next, the organometallic complex catalyst {trade name "NTEOS-RHA"} of Comparative Example 1—Rh was synthesized, according to the following reaction scheme (R13), by reacting the ligand ($^{TEOS}$IPr) represented by the formula (8) having the NHC structure obtained in the first step with the π-allylRh complex obtained in the second step.

[Chem. 46]

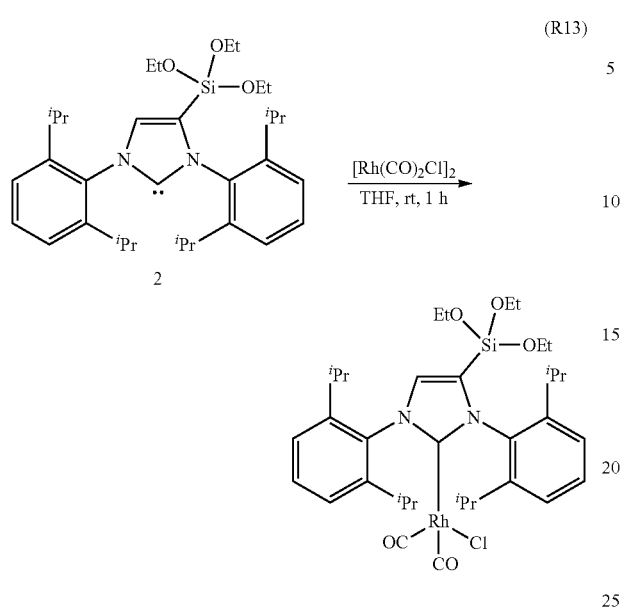

(R13)

Example 1—Rh Fourth Step

Purification of Organometallic Complex Catalyst Obtained after Third Step

After the third step, with respect to the solid containing the reaction product in the reaction scheme (R13), the purification was performed by subjecting to recrystallization treatment by using hexane etc.

Example 1—Rh Identification

The reaction product of the reaction scheme (R13), that is, the organometallic complex catalyst of Comparative Example 1—Rh (trade name "NTEOS-RHA") was identified and confirmed by $^1$H NMR, $^{13}$C{$^1$H} NMR, $^{29}$Si{$^1$H} NMR, MALDI-TOF-MS and elemental analysis.

Example 2—Rh

The organometallic complex catalyst {trade name "NPNL-RHA", available from N.E. CHEMCAT CORPORATION} was prepared. This Example 2—Rh relates to a catalyst having a configuration where the Pd of the coordination center of the aforementioned organometallic complex catalyst of Example 2 is substituted by Rh.

Example 2—Rh First Step

Firstly, the ligand having the NHC structure represented by the aforementioned formula (9) was synthesized by carrying out the same synthesis procedure and analysis as in Example 1.

Example 2—Rh Second Step

Next, as the π-allylPd complex for a Rh source, a [Rh(CO)$_2$Cl]$_2$ commercially available from Aldrich was prepared.

Example 2—Rh Third Step

Next, the organometallic complex catalyst of Example 2—Rh was synthesized, according to the following reaction scheme (R14), by reacting the ligand represented by the formula (9) having the NHC structure obtained in the first step with the π-allylRh complex obtained in the second step.

[Chem. 47]

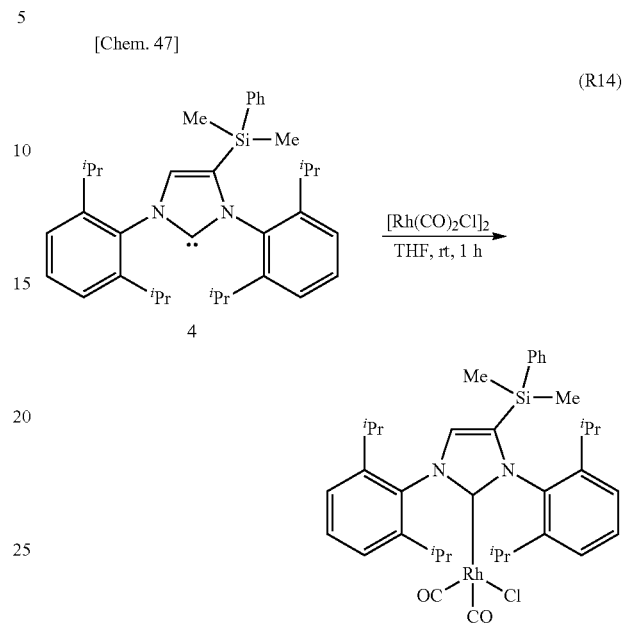

(R14)

Example 2—Rh Fourth Step

Purification of Organometallic Complex Catalyst Obtained after Third Step

After the third step, with respect to the solid containing the reaction product in the reaction scheme (R14), the purification was performed by subjecting to recrystallization treatment by using hexane etc.

Example 2—Rh Identification

The reaction product of the reaction scheme (R14), that is, the organometallic complex catalyst of Example 2—Rh {trade name "NPNL-RHA", available from N.E. CHEMCAT CORPORATION} was identified and confirmed by $^1$H NMR, $^{13}$C{$^1$H} NMR, $^{29}$Si{$^1$H} NMR, MALDI-TOF-MS and elemental analysis.

Comparative Example 1—Rh

The organometallic complex catalyst {trade name "NTMS-RHA", available from N.E. CHEMCAT CORPORATION} was prepared. This Example 1—Rh relates to a catalyst having a configuration where the Pd of the coordination center of the aforementioned organometallic complex catalyst of Example 1 is substituted by Rh.

Comparative Example 1—Rh First Step

Firstly, the ligand having the NHC structure represented by the aforementioned formula (7) was synthesized by carrying out the same synthesis procedure and analysis as in Example 1.

Comparative Example 1—Rh Second Step

Next, as the π-allylPd complex for a Rh source, a [Rh(CO)$_2$Cl]$_2$ commercially available from Aldrich was prepared.

Comparative Example 1—Rh Third Step

Next, the organometallic complex catalyst of Example 1—Rh was synthesized, according to the following reaction scheme (R15), by reacting the ligand represented by the formula (7) having the NHC structure obtained in the first step with the π-allylRh complex obtained in the second step.

[Chem. 48]

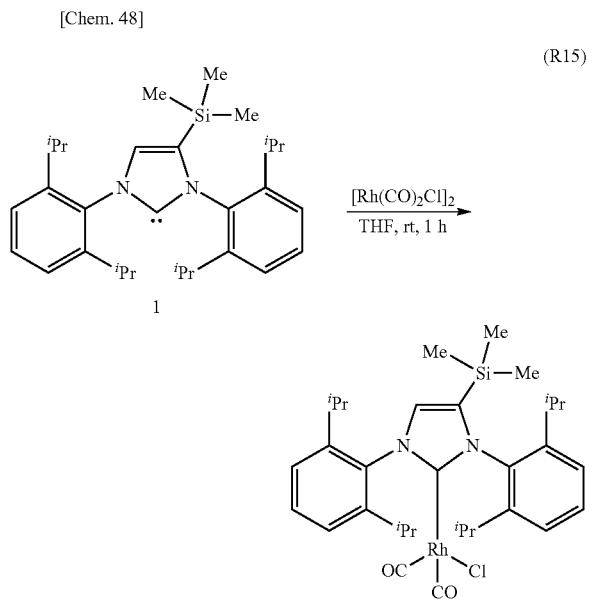

Comparative Example 1—Rh Fourth Step

Purification of Organometallic Complex Catalyst Obtained after Third Step

After the third step, with respect to the solid containing the reaction product in the reaction scheme (R15), the purification was performed by subjecting to recrystallization treatment by using hexane etc.

Comparative Example 1—Rh Identification

The reaction product of the reaction scheme (R15), that is, the organometallic complex catalyst of Example 1—Rh {trade name "NTMS-RHA", available from N.E. CHEMCAT CORPORATION} was identified and confirmed by $^1$H NMR, $^{13}$C{$^1$H} NMR, $^{29}$Si{$^1$H} NMR, MALDI-TOF-MS and elemental analysis.

Comparative Example 2—Rh

The organometallic complex catalyst (hereinafter, referred to as "IPrRh" as occasion demand) where the Pd of the coordination center of the commercially available organometallic complex catalyst represented by the aforementioned formula (10) {trade name "allyl[1,3-bis(2,6-diisopropylphenyl)imidazole-2-ylidene]chloropalladium (II)", available from Aldrich, "IPrPd(allyl)"} was substituted by Rh was prepared. This Comparative Example 2—Rh relates to a catalyst having a configuration where the Pd of the coordination center of the aforementioned organometallic complex catalyst of Comparative Example 2 is substituted by Rh.

Comparative Example 2—Rh First Step

Firstly, the ligand IPr having the NHC structure represented by the aforementioned formula (P5) was synthesized by carrying out the same synthesis procedure and analysis as in the first step-1 of Example 1.

Comparative Example 2—Rh Second Step

Next, as the π-allylPd complex for a Rh source, a [Rh(CO)$_2$Cl]$_2$ commercially available from Aldrich was prepared.

Comparative Example 2—Rh Third Step

Next, the organometallic complex catalyst IPrRh of Comparative Example 2—Rh was synthesized, according to the following reaction scheme (R16), by reacting the ligand IPr represented by the formula (P5) having the NHC structure obtained in the first step with the π-allylRh complex obtained in the second step.

[Chem. 49]

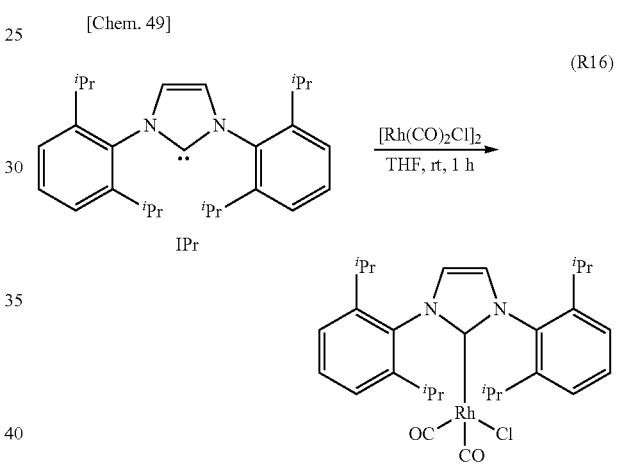

Comparative Example 2—Rh Fourth Step

Purification of Organometallic Complex Catalyst Obtained after Third Step

After the third step, with respect to the solid containing the reaction product IPrRh in the reaction scheme (R16), the purification was performed by subjecting to recrystallization treatment by using hexane etc.

Comparative Example 2—Rh Identification

The reaction product of the reaction scheme (R16), that is, the organometallic complex catalyst IPrRh of Comparative Example 2—Rh was identified and confirmed by $^1$H NMR, $^{13}$C{$^1$H} NMR, $^{29}$Si{$^1$H} NMR, MALDI-TOF-MS and elemental analysis.

<IR Measurement of Example 1—Rh, Example 2—Rh, Comparative Example 1—Rh, Comparative Example 2—Rh>

With respect to the organometallic complex catalysts of Example 1-Rh, Example 2—Rh, Comparative Example 1—Rh, and Comparative Example 2—Rh, infrared absorption spectra were measured. Then, by using the arithmetic mean value of the stretching frequency [cm$^{-1}$] of the carbonyl group obtained from each infrared absorption spectrum, according to the following formula (E1) described above, the TEP value [cm⁻¹] of the organometallic complex catalyst where the coordination center was substituted from Rh to Ni was calculated.

[Eq. 3]

$$TEP[cm^{-1}] = v_{CO}^{av/Ni}[cm^{-1}] \approx 0.8001 v_{CO}^{av/Rh}[cm^{-1}] + 420.0[cm^{-1}] \quad (E1)$$

The TEP values of the respective organometallic complex catalysts are shown in Table 7.

TABLE 7

| | Trade name or abbreviation | Arithmetic mean value of stretching frequency of carbonyl group of Rh complex vCO$^{av}$/Rh/cm⁻¹ | Stretching frequency of carbonyl group of Ni complex calculated from Equation E1 TEP/cm⁻¹$^a$ |
|---|---|---|---|
| Example 1-Rh | NTEOS-RHA | 2034.1 | 2047.4 (+3.9) |
| Example 2-Rh | NPNL-RHA | 2031.2 | 2045.1 (+1.5) |
| Com. Example 1-Rh | NTEMS-RHA | 2024.9 | 2040.1 (−3.5) |
| Com. Example 2-Rh | IPrRh | 2029.2 | 2043.6 |

*$^a$ Numerals in parentheses indicate the difference between the TEP value of Comparative Example 1-Rh and the TEP value of each organometallic catalyst.

As is clear from the results shown in Table 7, it is confirmed that the TEP values of the organometallic complex catalyst of Example 1—Rh and Example 1—Rh are shifted to the higher wave number side than the TEP value of Comparative Example 2—Rh. That is, it has been found that the organometallic complex catalysts of Example 1—Rh and Example 1—Rh include the ligand having the NHC structure which has a lower electron donating property than the IPr ligand (formula (P5)) of Comparative Example 2—Rh.

From this, it has been found that the organic metal complex catalysts of Example 1 and Example 2 where the coordination center is substituted from Rh to Pd also include the ligand having the NHC structure which has a lower electron donating property than the IPr ligand (formula (P5)) of Comparative Example 1. In addition, with respect to the organometallic complex catalyst of Example 3, since including the ligand having the same NHC structure as in Example 1, it is easily speculated that the TEP value of the organometallic complex catalyst of Example 3 is shifted to the higher wave number side than the TEP value of Comparative Example 2—Rh.

<Catalytic Activity Evaluation by Cross-Coupling Reaction>

By using the organometallic complex catalysts of Example 1, Example 2, Comparative Example 1 and Comparative Example 2, the C—N cross-coupling reaction (Buchwald-Hartwig reaction) represented by the following reaction scheme (R17) was carried out.

[Chem. 50]

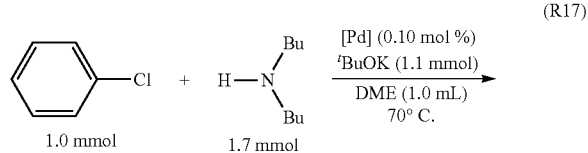

(R17)

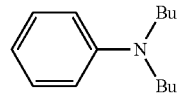

As shown in reaction scheme (R17), there were used chlorobenzene, N,N-dibutylamine as a substrate, $^t$BuOK as a base, and 1 mL of 1,2-dimethoxyethane (DME) as a solvent. The preparation and reaction were all carried out in an inert gas (Ar) atmosphere in a glove box. The yield was calculated by GC by using dodecane and mesitylene as an internal standard substance.

The reaction conditions were that, with respect to 1 mmol of chlorobenzene, N,N-dibutylamine was 1.7 mmol, a temperature was 70° C. and an amount of the catalyst was 0.10 mol %. Table 8 shows the results of the catalytic activity evaluation of the organometallic complex catalysts of Example 1, Example 2, Comparative Example 1, and Comparative Example 2.

TABLE 8

| | | Yield per reaction time/% | | | |
|---|---|---|---|---|---|
| | Trade name | 10 min | 30 min | 60 min | 90 min |
| Ex. 1 | NTEOS-PDA | 10 | 28 | 95 | 99 |
| Ex. 2 | NPNL-PHA | 12 | 34 | 95 | 99 |
| Com. Ex. 1 | NTEMS-PDA | 13 | 64 | 100 | 100 |
| Com. Ex. 2 | Ipr | 10 | 31 | 92 | 95 |

From the results shown in Table 8, when using the organometallic complex catalysts of Example 1 and Example 2 which satisfy the features of the present invention in comparison with the organometallic complex catalyst of Comparative Example 2 which is the commercially available product, it has been clear that the desired product can be obtained in very high yield for the C—N cross-coupling reaction.

It has been clear that the organometallic complex catalysts of Example 1 and Example 2 which satisfy the features of the present invention can give the desired product in a higher yield than the organometallic complex catalysts of Comparative Example 2 and Comparative Example 1 even in a short reaction time.

In particular, it has been clear that the organometallic complex catalysts of Example 1 and Example 2 which satisfy the constitution elements of the present invention gave the desired product at a higher yield than the organometallic complex catalyst of Comparative Example 2 after the lapse of a sufficient reaction time of 60 minutes or longer. The present inventors have speculated that, since the organometallic complex catalyst becomes relatively bulky, and the catalytically active species M° (zero valence) in the catalytic reaction are prevented from deactivation due to origomerization, the life of the catalyst can be improved. Therefore, The present inventors have speculated that the organometallic complex catalysts of Example 1 and Example 2 which satisfy the constitution elements of the present invention gave the desired product at a higher yield than the organometallic complex catalyst of Comparative Example 2 after the lapse of a sufficient reaction time of 60 minutes or longer.

In general, in a cross-coupling reaction, the reaction is initiated from oxidative addition where palladium having a lot of electrons gives an electron to an aryl halide to cleave the C—X bond (X is a halogen atom) (e.g., see "Akio Yamamoto, Organometallic Complex, Shokabou"). Therefore, it can be suspected that the oxidative addition is promoted by increasing the electron density of palladium.

However, as in the reaction mechanism shown in FIG. 14, in the C—N coupling reaction as in the reaction scheme (R17) and the reaction scheme (16), it has been clear that the rate-limiting step in the case of using a bulky ligand is the step of coordination of an amine to a metal or a step of abstraction of a proton by a base (see, for example, the academic article "a) Organ. M. G., Abdel-Hadi, M., Avola, S., Dubovyk, I., Hadei, N., Kantchev, E. A. B., Obrien, C. J., Valente, C. Chem. Eur. J. 2008, 14, 2443 b) Hoi, K. H., Calimsiz, S., Froese, R. D. J., Hopkinson, A. C., Organ, M. G. Chem. Eur. J. 2011, 17, 3086 c) Ikawa, T., Barder, T. E., Biscoe, M. R., Buchwald, S. L. J. Am. Chem. Soc. 2007, 129, 13001").

Here, FIG. 14 is a conceptual diagram which shows the reaction mechanism clarified in the C—N coupling reaction where an organic Pd complex catalyst is used (see the aforementioned academic articles a) to c)).

That is, the present inventors understand that the rate-limiting step in the C—N coupling reaction is the step of coordination of the amine to the metal or the step of abstraction of the proton on the amine, when employing the structure where the silyl group is bonded to the carbon at the 4-position in the imidazole ring, and the structure where the TEP value satisfies the conditions described above, since the organometallic complex catalyst becomes relatively bulky, and the catalytically active species M° (zero valence) in the catalytic reaction are prevented from deactivation due to origomerization, the life of the catalyst can be improved.

INDUSTRIAL APPLICABILITY

The catalyst of the present invention can give a higher yield of the desired object than conventional catalysts in a cross-coupling reaction. Thus, the present invention contributes to the development of mass production techniques in the fields of medicines, pesticides and electronic materials where cross-coupling is available for the synthesis of the desired products (e.g. aromatic amines).

According to the ligand of the present invention, it is possible to provide the organometallic complex catalyst capable of obtaining a higher yield of the desired product than the conventional catalysts in the cross-coupling reaction.

Further, according to the present invention, a method for reliably preparing the organometallic complex catalyst for the cross-coupling reaction where the ligand is used, that is, the organometallic complex catalyst which can give the desired product in a higher yield than the conventional catalysts in the cross-coupling reaction can be provided.

Thus, the present invention contributes to the development of mass production techniques in the fields of medicines, pesticides and electronic materials where cross-coupling is available for the synthesis of the desired products (e.g. aromatic amines).

EXPLANATION OF SYMBOLS

15 $^{TMS}$IPrPd(allyl)
16 $^{EOS}$IPrPd(allyl)
19 $^{TEOS}$IPrPd(cinnamyl)
IPr 1,3-bis(2,6-diisopropylphenyl)imidazole-2-ylidene
NHC Nitrogen-containing heterocyclic carbene (N-Heterocyclic Carbene)
TEOS Triethoxysilyl group
TMS Trimethylsilyl group

The invention claimed is:

1. An organometallic complex catalyst for use in a cross-coupling reaction, which has a structure represented by the following formula (1):

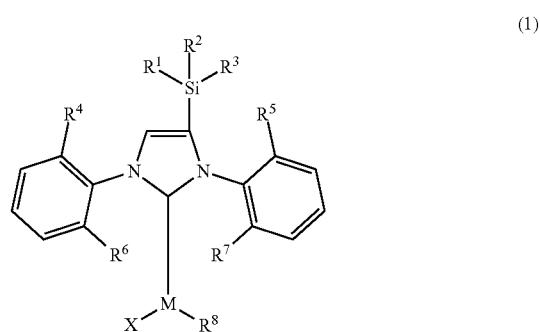

wherein, in the formula (1),

M is a coordination center and represents any one of metal atoms selected from the group consisting of Pd, Pt, Rh, Ru and Cu, or an ion thereof;

$R^1$, $R^2$ and $R^3$ is optionally the same or different, and each represents at least one substituent selected from the group consisting of a hydrogen atom, an alkyl group, an alkoxy group, alkenyl group, an alkynyl group and an aryl group;

$R^4$, $R^5$, $R^6$ and $R^7$ is optionally the same or different, and each represents at least one substituent selected from a hydrogen atom, a halogen atom, an alkyl group, an alkoxy group, an alkenyl group, an alkynyl group, an aryl group, a hydroxy group, hydroxylate group, a thiocarboxyl group, a dithiocarboxyl group, a sulfo group, a sulfino group, an oxycarbonyl group, a carbamoyl group, a hydrazinocarbonyl group, an amidino group, a cyano group, an isocyano group, a cyanato group, an isocyanato group, a thiocyanato group, an isothiocyanato group, a formyl group, an oxo group, a thioformyl group, a thioxo group, a mercapto group, an amino group, an imino group, a hydrazino group, an aryloxy group, a sulfide group, a nitro group and a silyl group;

X represents a halogen atom which is capable of coordinating to the coordination center M;

$R^8$ represents a substituent having a π bond and 3 to 20 carbon atoms which is capable of coordinating to the coordination center M;

provided that, with regard to electron-donating property with respect to the coordination center M, $R^1$, $R^2$, $R^3$, $R^4$, $R^5$, $R^6$ and $R^7$ are so combined and arranged that a TEP value (Tolman electronic parameter) [cm$^{-1}$] obtained by an infrared spectroscopy of a ligand having a nitrogen-containing heterocyclic carbene structure represented by the following formula (2) which contains $R^1$ to $R^7$, sifts toward a high frequency side compared to the TEP value [cm$^{-1}$] of a ligand represented by the formula (2-1), (2)

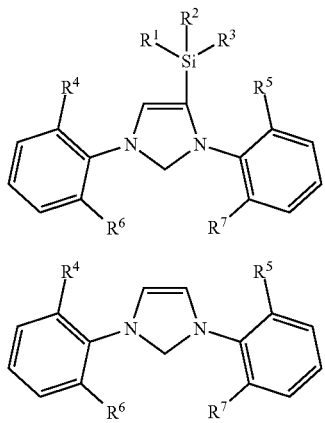

(2-1)

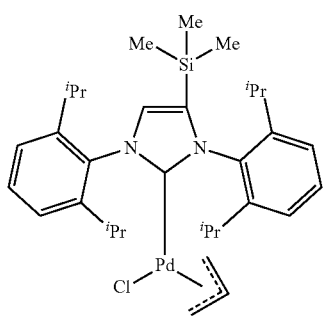

wherein,
in the formula (2), $R^1$, $R^2$, $R^3$, $R^4$, $R^5$, $R^6$ and $R^7$ represent the same substituents as $R^1$, $R^2$, $R^3$, $R^4$, $R^5$, $R^6$ and $R^7$ in the formula (1), and
in the formula (2-1), $R^4$, $R^5$, $R^6$ and $R^7$ represent the same substituents as $R^4$, $R^5$, $R^6$ and $R^7$ in the formula (1).

2. The organometallic complex catalyst according to claim 1, which is used in a C—N cross-coupling reaction.

3. The organometallic complex catalyst according to claim 1, which has a structure represented by any one of the following formula (3), the formula (4) or the formula (5), (3)

(4)

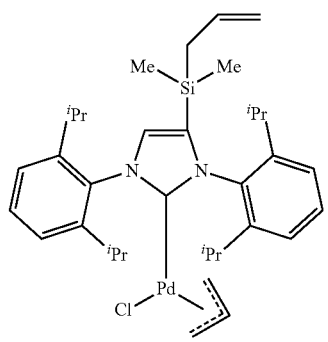

(5)

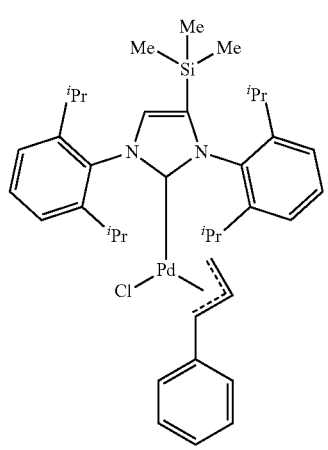

wherein, in the formulae (3) to (5), $^i$Pr represents an isopropyl group, Me represents methyl group.

* * * * *